(12) United States Patent
Coroneos

(10) Patent No.: US 7,219,621 B2
(45) Date of Patent: May 22, 2007

(54) ANTI-SQUIRREL BIRD FEEDER

(76) Inventor: Donald L. Coroneos, 1413 Monroe St., Waukegan, IL (US) 60085

( * ) Notice: Subject to any disclaimer, the term of this patent is extended or adjusted under 35 U.S.C. 154(b) by 184 days.

(21) Appl. No.: 11/064,271

(22) Filed: Feb. 23, 2005

(65) Prior Publication Data

US 2005/0263083 A1 Dec. 1, 2005

Related U.S. Application Data

(63) Continuation-in-part of application No. 10/840,963, filed on May 7, 2004, now Pat. No. 6,918,353.

(51) Int. Cl.
*A01K 61/02* (2006.01)

(52) U.S. Cl. .................. 119/57.1; 119/51.01; 119/52.1; 119/57.8; 119/57.9

(58) Field of Classification Search ............. 119/51.01, 119/52.1, 52.2, 52.3, 57.8, 57.9
See application file for complete search history.

(56) References Cited

U.S. PATENT DOCUMENTS 3,145,690 A * 8/1964 Bachman .................. 119/52.3
6,119,627 A * 9/2000 Banyas et al. ............. 119/57.9
7,032,538 B1 * 4/2006 Lush ......................... 119/52.1
2007/0006811 A1 * 1/2007 Tippetts ..................... 119/52.2

* cited by examiner

*Primary Examiner*—Peter M. Poon
*Assistant Examiner*—Willie Berry, Jr.
(74) *Attorney, Agent, or Firm*—Meroni & Meroni, P.C.; Charles F. Meroni, Jr.; Christopher J. Scott

(57) ABSTRACT

The present invention provides a bird feeder apparatus for providing a readily available supply of feed for birds. The apparatus comprises a telescopic-operational assemblage, a shroud assembly, and a hopper assembly. The telescopic-operational assemblage provides a nonlinear, geometrically-based closure mechanism for effectively closing the bird feeder when a large load is placed upon the shroud assembly such as when a squirrel attempts to gain access to feed outlets of the hopper assembly by positioning itself upon the apparatus. Further, the apparatus provides a partitioned, selectively removable (drop out-type) hopper for enabling easy refills; a feed-level status flag assembly for indicating to the user whether the hopper assembly is full or empty; and at least one surround perch assembly for accommodating birds of various sizes.

20 Claims, 36 Drawing Sheets

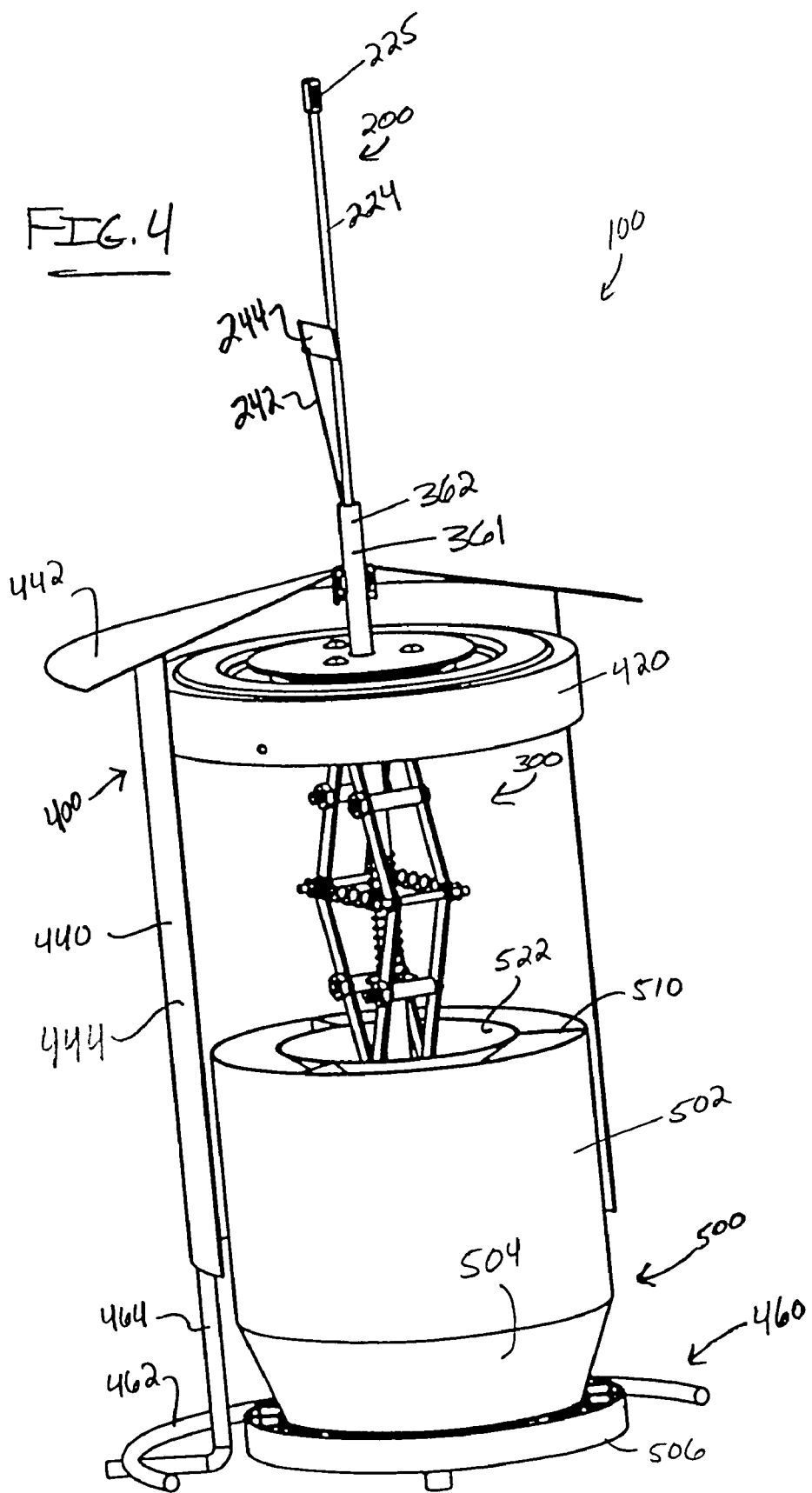

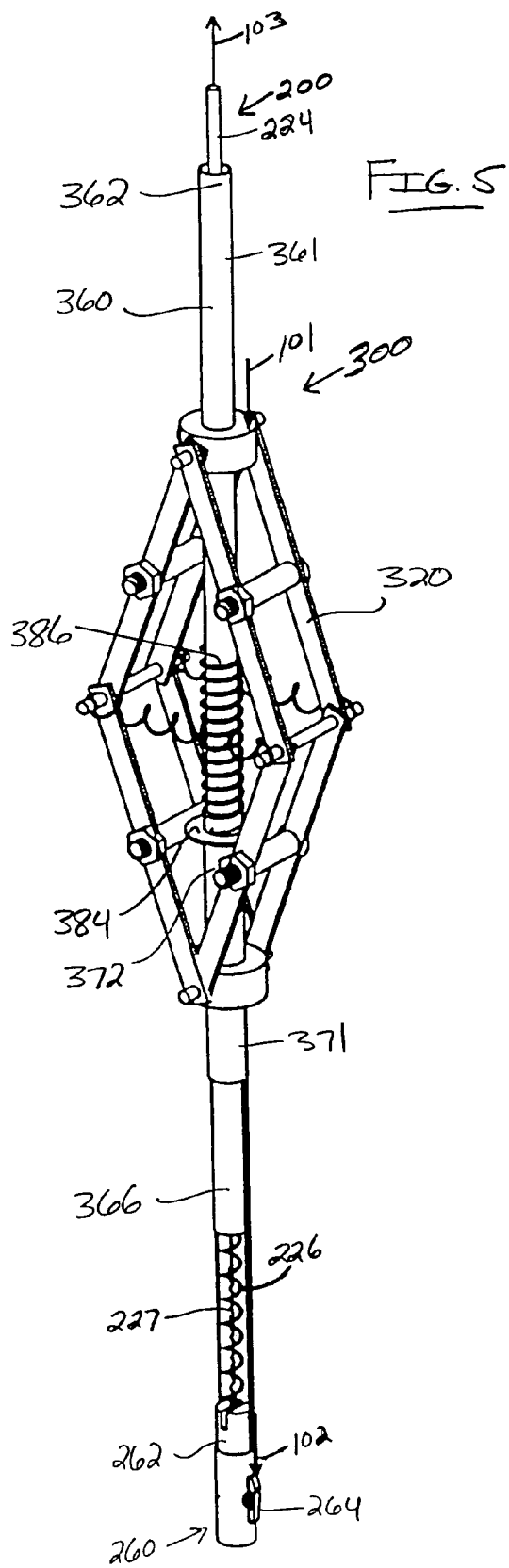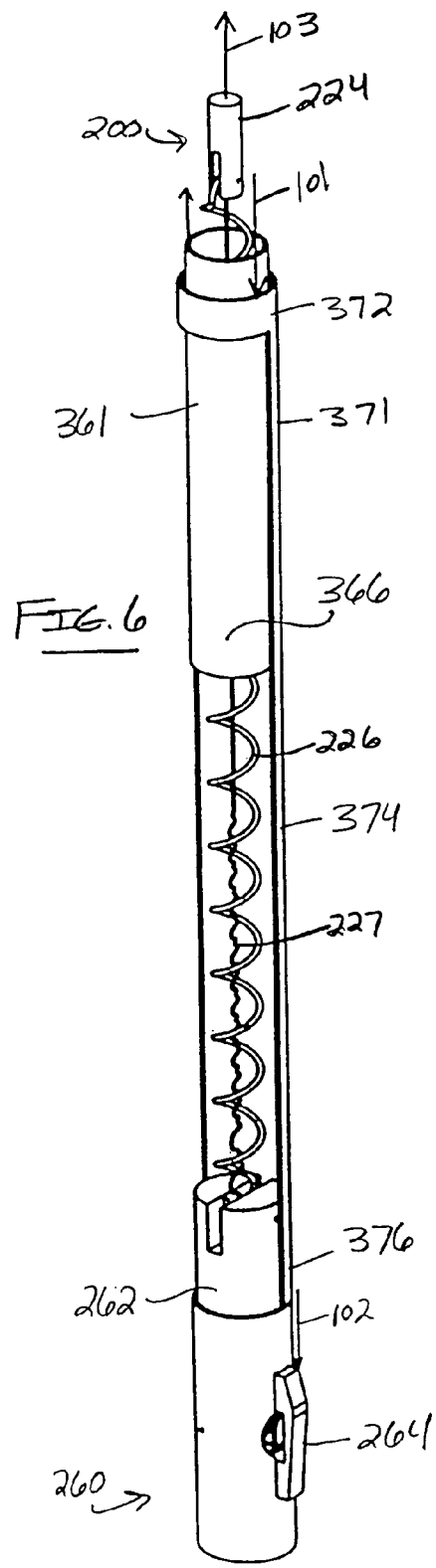

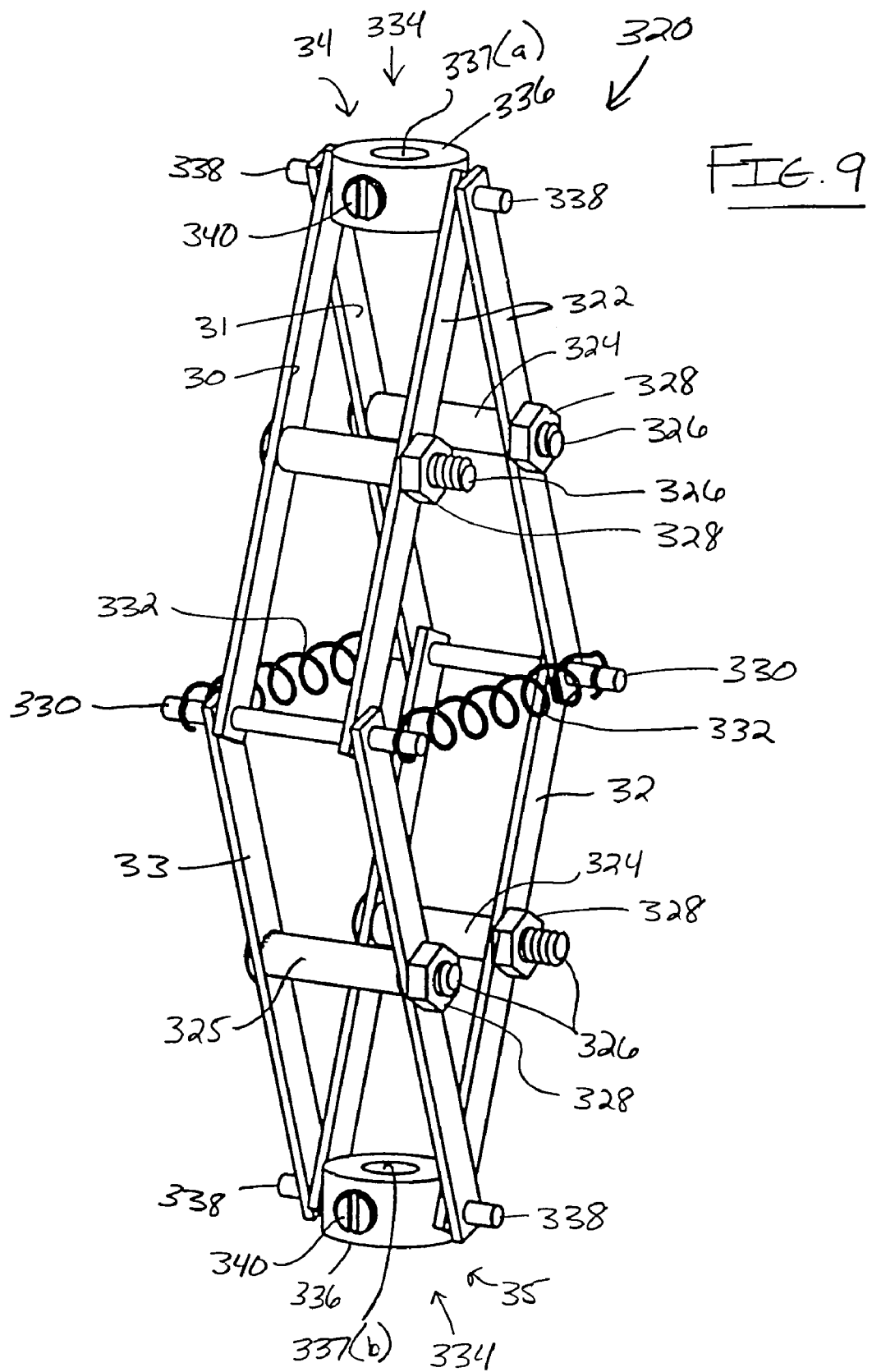

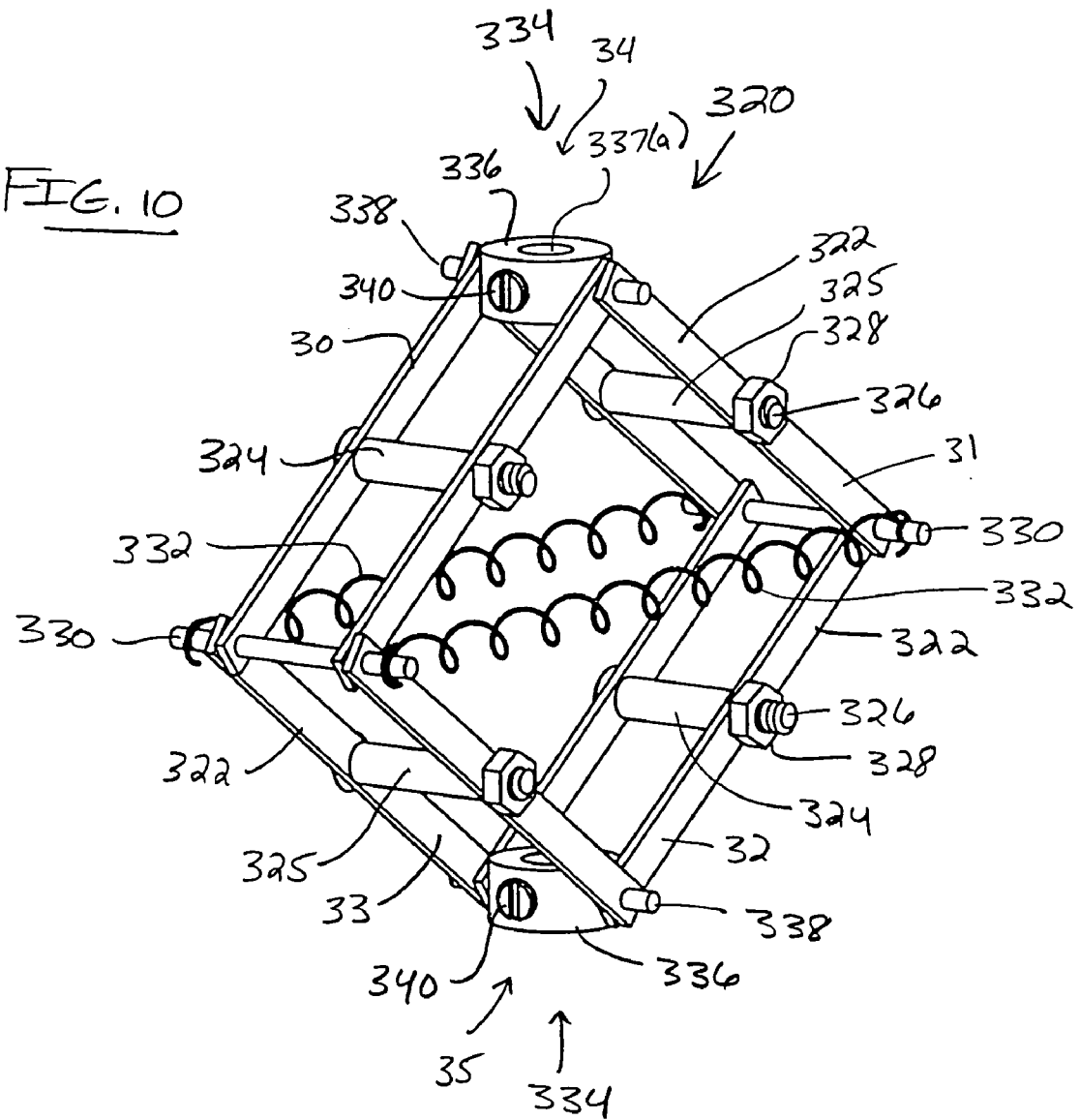

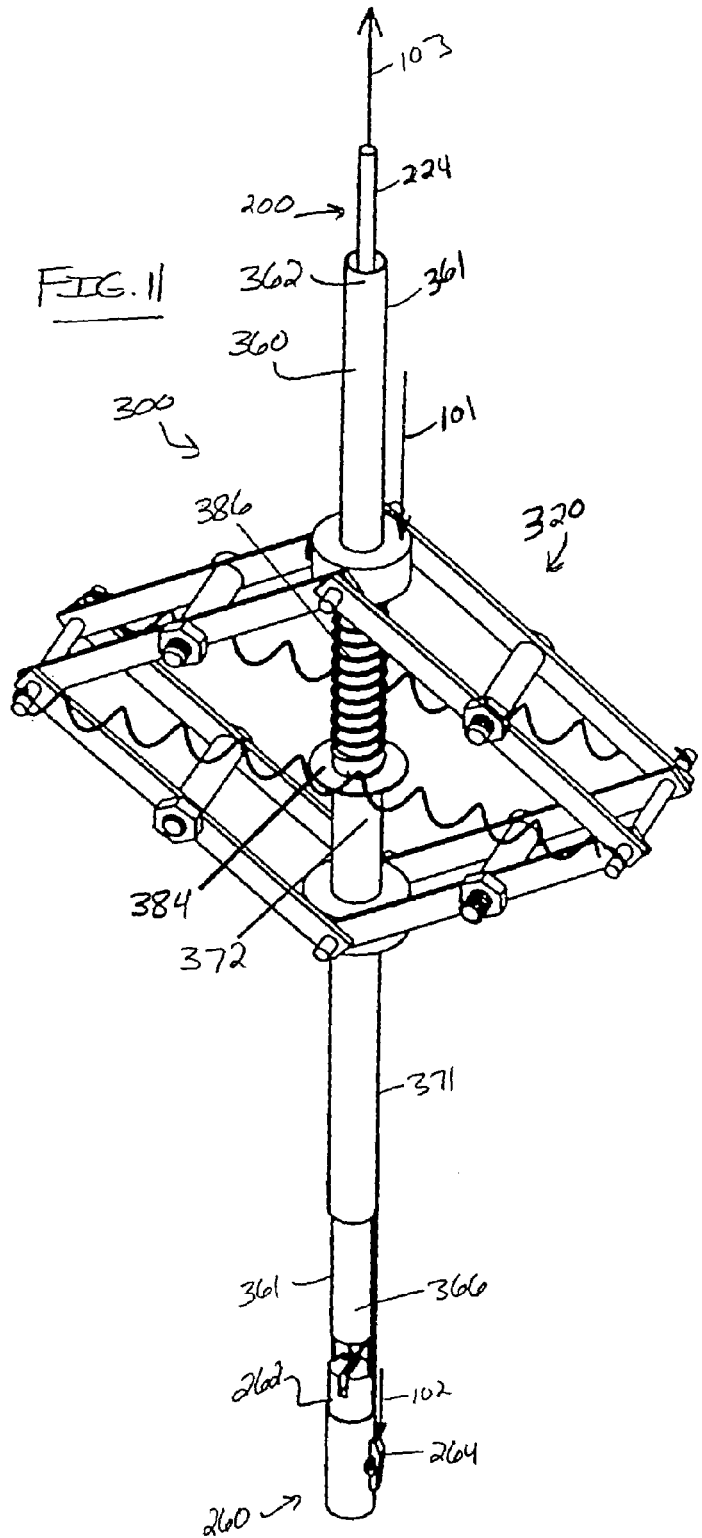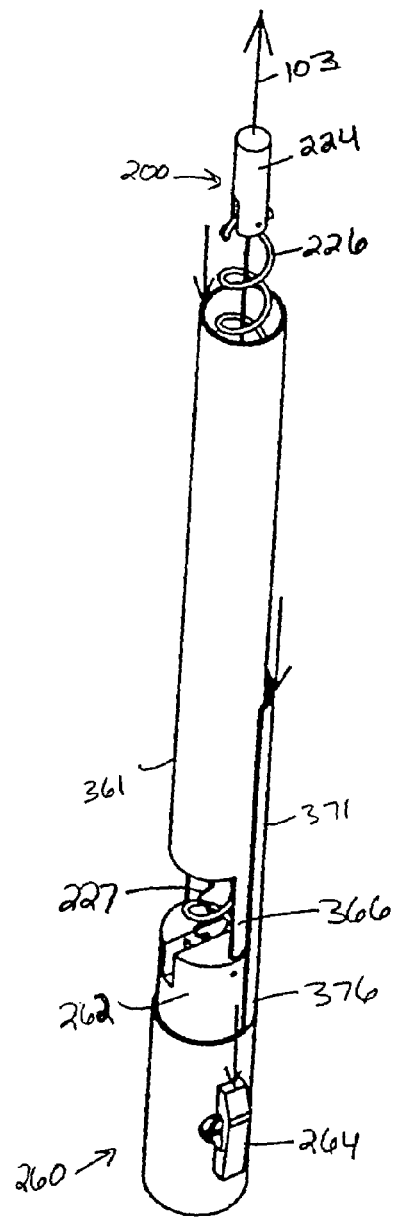

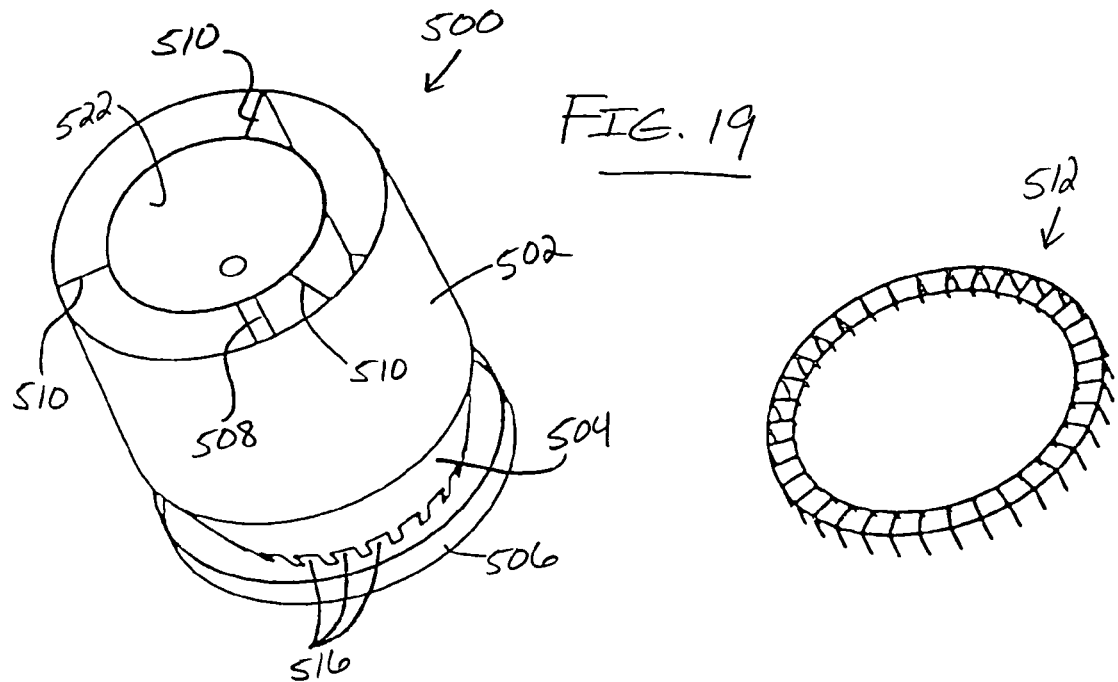
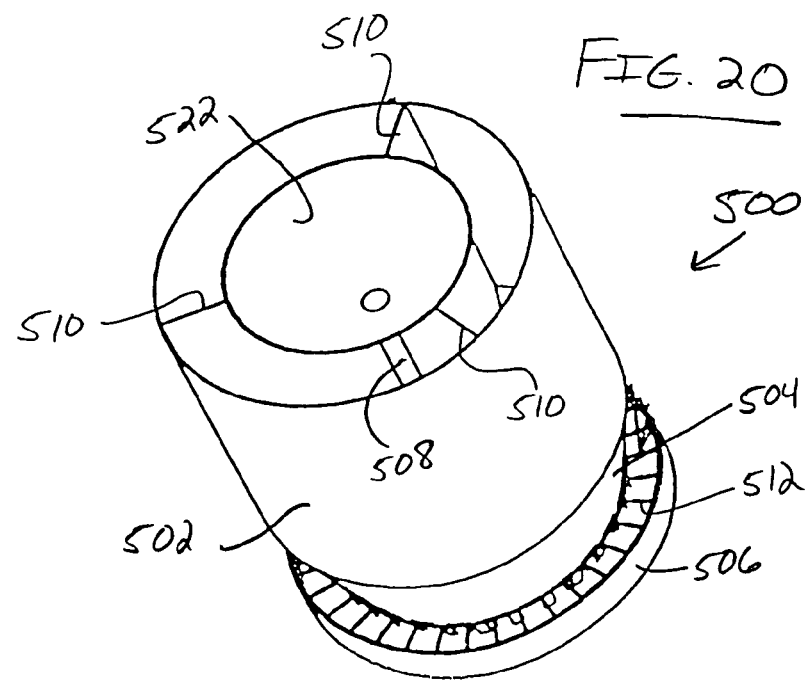

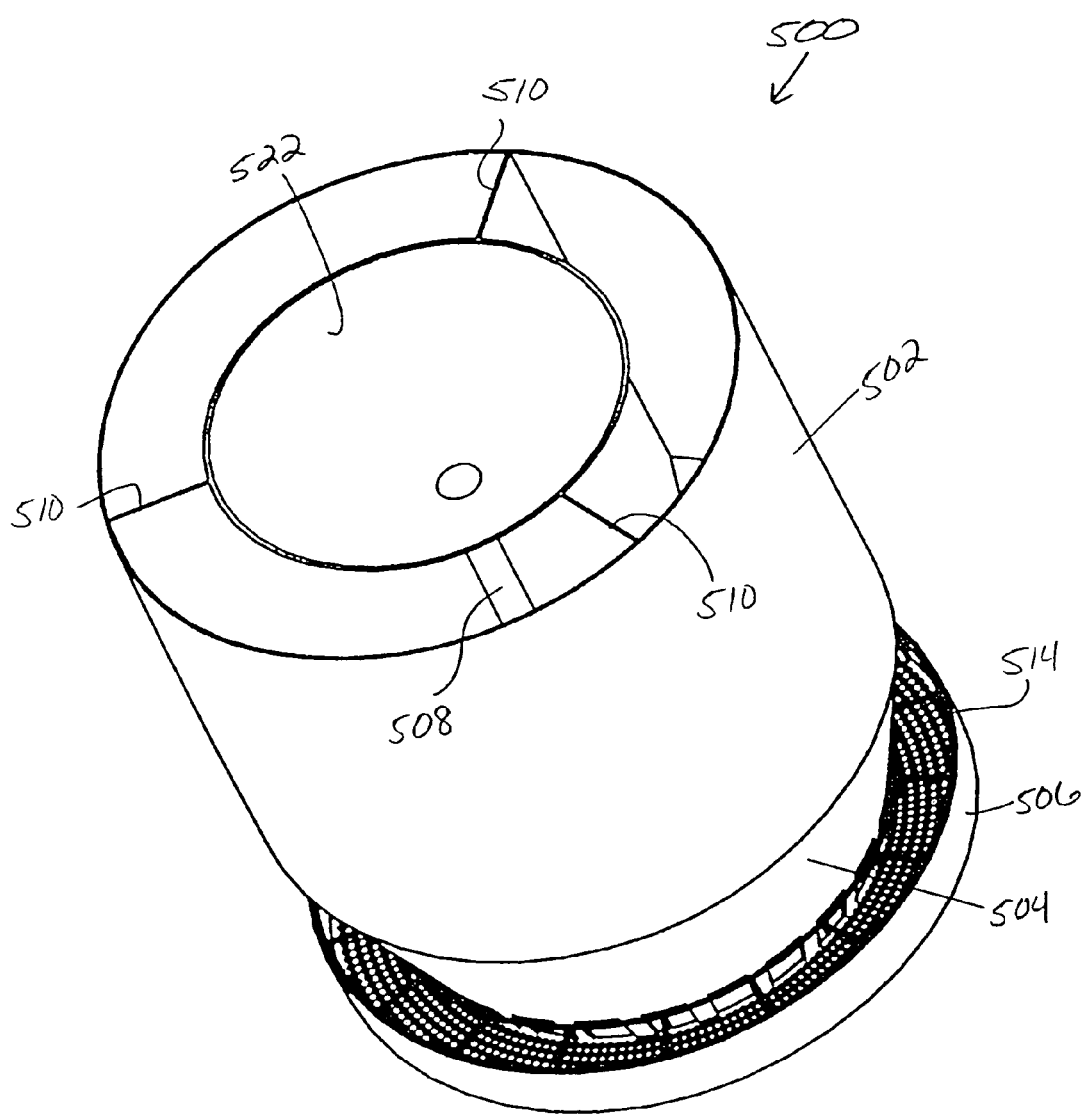

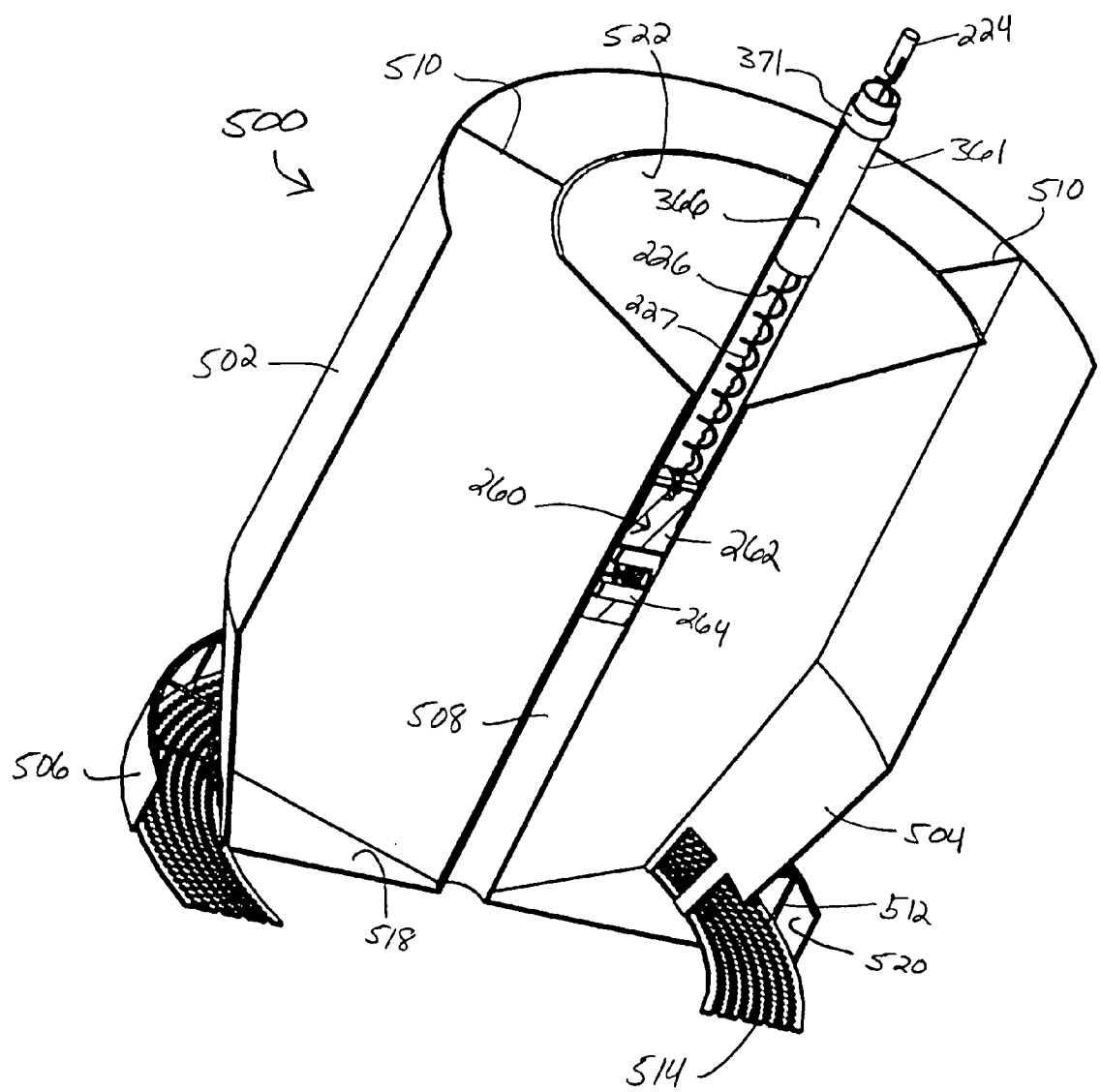

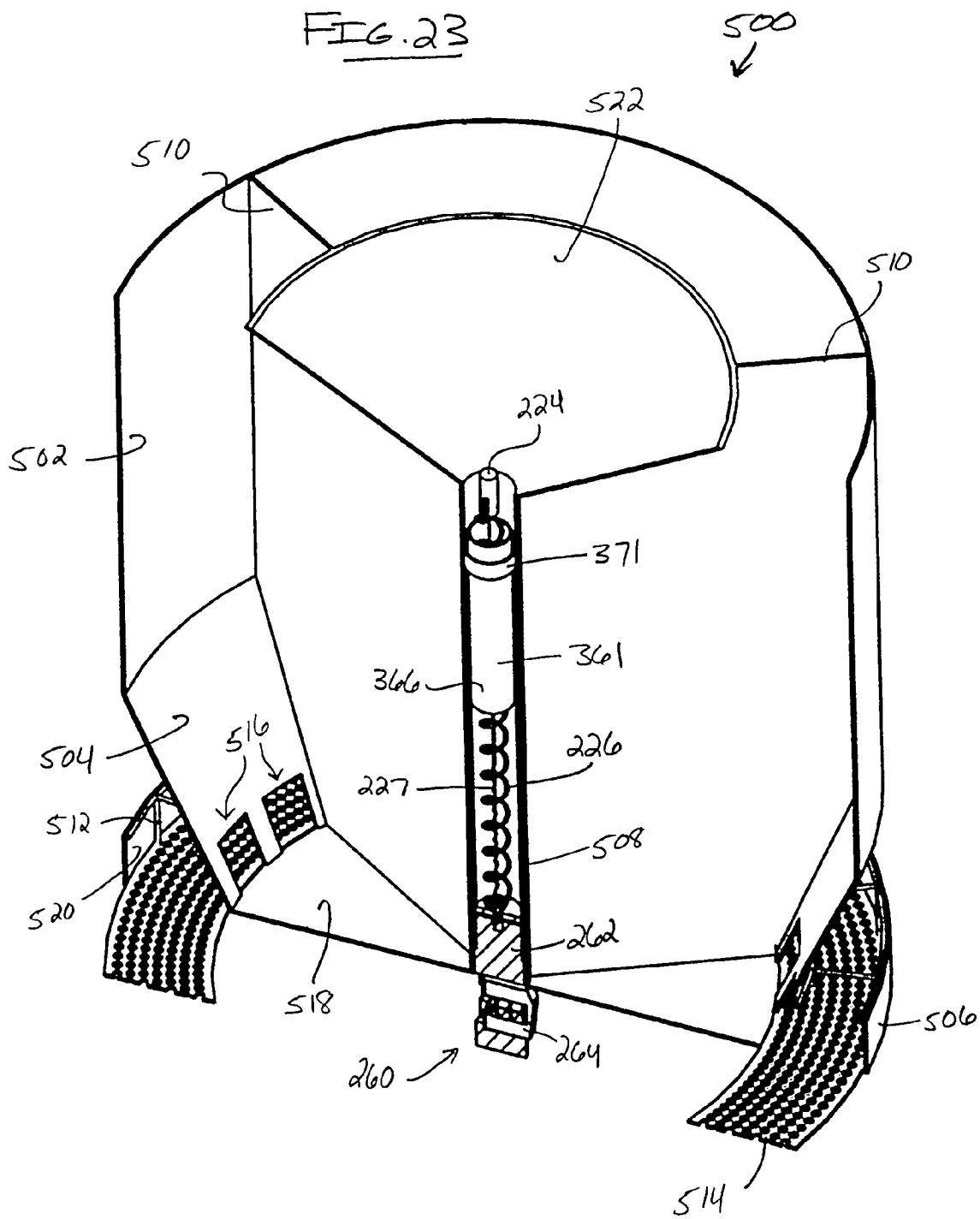

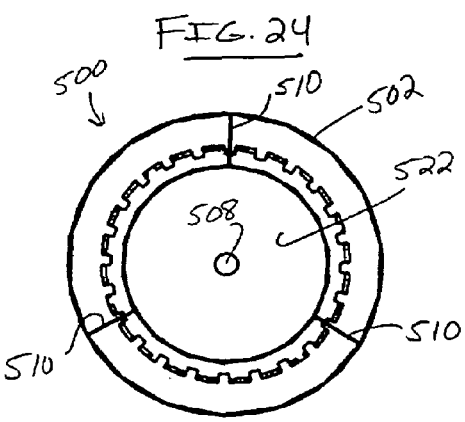
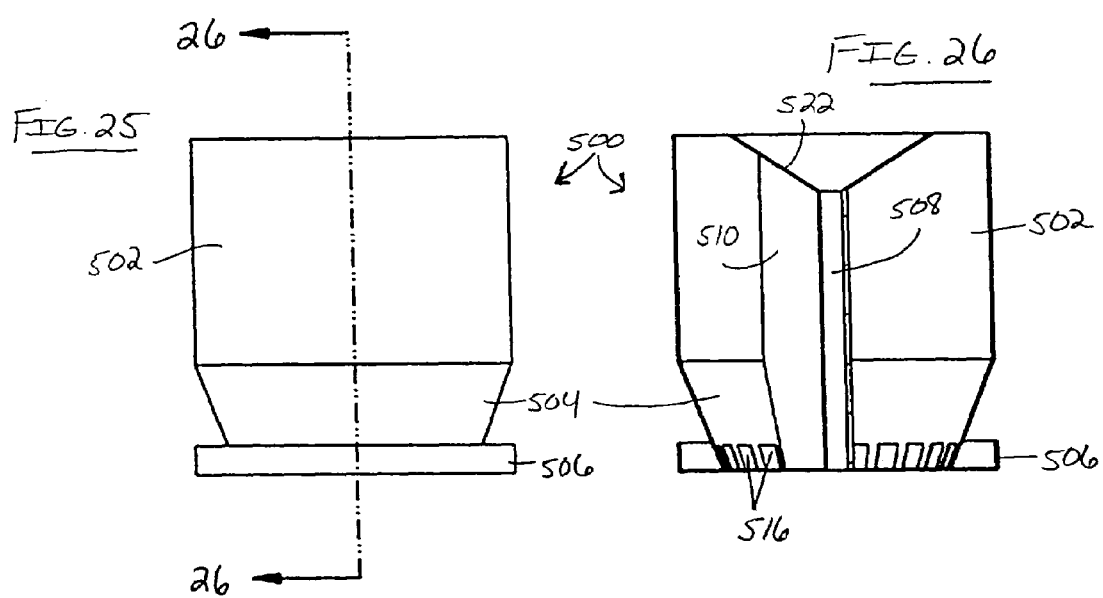
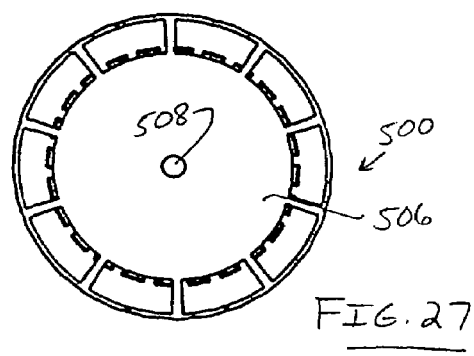

443 →

443 →

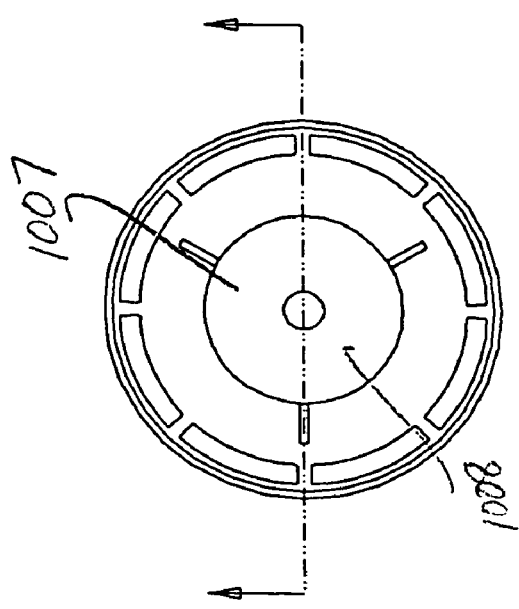
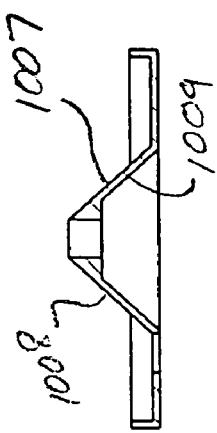
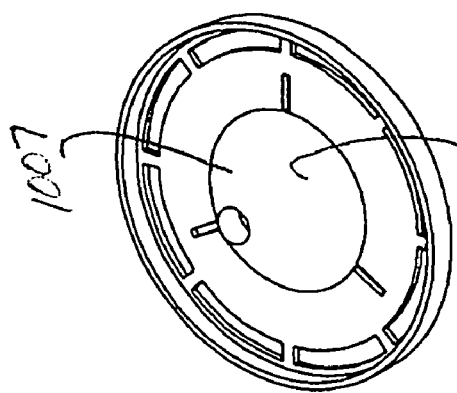
FIG. 44(a)
FIG. 44(b)

ANTI-SQUIRREL BIRD FEEDER

PRIOR HISTORY

This application is a continuation-in-part patent application claiming priority to pending U.S. patent application Ser. No. 10/840,963, filed in the U.S. Patent and Trademark Office on May 7, 2004 now U.S. Pat. No. 6,918,353.

BACKGROUND OF THE INVENTION

1. Field of the Invention

The present invention generally relates to a bird feeder apparatus. More particularly, the present invention relates to a bird feeder apparatus designed to provide a readily available source of feed to birds, while further functioning to prevent other small animals, such as squirrels and raccoons, from gaining access to the bird feed.

2. Description of the Prior Art

The study of birds is formally referred to as ornithology and within the broad compass of ornithologists is found a remarkable array of bird enthusiasts. They range from the person who notices which bird species visit the garden birdbath to the computer buff trying to mathematically describe the fate of some host population subject to the parasitic attentions of cowbirds or cuckoos. To be sure, bird enthusiasts are well-numbered and these numbers continue to grow. Accordingly, markets continue to develop in an effort to cater to the growing needs and desires of the bird enthusiast population. In this last regard, it is noted that there are two avenues by which the typical bird lover or ornithologist pursues his or her study of birds. Either the bird enthusiast will travel to the ecosystem in which the various bird species live or the bird enthusiast will attempt to lure or attract various bird species to the "ecosystem" in which the bird enthusiast lives. It is with this latter trend in mind that the present invention is proposed. In other words, a growing desire among bird enthusiasts or bird watchers is to attract various species of birds to the vicinity of the residential abode or similar other setting in which the watcher spends a considerable amount of time.

The most successful way of attracting birds and increasing their number in a given setting is to satisfy their most basic needs—good food, nesting sites and water. In this regard, the bird feeder is useful in any attempt to attract birds to a given setting. Providing a source of food, however, has a tendency to attract not only birds, but other wildlife, such as squirrels and raccoons. Given the uncanny ability for squirrels and the like to deplete stores of bird food from bird feeders, a number of attempts have been made to develop an effective anti-squirrel or squirrel proof bird feeder. Thus, anti-squirrel bird feeders are known in the prior art, some of which are described hereinafter.

U.S. Pat. No. 5,163,382 ('382 Patent), which issued to Morrison, discloses a Bird Feeder Apparatus. The '382 Patent teaches a bird feeder arranged to discourage squirrels from access to food within the feeder comprising a first housing reciprocatingly receiving an second housing, with the first housing including side wall openings and the second housing including side wall openings aligned in a first position and displaced in a second position when a squirrel alights upon a top wall of the first housing projecting the second housing within the first housing preventing access of the squirrel to food components within the second housing.

U.S. Pat. No. 5,195,459 ('459 Patent), which issued to Ancketill, discloses a Bird Feeder. The '459 Patent teaches a bird feeder comprising a food holder and shroud which is biased in an open position by a spring. When an animal such as a squirrel not intended to feed from the bird feeder lands on the shroud or a roof portion of the shroud, the weight of the animal causes the shroud to descend against the biasing action of the spring. The shroud closes the food holder thereby preventing the animal from gaining access to the food.

U.S. Pat. No. 5,720,238 ('238 Patent), which issued to Drakos, discloses a Spring Operated Squirrel Proof Bird Feeder. The '238 Patent teaches a squirrel proof bird feeder comprising an inner and outer housing with the inner housing fixed vertically and with the outer housing telescopically received thereabout and moveable between upper and lower positions. The housings have openings which are aligned and which provide through openings serving as feed ports in the upper position of the outer housing. In the lower position of the outer housing, the openings are misaligned and close the feed ports. The outer housing is also provided with springs biasing the same toward the upper position but allowing the housing to move downwardly to the lower position under the weight of the squirrel.

U.S. Pat. No. 5,964,183 ('183 Patent), which issued to Czipri, discloses a Bird Feeder. The '183 Patent teaches a bird feeder having an inner feed containing tube with a removable top, fixed bottom and feed access openings therein, an outer tube shrouding the inner tube and having feed access openings therein and an upper and lower position. In the upper position the feed access openings in the inner and outer tubes are aligned and when the outer tube moves downwardly relative to the outer tube the access openings are closed. A lever is pivotally connected to the fixed bottom and operatively connected to the outer tube. A biasing element urges the lever to pivot in a direction to move the outer member to its upper position.

U.S. Pat. No. 6,119,627 ('627 Patent), which issued to Banyas et al., discloses a Rodent Repelling Bird Feeder. The '627 Patent teaches a cylindrical rodent repelling bird feeder having an annular perch around the feeder and an electric motor geared to the perch. The perch is coupled to the electric motor and the electric motor is reciprocatively mounted in the bird feeder so that when a rodent of excessive weight alights upon the perch the motor is pulled against a resistance spring and a switch is caused to close, thereby engaging the motor which rotates the perch to dislodge the rodent therefrom.

U.S. Pat. No. 6,543,384 ('384 Patent), which issued to Cote, discloses a Bird Feeder Having Lower Movable Shroud. The '384 Patent teaches a squirrel proof bird feeder wherein there is provided a lower movable shroud which extends about a lower portion of the feed container having feed access openings therein, a spring member biasing the shroud to a position wherein feed container access openings and shroud access openings are substantially aligned while permitting the shroud access opening to move out of alignment with the feed container access opening when a predetermined weight is placed on the shroud.

From a review of these prior art disclosures and from a general consideration of other well known prior art teachings, it will be seen that most prior art anti-squirrel bird feeder designs incorporate either a linear closure mechanism based on a linear spring or a nonlinear closure mechanism based on a teeter-totter, mass balance. It will be seen that none of the prior art disclosures teach a non-linear, four-bar closure mechanism, which four-bar closure is of critical importance to the present invention and described in more detail hereinafter.

Generally, nonlinear closure mechanisms are preferable to linear closure mechanisms for anti-squirrel bird feeder applications. A linear mechanism closes linearly with load, i.e., closure is proportional to load; therefore, a linear closure mechanism is usually set heavy, i.e., set to reach full closure at a load equal to the weight of an adult squirrel, for example. The reason for a heavy setting is that a light setting can result in significant closure when only a few birds are feeding, restricting access to seed, thereby diminishing the utility of the feeder. The unsatisfactory consequence of a heavy setting, however, is that an immature or lightweight squirrel could defeat the closure mechanism. These properties of the linear mechanism are not present in nonlinear mechanisms making nonlinear mechanisms more desirable.

A nonlinear closure mechanism usually closes minimally until a critical point is reached when subsequently its closure occurs immediately and fully; therefore, it is far more desirable than a linear closure mechanism. The four-bar mechanism of the present invention is superior to a teeter-totter, mass balance type mechanism in that its action is less susceptible to adverse frictional effects that inhibit/prevent immediate and full closure; therefore, a four-bar mechanism is more robust as explained in the following paragraphs.

The four-bar mechanism's stability is based in geometry rather than mass balance. The unequilibrated moment about the pivot pin of a teeter-totter, mass balance mechanism is a function of the small difference between the squirrel's mass and the set mass; therefore a small amount of pivot pin friction could defeat the teeter-totter, mass balance mechanism by precluding closure. Noteworthy is that at least one teeter-totter design judged "undefeatable" has indeed been defeated by squirrels. Video taped documentation evidences two squirrels working in unison to defeat the teeter-totter type design. The reader should reference: "Daylight Robbery II", which aired in the United States on the Discovery Channel on Nov. 26, 1995, having been produced by the British Broadcasting Corporation Worldwide Limited in 1995 as presented by Dr. Jessica Holm. One squirrel was observed to counterbalance the other preventing closure of the gate to the feeder's seed. Subsequently, one or the other of the two consumed the feeder's seed. Such cooperative action cannot defeat the four-bar mechanism of the present invention. The frictional moment about a pivot pin of the four-bar mechanism is acted upon by a function of structure's dead load plus its live load; therefore a four-bar mechanism can accommodate much larger pivot pin friction without significant adverse effects. Recovery of the four-bar mechanism is also more robust than the teeter-totter, mass balance mechanism because it is less affected by friction. Recovery at closure is based in geometry not mass balance, as the following specifications will clarify. Another advantage of the four-bar mechanism is that, unlike a teeter-totter, mass balance mechanism, the four-bar mechanism is not limited in feeder and closure design, which is usually bound to rectangular box-like structure.

SUMMARY OF THE INVENTION

It is thus an object of the present invention to provide a nonlinear, four-bar closure mechanism or a four-bar spring assembly for use in combination with an anti-squirrel bird feeder, which anti-squirrel bird feeder necessarily incorporates other inventive attributes in support of or in cooperation with the four-bar spring assembly. It is a further object of the present invention to provide a partitioned, removable (drop out-type) hopper, which allows for segregation of feed or seed types, easy cleaning and easy refilling even if the bird feeder is situated above a user's head. Further, it is an object of the present invention to provide feed gauge means or a status flag that indicates to the user whether the feed or seed hopper is full or empty. Still further, it is an object of the present invention to provide at least one surround perch assembly, as opposed to singular post-type perches, attached to a shroud assembly, which surround perch assembly allows uninhibited access to the circumjacent hopper tray. The surround perch assembly thus accommodates a multitude of small and medium sized birds and enhances viewing by bird watchers.

It is a further object of the present invention to provide a conical roof or shroud cap of such slope that it invites a squirrel to alight atop the shroud cap yet further functions to shed snow, water, and debris. Squirrels attempting to gain access to the feed tray of the present invention by positioning themselves atop the shroud cap will be thwarted in their attempts, since the squirrel's weight will cause immediate and full closure of the feeder. Still further, it is an object of the present invention to provide a coaxially corrugated bridge which serves not only as a flexible structural bridge to mitigate loading of critical parts whenever the shroud is subjected to an extreme load, but also as an internal umbrella for the feed hopper to preclude rain soaked seed or feed. A further object of the present invention is to provide a feed tray screen for reducing waste. The anti-flick grating or screen of the feed tray functions to thwart birds from flicking seeds out of the feed or hopper tray. Further, it is an object of the present invention to provide damage resistant construction resulting from the cooperative association of the coaxially corrugated bridge and self-aligning means. When conjoined in action, the corrugated bridge and the self-aligning means limit critical item stresses to within the elastic range when excessive lateral or vertical loads are applied to the perch assembly.

To achieve these and other readily apparent objectives, the present invention provides a bird feeder apparatus for providing a readily available supply of feed for birds. The bird feeder apparatus essentially comprises a telescopic-operational assemblage, a shroud assembly, and a hopper assembly. The telescopic-operational assemblage comprises a support assembly and a drive assembly. The support assembly essentially comprises a hopper scale assembly and hopper attachment means. The hopper scale assembly essentially comprises a support member (having support member length) and a scale spring. The scale spring is attached to the inferior end of the support member and the hopper attachment means is attached to the inferior end of the scale spring.

The drive assembly essentially comprises a four-bar spring assembly and a push rod shaft assembly. The four-bar spring assembly essentially comprises two superior bars, two inferior bars, first and second trunnion assemblies and a bar-joining junction assembly. The superior bars are pivotally connected to one another at the superior ends thereof by the first trunnion assembly and the inferior bars are pivotally connected to one another at the inferior ends thereof by the second trunnion assembly. The bar-joining junction assembly joins the inferior ends of the superior bars and the superior ends of the inferior bars. The junction assembly essentially comprises pivot attachment means pivotally connecting the superior bars to the inferior bars and spring means connecting the pivot attachment means. The pivot attachment means may thus have either a relaxed distance therebetween or a displaced distance therebetween, which relaxed distance and displaced distance are defined by the spring means when in either a relaxed or displaced state.

The superior bars thus have a first angle therebetween at the superior pivot junction and the inferior bars have a second angle therebetween at the inferior pivot junction. The first and second angles are substantially equal to one another at any degree of displacement. The four-bar spring assembly thus provides a nonlinear, geometrically-based, closure mechanism driven by external load forces acting through the superior and inferior bars and countered by restorative forces in the spring means.

The superior and inferior trunnion assemblies each comprise a shaft-receiving aperture and shaft-fastening means. The push rod shaft assembly essentially comprises a superior shaft member, an inferior shaft member, an annular spring cup, and a recovery spring. The shaft-receiving apertures receive the superior and inferior shaft members, the superior shaft member being telescopically received in the inferior shaft member. The shaft-fastening means fasten the superior and inferior trunnion assemblies to the superior and inferior shaft members, respectively. The spring cup is affixed to the inferior shaft member adjacent the superior end thereof and the recovery spring is seated upon the spring cup intermediate the spring cup and the superior trunnion assembly for providing additional restorative spring force to the otherwise displaced four-bar assembly.

The shroud assembly essentially comprises a shroud bridge assembly and a shroud body. The shroud bridge assembly essentially comprises a corrugated shroud bridge, a trim weight, a collar, and collar fastening means. The shroud bridge is attached to the shroud body adjacent the superior end thereof. The superior end of the superior shaft member is received in the collar and the collar fastening means secure the superior shaft member to the shroud bridge.

The hopper assembly essentially comprises a substantially cylindrical hopper body, a substantially circular hopper tray, a plurality of vertical hopper partitions, and a shaft-receiving sleeve. The diameter of the hopper body is lesser in magnitude than the diameter of the shroud body for telescopic receipt therein. The inferior end of the hopper body comprises spacer-attachment means. The spacer-attachment means fixedly and concentrically attach the hopper tray to the inferior end of the hopper body in spaced relation thereto thereby defining feed outlet ports. The hopper partitions radially extend from the hopper body to the shaft-receiving sleeve for maintaining the shaft-receiving sleeve in concentric relation with the hopper body. The hopper partitions define a plurality of feed-receiving compartments, the feed-receiving compartments each having a substantially uniform feed-receiving volume. The hopper assembly is telescopically received in the shroud body, inferior portions of the push rod shaft assembly extending through the shaft-receiving sleeve. The support assembly extends through the push rod shaft assembly. As earlier noted, the scale spring is fixedly attached to the hopper attachment means, which hopper attachment means function to maintain the hopper assembly in telescopic relation to the shroud body.

The bird feeder further includes a perch assembly comprising a perch ring and ring attachment means. The perch ring has a ring diameter, which ring diameter is greater in magnitude than the diameter of the hopper try. The ring attachment means fixedly attach the perch ring to the shroud body adjacent the hopper tray for enabling birds of all sorts to perch and feed from the hopper tray. Further, the bird feeder may comprise feed gauge means or signaling flag assembly for indicating to a user the quantity of feed remaining in the hopper assembly. In this regard, the support member comprises pole-receiving structure. When the bird feeder is assembled, the pole-receiving structure is spatially located adjacent the superior end of the superior shaft member. The feed gauge means or flag assembly comprises a flag pole, a flag and pole attachment means. The flag pole comprises a flag end and a pole attachment end. The pole attachment means attach the pole attachment end to the pole-receiving structure and the flag is attached to the flag end for indicating to passersby the feed quantity in the hopper assembly.

The shroud assembly further includes a conical shroud cap comprising a superior cap surface, an inferior cap surface, a basal cone diameter, and a push rod-receiving aperture extending from the superior cap surface to the inferior cap surface. The basal cone diameter is greater in magnitude than the shroud body diameter and the superior shaft member extends through the push rod-receiving aperture. The superior end of the superior shaft member thus extends upwardly from the push rod-receiving aperture. The push rod-receiving aperture preferably comprises a spherical bearing for allowing the bird feeder to withstand unbalanced load forces directed against the shroud assembly.

The hopper tray comprises an anti-flick screen that extends radially from the inferior end of the hopper body for preventing birds from flicking seed from the hopper tray. The hopper tray further comprises debris outlet means, which means permit debris, but not seed, to fall out of the tray precluding clogging of the feed outlet ports in the hopper assembly.

A latch assembly comprising a latch body and a spring-loaded latch pawl may define the hopper attachment means of the support assembly. The latch pawl is compressible for releasing the hopper assembly from telescopic relation with the shroud body and extendable for maintaining the hopper assembly in telescopic relation with the shroud body.

Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief description of my patent drawings, as follows:

FIG. 4 is a perspective view of the preferred embodiment of the anti-squirrel bird feeder with parts removed to show the drive mechanism assembly in a load-free, unactuated state with a feed-barren hopper assembly as indicated by a raised flag.

FIG. 5 is a perspective view of the telescopic-operational assemblage with parts removed to show the hopper scale assembly.

FIG. 6 is a fragmentary perspective view of the inferior portion of the telescopic-operational assemblage, showing (1) the superior shaft member telescopically received in the inferior shaft member, (2) the hopper scale assembly, and (3) the latch assembly.

FIG. 9 is a perspective view of the four-bar assembly in a relaxed, unactuated state showing a bar-joining junction assembly with exaggeratedly-spaced extension coil spring members.

FIG. 10 is a perspective view of the four-bar assembly of FIG. 9 in a displaced, actuated state.

FIG. 11 is a perspective view of the telescopic-operational assemblage showing the four-bar assembly in a displaced, actuated state with parts removed to show the superior shaft bottom end juxtaposed in superior adjacency to the latch assembly.

FIG. 12 is an enlarged fragmentary perspective view of an inferior portion of the telescopic-operational assemblage with parts removed to show the latch assembly preventing further downward displacement of the superior shaft member.

FIG. 19 is a perspective view of the preferred embodiment of the hopper assembly in a partially disassembled state.

FIG. 20 is a perspective view of the hopper assembly of FIG. 19 in an assembled state.

FIG. 21 is an enlarged perspective view of the hopper assembly of FIG. 20 showing a debris outlet screen.

FIG. 22 is a fragmentary perspective view of the hopper assembly being assembled with an inferior portion of the telescopic-operational assemblage (with parts removed) to show a latch pawl of the latch assembly in a retracted state to allow telescopic insertion of the hopper assembly into the anti-squirrel bird feeder.

FIG. 23 is a fragmentary perspective view of the hopper assembly in an assembled state with the inferior portion of the telescopic-operational assemblage (with parts removed) to show the latch pawl of the latch assembly in an extended state to maintain the hopper assembly in telescopic relation.

FIG. 24 is a top plan view of the hopper assembly.

FIG. 25 is a side plan view of the hopper assembly.

FIG. 26 is a cross-sectional view of the hopper assembly as shown in FIG. 26.

FIG. 27 is a bottom plan view of the hopper assembly.

FIG. 35 is a graphical representation of the four-bar spring assembly's recovery spring deflection (in inches) as a function of the acute bar angle from vertical (in degrees).

FIG. 40(a) is a fragmentary perspective view of the alternative hopper assembly shown in FIG. 36.

FIG. 41(a) is a fragmentary perspective view of the alternative shroud assembly shown in FIG. 36.

FIG. 44 is a perspective view of the hopper tray of the alternative hopper assembly as shown in FIG. 36.

FIG. 44(a) is a top plan view of the hopper tray of the alternative hopper assembly shown in FIG. 44.

FIG. 44(b) is a cross-sectional side view of the hopper tray of the alternative hopper assembly shown in FIG. 44(a).

PREFERRED COMPONENT LISTING

Figure 1:
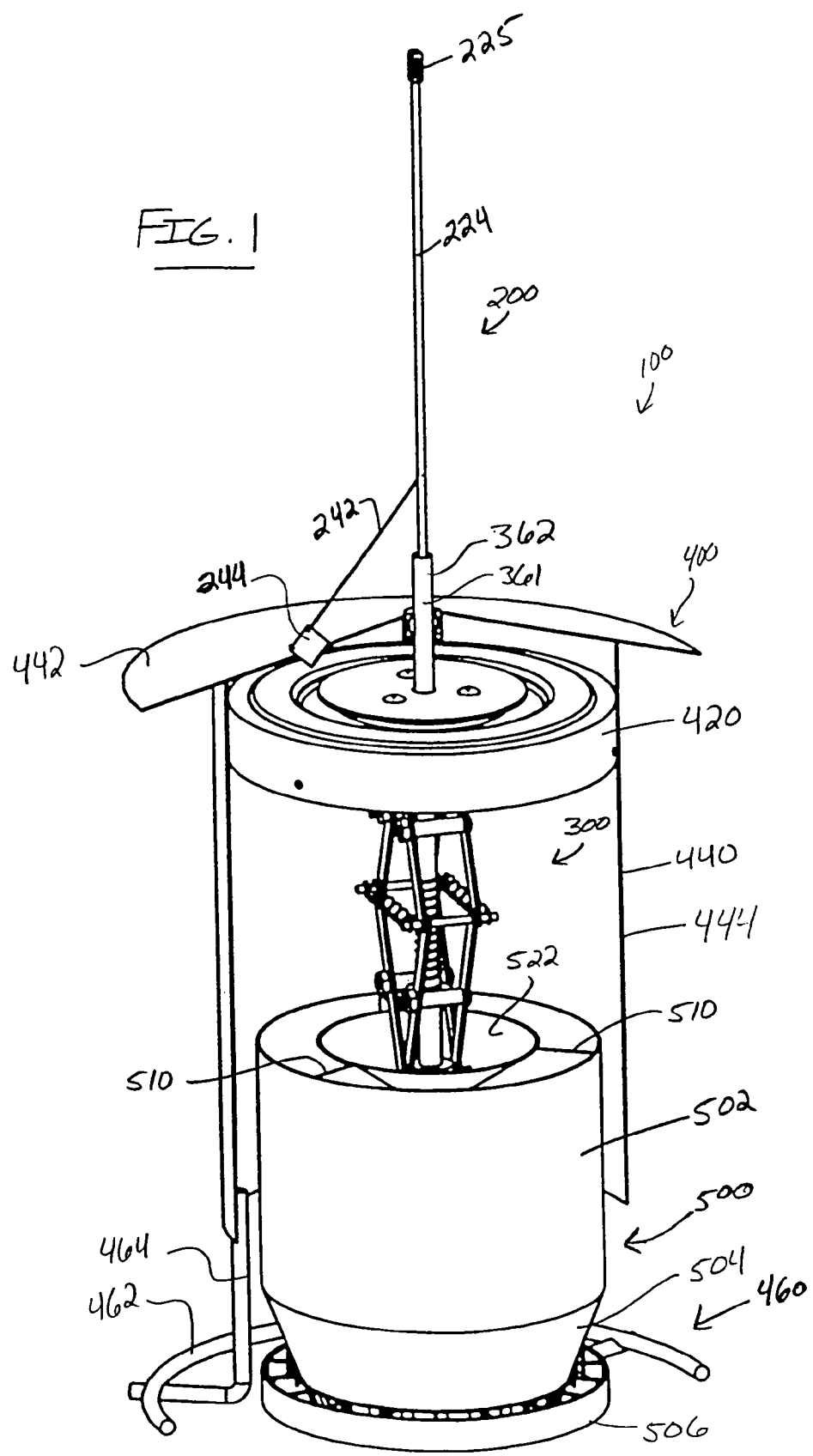
FIG. 1 is a perspective view of the preferred embodiment of the anti-squirrel bird feeder with parts removed to show the drive mechanism assembly in a load-free, unactuated state with a feed-laden hopper assembly as indicated by a lowered flag.

Bird feeder 100
  Support assembly 200
    Hopper scale assembly 220
      Pole-receiving structure 222
      Support member 224
      Support member shackle 225
      Scale spring 226
      Overload cable 227
      Superior scale pin 228
      Inferior scale pin 230
    Flag assembly 240
      Flag pole 242
      Flag 244
      Flag pin 246
    Latch assembly 260
      Latch body 262
      Latch pawl 264
      Latch spring 266
      Latch spring retaining pin 268
  Drive assembly 300
    Four-bar spring assembly 320
      Links 322
      Spacers 324
      Spacers 325
      Spacer screws 326
      Spacer nuts 328
      Junction pins 330
      Junction springs 332
      Trunnion assemblies 334
        Trunnion rings 336
        Shaft-receiving aperture 337(a)
        Shaft-receiving aperture 337(b)
        Trunnion pins 338
        Trunnion set screw 340
    Push rod shaft assembly 360
      Superior shaft member 361
      Superior shaft top end 362
      Superior shaft bottom end 366
      Superior shaft length 364
      Inferior shaft member 371
      Inferior shaft top end 372
      Inferior shaft bottom end 376
      Inferior shaft length 374
      Annular spring cup 384
      Recovery spring 386
  Shroud assembly 400
    Shroud bridge assembly 420
      Shroud bridge 422
      Trim weight 424
      Trim weight screws 426
      Collar 428
    Shroud housing assembly 440
      Shroud cap 442
      Spherical bearing 443
      Shroud body 444
    Perch assembly 460
      Perch ring 462
      Perch legs 464
  Hopper assembly 500
    Hopper body 502
    Hopper cone 504
    Hopper tray 506
    Shaft-receiving sleeve 508
    Hopper partitions 510
    Anti-flick screen 512
    Debris outlet screen 514
    Feed outlet ports 516
    Planar feed-supporting surface 518
    Cylindrical feed-supporting surface 520
    Hopper partition 522

| ADDITIONAL COMPONENT LISTING: | |
| --- | --- |
| Bird feeder | 1000 |
| Snap ring | 1004 |
| Slits | 1005 |
| Integral Bushing member | 1006 |
| Inferior conical section | 1007 |
| Superior partition surface | 1008 |
| Inferior partition surface | 1009 |
| Hopper assembly extraction tool | 1010 |
| Assembly support platform | 1011 |
| Latch release means | 1012 |
| Extension portion | 1013 |
| Two-bar spring assembly | 1020 |
| Medial bar | 1030 |
| Lateral bar | 1031 |
| Roller pin | 1034 |
| Rollers | 1035 |
| Mirror plane assembly | 1040 |
| Step | 1041 |
| Washer | 1050 |

DETAILED DESCRIPTION OF THE PREFERRED EMBODIMENT

Referring now to the drawings, the preferred embodiment of the present invention concerns anti-squirrel bird feeder 100, which bird feeder 100 is generally illustrated and referenced in FIGS. 1–4, and 8(a)–8(d). Bird feeder 100 preferably comprises a number of sub-assemblies, namely, a telescopic-operational assemblage; a shroud assembly 400 as illustrated and referenced in FIGS. 1–4, 8(a)–8(d), and 28–30; and a hopper assembly 500 as illustrated and referenced in FIGS. 1–4, 8(a)–8(d), 19–27, 29 and 30. The telescopic-operational assemblage preferably comprises a support assembly 200 as illustrated and referenced in FIGS. 1–7, 8(a)–8(d), 11, and 12; and a drive assembly 300 as illustrated and referenced in FIGS. 1–5, 11, 29, and 30. Given the relatively large number of assemblies and subassemblies that comprise anti-squirrel bird feeder 100, a brief description of each assembly along with identifying reference numerals is provided directly hereunder.

Figure 13:
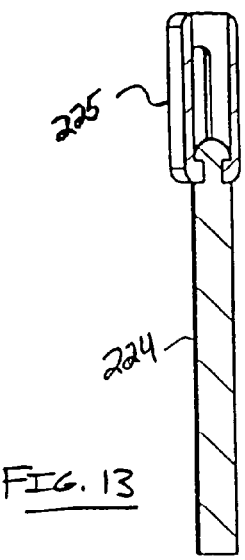
FIG. 13 is a fragmentary side view of the superior end of the support member showing a support member shackle with parts removed to show a matter-receiving aperture.
Figure 14:
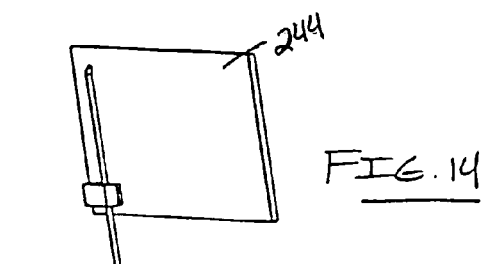
FIG. 14 is a fragmentary side view of the support member length showing the flag assembly in a raised state.
Figure 15:
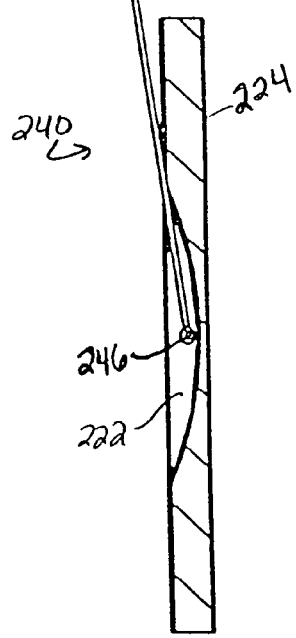
FIG. 15 is a fragmentary side view of the junction of the inferior end of the support member and the superior end of the hopper scale assembly.
Figure 16:
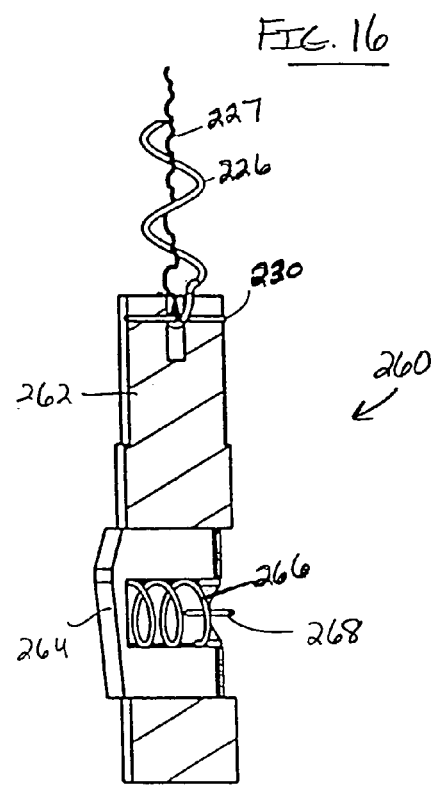
FIG. 16 is a fragmentary side view of the junction of the inferior end of the hopper scale assembly and the latch assembly with parts removed to show inner components of the latch assembly.
Figures 17, 18:
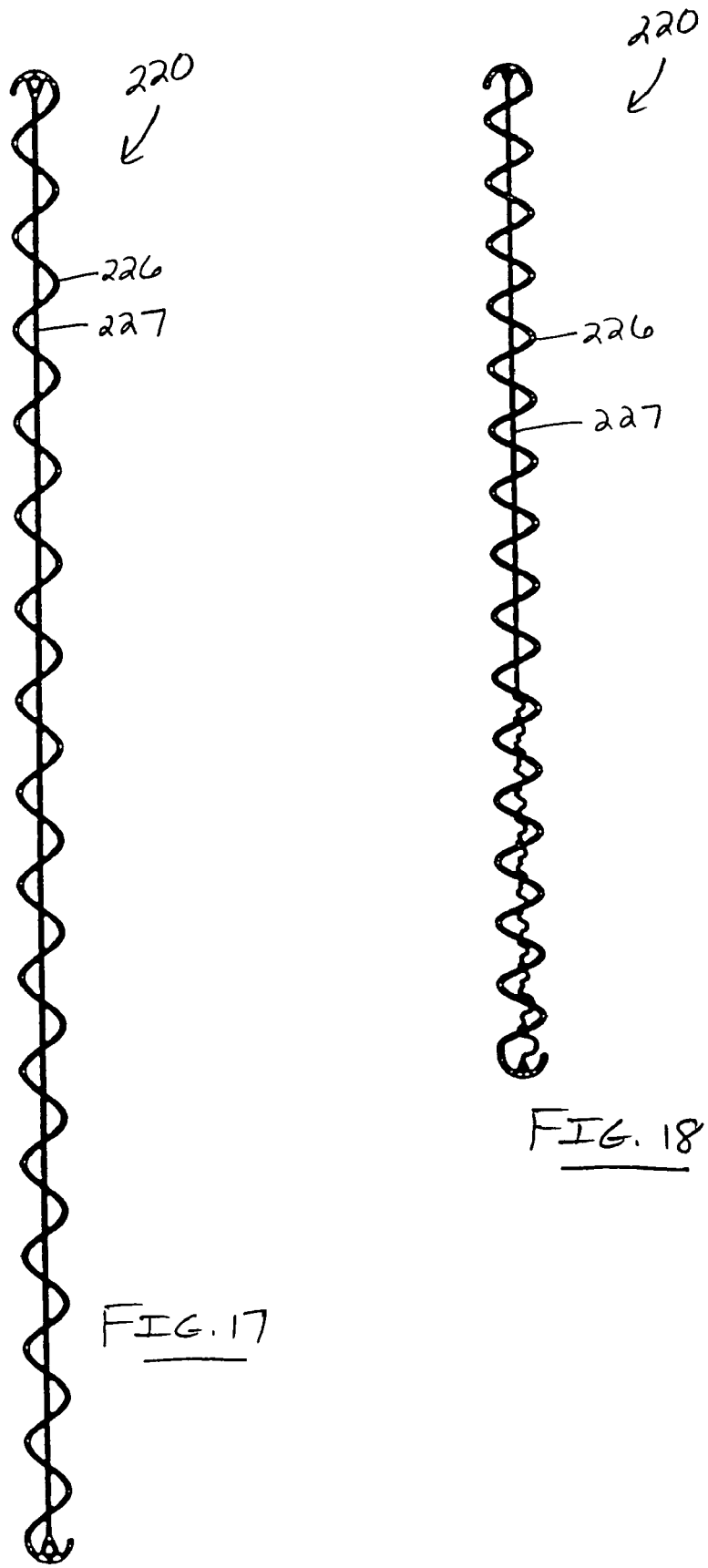
FIG. 17 is a side view of the hopper scale assembly showing the hopper scale assembly in a maximally displaced state.
FIG. 18 is a side view of the hopper scale assembly of FIG. 17 showing the hopper scale assembly in an intermediately displaced state.

Support assembly 200 comprises a hopper scale assembly 220 as illustrated and referenced in FIGS. 17 and 18; a flag assembly 240 as illustrated and referenced in FIG. 14; and a latch assembly 260 as illustrated and referenced in FIGS. 5–7, 11, 12, 16, 22, 23, 29, and 30. Hopper scale assembly 220 preferably comprises a hook, a support member 224 as illustrated and referenced in FIGS. 1–8(d), 11–14, 22, 23, 29, and 30; a support member shackle 225 as illustrated and referenced in FIGS. 1–4, 8(a)–8(b), and 13; a scale spring 226 or scale spring means as illustrated and referenced in FIGS. 5–7, 12, 15–18, 22, and 23; an overload cable 227 as illustrated and referenced in FIGS. 5–7, 12, 15–18, 22, and 23; a superior scale pin 228 as illustrated and referenced in FIG. 15; and an inferior scale pin 230 as illustrated and referenced in FIG. 16. Flag assembly 240 preferably comprises a flag pole 242 as illustrated and referenced in FIGS. 1–4, 7, 8(a)–8(d) and 14; a flag 244 as also illustrated and referenced in FIGS. 1–4, 7, 8(a)–8(d) and 14; and a flag pin 246 as illustrated and referenced in FIG. 14. Latch assembly 260 preferably comprises a latch body 262 as illustrated and referenced in FIGS. 5–7, 11, 12, 16, 22, and 23; a latch pawl 264 as also illustrated in FIGS. 5–7, 11, 12, 16, 22, and 23; a latch spring 266 as illustrated in FIG. 16; and a latch spring-retaining pin 268 as illustrated in FIG. 16.

Drive assembly 300 comprises a four-bar spring assembly 320 as illustrated and referenced in FIGS. 2, 3, 5, 9–11, 29, and 30; and a push rod shaft assembly 360 as illustrated and referenced in FIGS. 2, 3, 5, 11, 29, and 30. Four-bar spring assembly 320 preferably comprises a plurality of rigid links 322; a plurality of rigid spacers 324 and 325; a plurality of spacer screws 326; a plurality of spacer nuts 328; two rigid junction pins 330 or pivot attachment means; two four-bar springs or junction springs 332 or bar spring means; and two trunnion assemblies 334 as illustrated and referenced in FIGS. 9 and 10. Each trunnion assembly 334 preferably comprises a trunnion ring 336, two collinear, laterally-spaced trunnion pins 338 and a trunnion set screw 340 as further illustrated in FIGS. 9 and 10.

Figure 29:
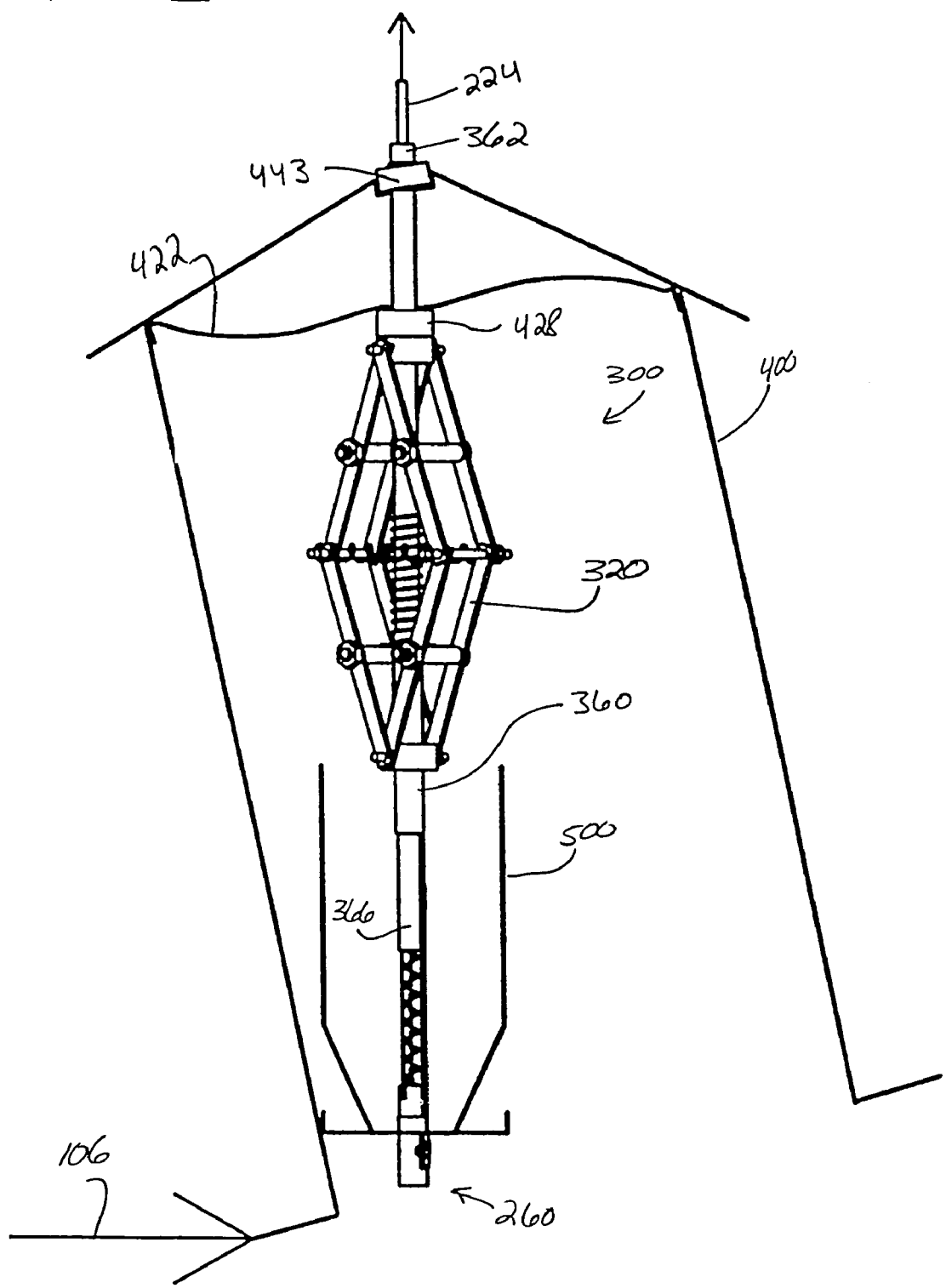
FIG. 29 is a side perspective view of a vertically oriented telescopic-operational assemblage in an assembled state with a structurally minimized shroud housing assembly and a structurally minimized hopper assembly showing conjoined action of the shroud bridge and the spherical bearing to mitigate damage to the bird feeder caused by a large lateral load applied to the bird feeder.
Figure 30:
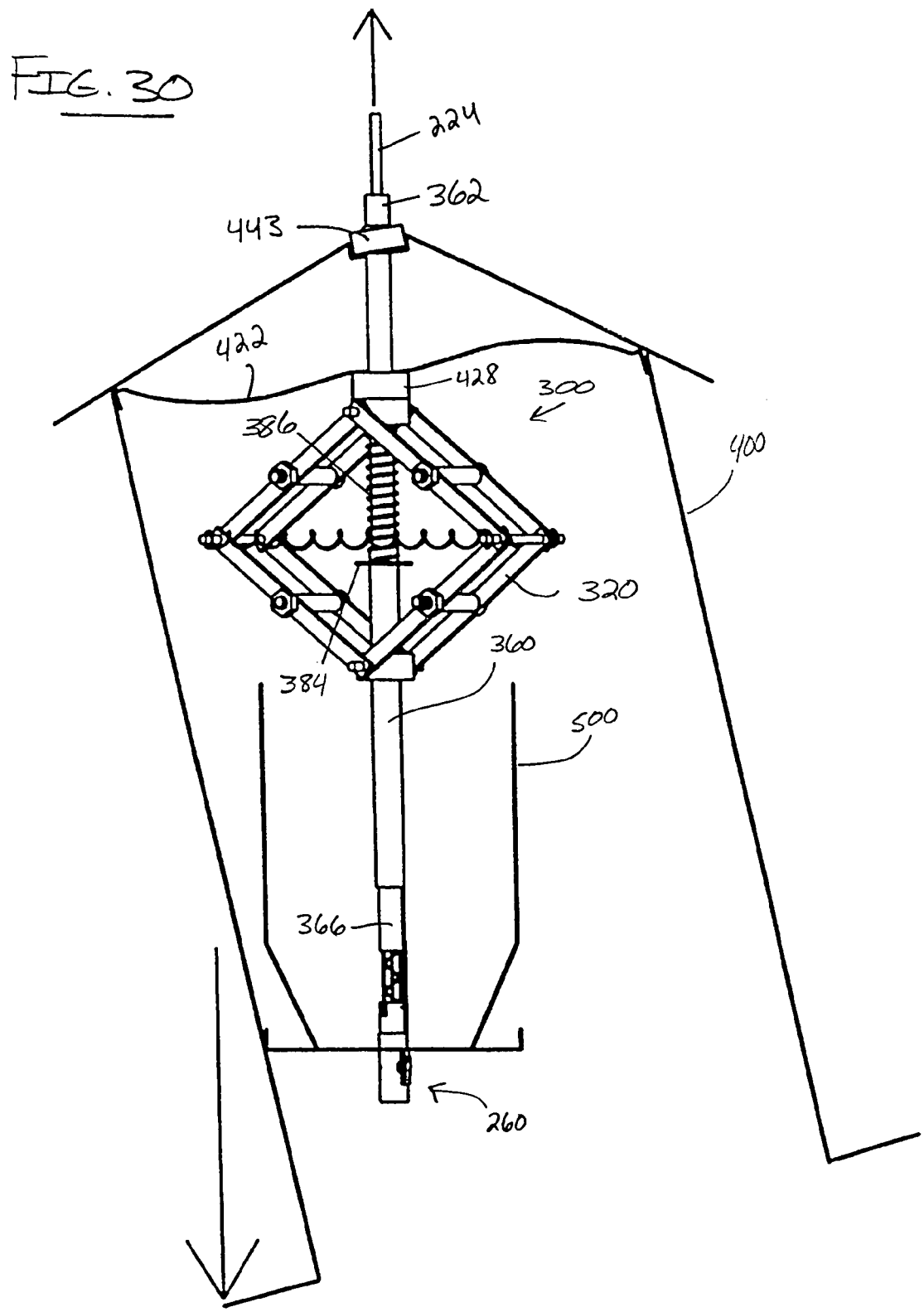
FIG. 30 is a side perspective view of a vertically oriented telescopic-operational assemblage in an assembled state with a structurally minimized shroud housing assembly and a structurally minimized hopper assembly showing conjoined action of the shroud bridge and the spherical bearing to mitigate damage to the bird feeder from a large offset vertical load applied to the bird feeder.
Figure 31:
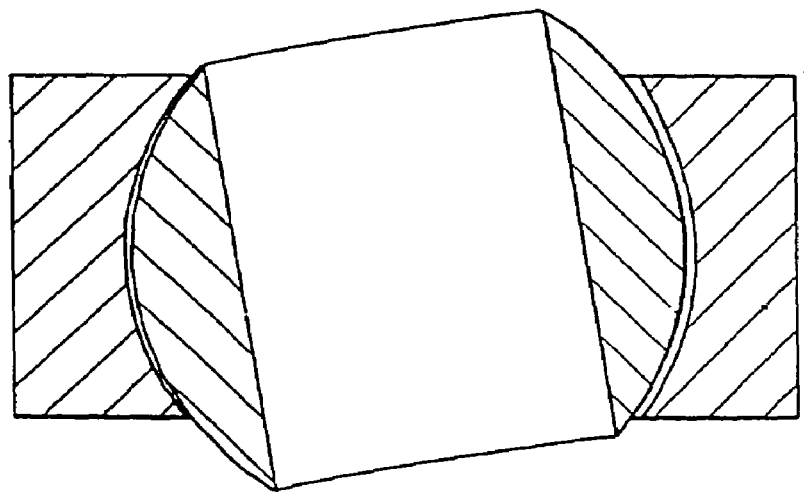
FIG. 31 is an enlarged cross sectional side view of the spherical bearing of FIGS. 29 and 30 showing the spherical bearing in a misaligned, damage-mitigating state.
Figure 32:
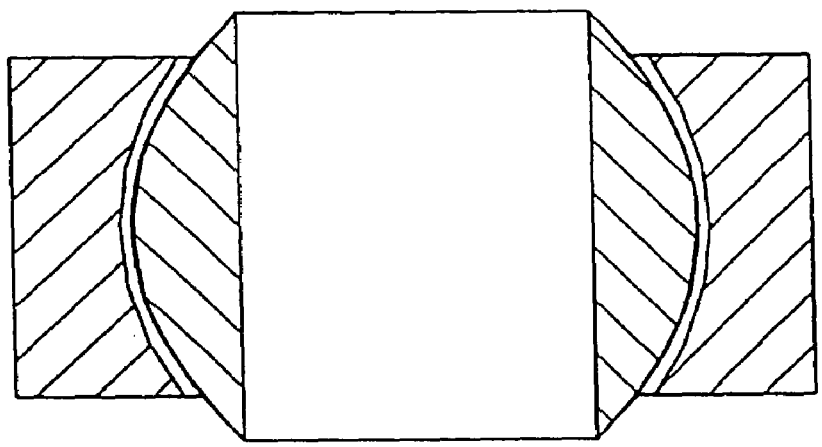
FIG. 32 is a cross sectional side view of the spherical bearing in an aligned state.

Push rod shaft assembly 360 preferably comprises a superior shaft member 361 as illustrated and referenced in FIGS. 1, 2, 4–8(d), 11, 12, 22, 23, and 29; an inferior shaft member 371 as illustrated and referenced in FIGS. 5–7, 11, 12, 22, and 23; an annular spring cup 384 as illustrated and referenced in FIGS. 5, 11, and 30, and a recovery spring 386 as illustrated and referenced in FIGS. 5, 11, and 30. Superior shaft member 361 comprises a superior shaft top end 362 as illustrated and referenced in FIGS. 1, 2, 4, 5, 7–8(d), 11, and 28–30; a superior shaft bottom end 366 as illustrated and referenced in FIGS. 5–7, 11, 12, 22, 23, 28–30; and a superior shaft length 364 as generally referenced in FIG. 28. Inferior shaft member 371 comprises an inferior shaft top end 372 as illustrated and referenced in FIGS. 5, 6, and 11; an inferior shaft bottom end 376 as illustrated and referenced in FIGS. 6 and 12; and an inferior shaft length 374 as generally referenced in FIG. 6.

Shroud housing 400 comprises a shroud bridge assembly 420; a shroud housing assembly 440 as illustrated and referenced in FIGS. 1–4, 8(a)–8(d), and 28; and a perch assembly 460 as illustrated and referenced in FIGS. 1–4, 8(a)–8(d), and 28. Shroud bridge assembly 420 preferably comprises a shroud bridge 422 as illustrated and referenced in FIGS. 28–30; a trim weight 424 as illustrated and referenced in FIG. 28; a plurality of trim weight screws 426, one of which has been illustrated and referenced in FIG. 28; a collar 428 as illustrated and referenced in FIGS. 29 and 30; and a collar set screw (not specifically referenced). Shroud housing assembly 440 preferably comprises a shroud cap 442 as illustrated and referenced in FIGS. 1–4, 8(a)–8(d), and 28; a shroud body 444 as also illustrated and referenced in FIGS. 1–4, 8(a)–8(d), and 28; and a plurality of shroud screws. Perch assembly 460 preferably comprises a perch ring 462 or perch member as illustrated and referenced in FIGS. 1–4, 8(a)–8(d), and 28; a plurality of perch legs 464 as also illustrated and referenced in FIGS. 1–4, 8(a)–8(d), and 28; and a plurality of perch screws or perch member attachment means (not specifically referenced).

Hopper assembly 500 preferably comprises a hopper body 502 as illustrated and referenced in FIGS. 1–4, 8(a)–8(d), and 19–26; a hopper cone 504 as illustrated and referenced in FIGS. 1–4, 8(a)–8(d), 19–23, 25, and 26; a hopper tray 506 as illustrated and referenced in FIGS. 1–4, 8(a)–8(d), 19–23, and 25–27; a shaft-receiving sleeve 508 as illustrated and referenced in FIGS. 8(b)–8(d), 19–24, 26, and 27; a plurality of hopper partitions 510 as illustrated and referenced in FIGS. 1–4, 8(a)–8(d), 19–24, and 26; an anti-flick screen 512 as illustrated and referenced in FIGS. 19, 20, 22, and 23; and a debris outlet screen 514 as illustrated and referenced in FIGS. 21–23.

FIG. 1 illustrates the internal and external configuration of the assembled bird feeder apparatus 100 when the bird feeder's hopper is not empty. The cut outs enable the viewer to view the internal configuration. The viewer may wish to compare FIG. 1 with FIG. 4. The viewer will note that the only difference between FIG. 1 and FIG. 4 is in the external configuration, namely the flag position. FIG. 1 depicts flag 244 in a lowered position signaling to passersby that hopper assembly 500 is feed-laden (not empty) and FIG. 4 depicts flag 244 in a raised state indicating to passersby that hopper assembly 500 is feed-barren (empty).

Figure 2:
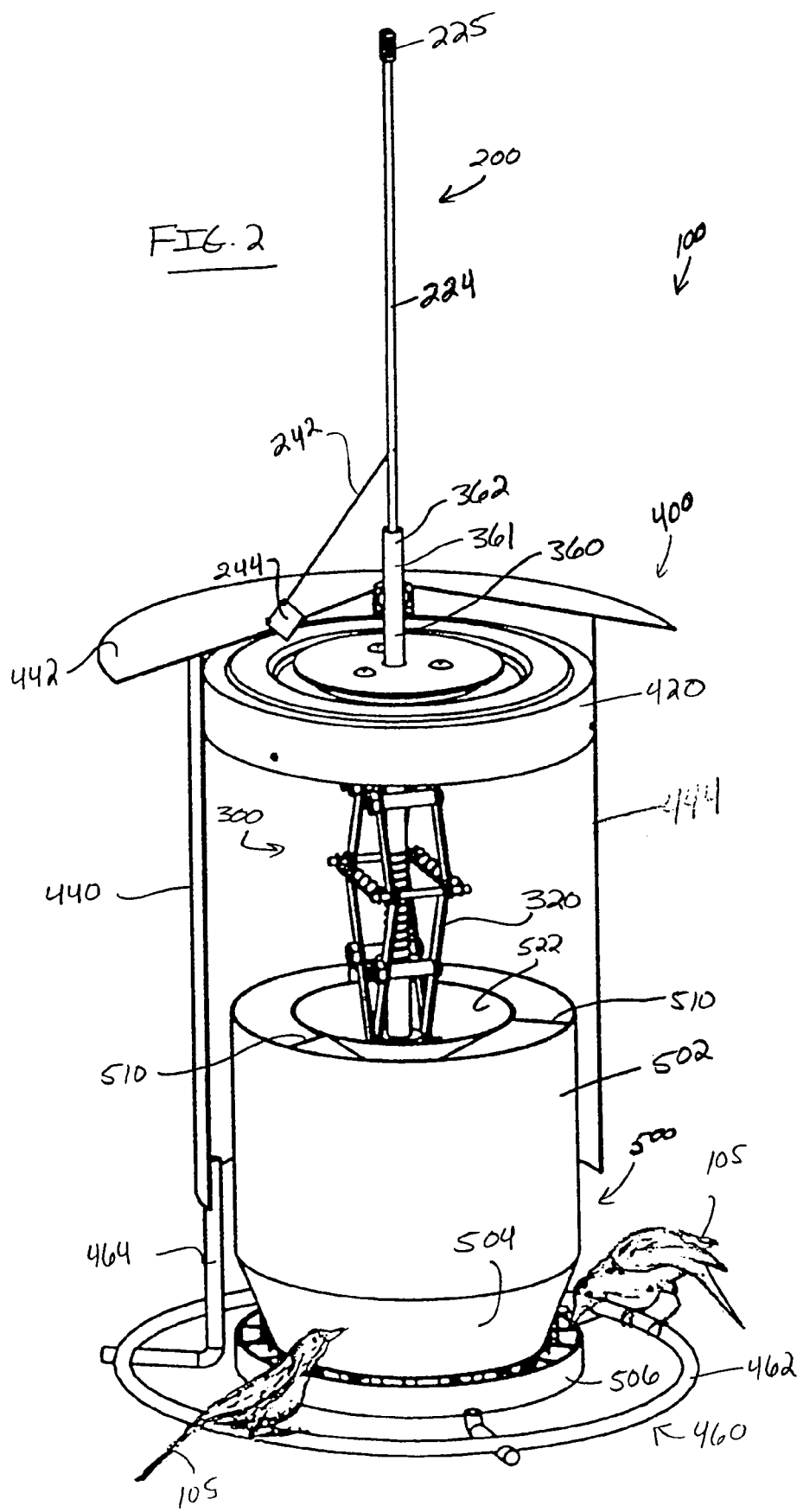
FIG. 2 is a perspective view of the preferred embodiment of the anti-squirrel bird feeder with parts removed to show the drive mechanism assembly in a loaded, unactuated state with a feed-laden hopper assembly as indicated by a lowered flag.
Figure 3:
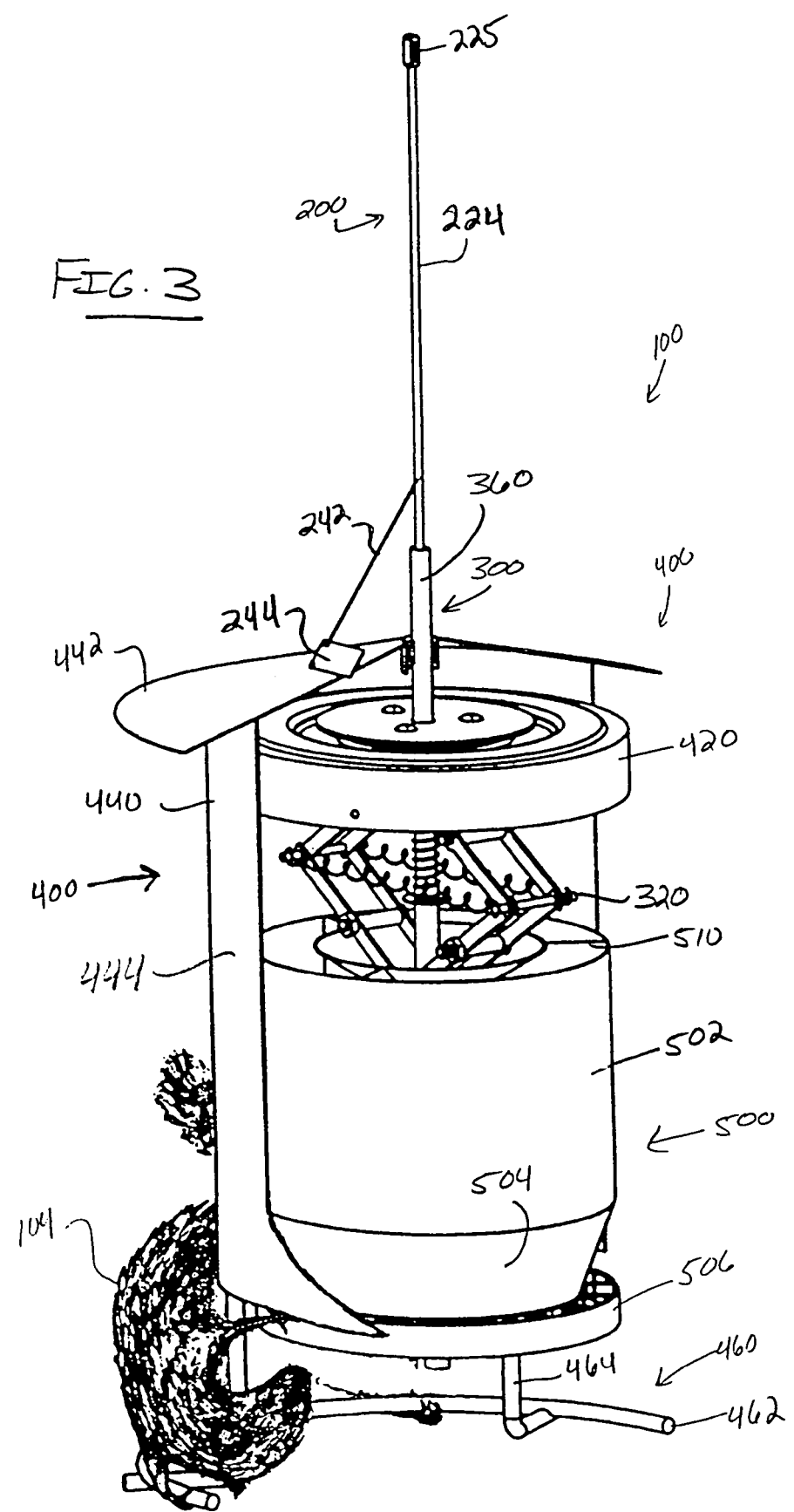
FIG. 3 is a perspective view of the preferred embodiment of the anti-squirrel bird feeder with parts removed to show the drive mechanism assembly in a loaded, actuated state with a feed-laden hopper assembly as indicated by a lowered flag.

FIG. 3 illustrates the internal and external configuration of bird feeder apparatus 100 after the telescoping action has precluded access to hopper tray 506 due to the shroud load exceeding the a preset maximum (as caused by the added weight of an adult squirrel 104). The cut outs enable the viewer to view the internal configuration. The viewer should note that flag 244 is lowered, four-bar spring assembly 320 mechanism is collapsed, and access to hopper tray 506 is restricted. It will be further noted that in this state, the flag will be lowered regardless of the quantity of feed present in the hopper. FIG. 2, by comparison, illustrates the internal and external configuration of bird feeder apparatus 100 before the telescoping action has precluded access to hopper tray 506. FIG. 2 illustrates a minimal applied load (as caused by the added weight of two small birds 105) that does not exceed the preset maximum. The viewer should further note perch assembly 460 in FIGS. 2 and 3.

FIG. 5 illustrates the telescopic-operational assemblage (drive assembly 300 and support assembly 200 in an assembled state) that enables the telescoping action of shroud assembly 400 relative to hopper assembly 500. The telescoping action both allows access to hopper tray 506 and restricts access to hopper tray 506. FIG. 6 illustrates how the bird feeder loads as referenced at 101 are transmitted through scale spring 226 to support member 224. In addition, FIG. 6 illustrates how overload cable 227 is slack when the scale spring load as referenced at 102 does not exceed the maximum load capacity of scale spring 226. Vector 103 represents the tension in support member 224.

Figure 7:
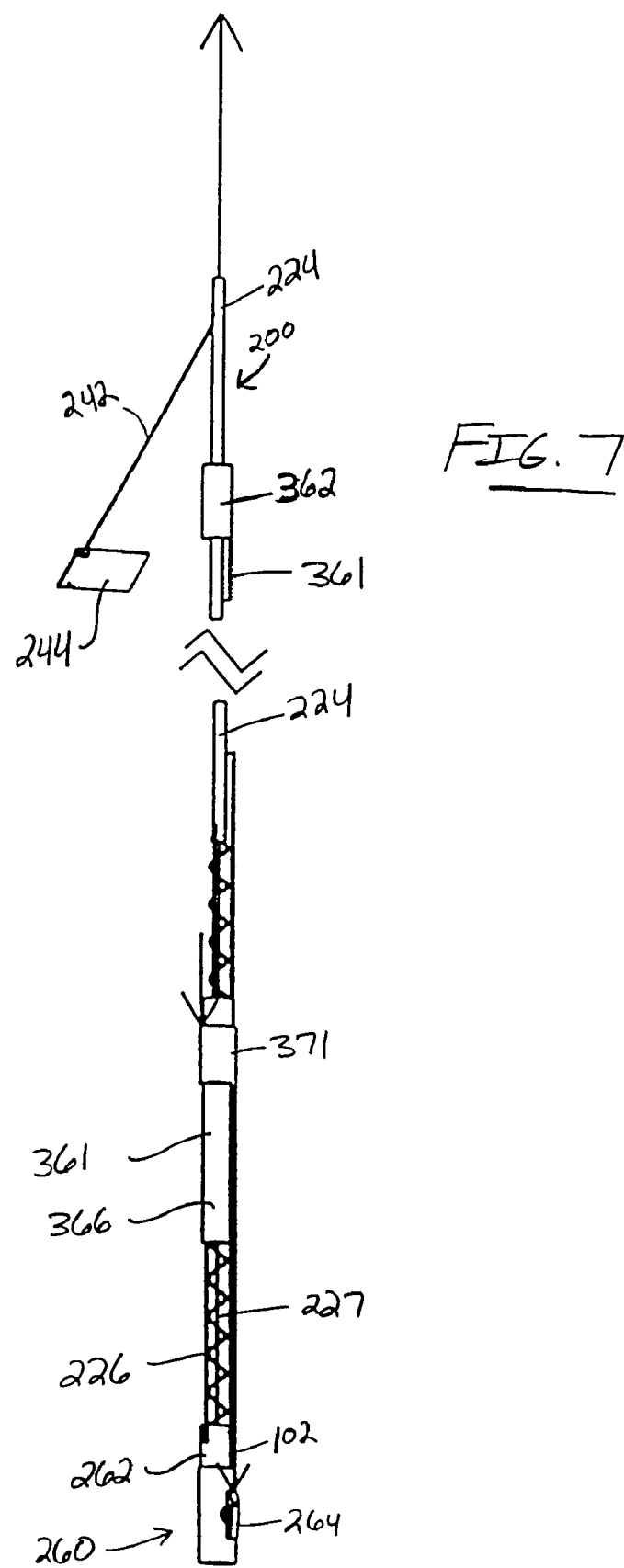
FIG. 7 is a fragmentary side view of the support assembly and push rod shaft assembly with parts removed to show the hopper scale assembly and depicting a feed-laden hopper assembly as indicated by a lowered flag.

FIG. 7 begins to illustrate how flag 244 is actuated. Due to the stretch of scale spring 226 with load 102, drive assembly 300, shroud assembly 400, and hopper assembly 500 are displaced downwardly relative to support member 224. The displacement depends on the weight of the seed or feed in hopper assembly 500. As the noted assemblies slide down support member 224, superior shaft member 361 also slides down support member 224. The displaced assemblies thus lower the support that superior shaft member 361 provides flagpole 242. Consequently, flag pole 242 pivots about its pivot axis extending through a flag pin 246 attaching flag pole 242 to support member 224, thus lowering flag 244 from its upright position (empty hopper assembly) to its lowered position, indicating that hopper assembly 500 is feed-laden. FIGS. 8(a) through 8(d), in tandem, further illustrate the raising and lowering of flag 244 in a more detailed, step-by-step fashion at varying levels of emptiness.

FIG. 11 illustrates how superior shaft member 361 regulates the extent to which four-bar spring assembly 320 can compress when it collapses due to load 101. As more clearly illustrated in the enlarged view in FIG. 12, superior shaft member 361 contacts latch body 262 latch thereby precluding further compression of four-bar spring assembly 320. This regulation precludes four-bar spring assembly 320 from contacting shroud assembly 400 thereby possibly jamming the telescoping action.

FIG. 13–16 are provided to illustrate with greater clarity support assembly 200 with its subassemblies and various components, namely flag assembly 240 as illustrated in FIG. 14; latch assembly 260 as illustrated in FIG. 16; overload cable 227 as illustrated in FIGS. 15 and 16; and support member shackle 225 as illustrated in FIG. 13. Noteworthy is that the support member shackle 225 is not threaded onto support member 224 but rather riveted such that support member shackle 225 can rotate freely precluding torsional loading of support member 224 and without becoming disjointed as can be the case with a threaded joint if not lock wired.

FIG. 17 generally illustrates the configuration of overload cable 227 when scale spring 226 is stretched to nearly its maximum. FIG. 18 generally illustrates the configuration of overload cable 227 when scale spring 226 is in an intermediately displaced state. It should be noted here that with a small design change a compression spring could be in place of scale spring 226 and overload cable 227 thus eliminating the need for overload cable 227 since a compression spring would simply reach solid height if an excessive load were applied to shroud assembly 400. Preferably, however, bird feeder apparatus 100 comprises scale spring 226 and overload cable 227 as described herein.

FIGS. 19–27 generally illustrate hopper assembly 500 in order to provide a clear picture to the viewer of its features. FIGS. 21–23 generally illustrate debris outlet screen 514 comprising small apertures in hopper tray 506, which debris screen 514 permits debris, but not feed, to fall out of hopper tray 506 thus precluding clogging of the feed outlet ports (as referenced at 516 in FIGS. 19, 23, and 26 in hopper assembly 500. FIG. 22 further illustrates how latch pawl 264 retracts (or is compressible) to permit insertion of hopper assembly 500 into bird feeder apparatus 100. FIG. 23 further illustrates how latch pawl 264 extends to capture hopper assembly 500 at the inferior surface of hopper tray 506 adjacent shaft-receiving sleeve 508 once hopper assembly 500 is fully inserted into bird feeder apparatus 100.

Figure 28:
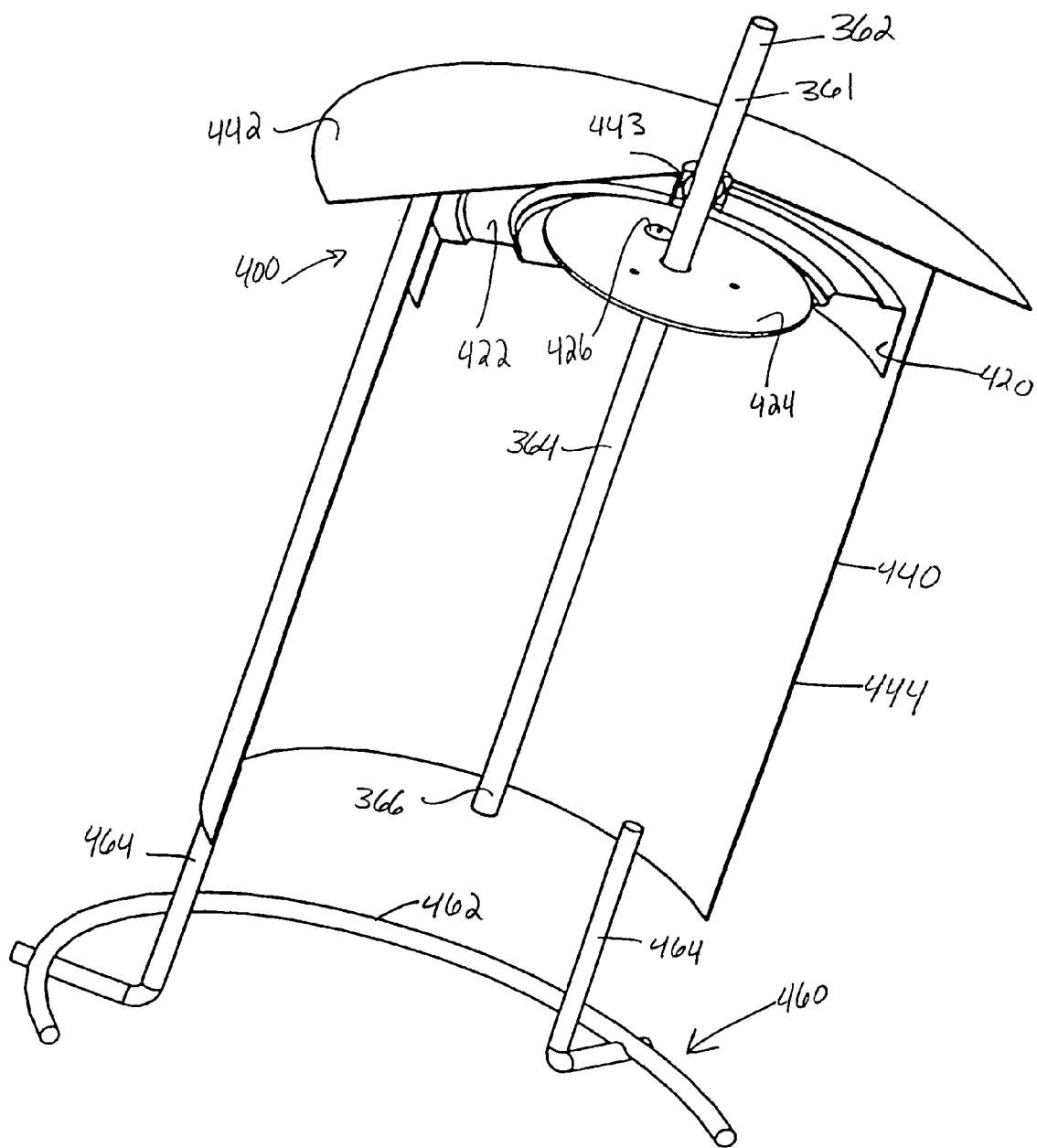
FIG. 28 is a fragmentary perspective view of the shroud housing assembly in abridgement with the superior shaft member of the push rod shaft assembly.

FIG. 28 generally illustrates how shroud assembly 400 is bridged to superior shaft member 361 of push rod shaft assembly 360. FIG. 28 further illustrates trim weight 424, the bridge corrugations which provide flexibility (as simplified and exaggerated in FIGS. 29 and 30), and a spherical bearing 443 as illustrated and referenced in FIGS. 28–32. It will be seen from an inspection of the noted figures that spherical bearing 443 functions to preclude a bending moment from being applied to superior shaft member 361 either from misalignment or from a large offset load being applied to shroud assembly 400. FIG. 29 attempts to illustrate the conjoined action of shroud bridge 422 and spherical bearing 443 to mitigate damage to bird feeder apparatus 100, particularly superior shaft member 361, from a large lateral load (as referenced at 106) applied to bird feeder apparatus 100. FIG. 30 attempts to illustrate the conjoined action of shroud bridge 422 and spherical bearing 443 to mitigate damage to bird feeder apparatus 100, particularly superior shaft member 361, from a large offset vertical load (as referenced at 107) applied to bird feeder apparatus 100.

Figure 33:
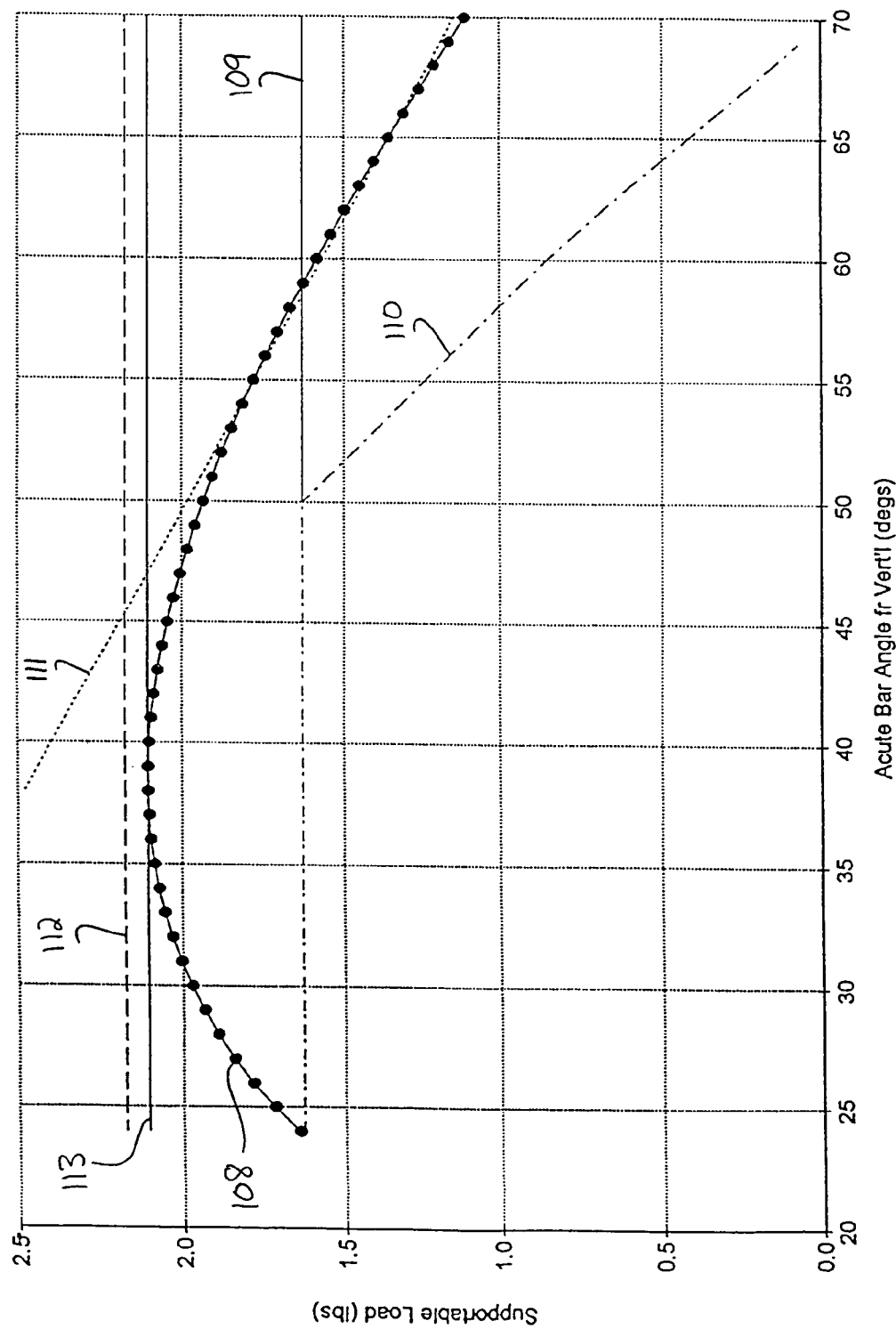
FIG. 33 is a graphical representation of the four-bar spring assembly's supportable load (in pounds) as a function of the acute bar angle from vertical (in degrees).
Figure 34:
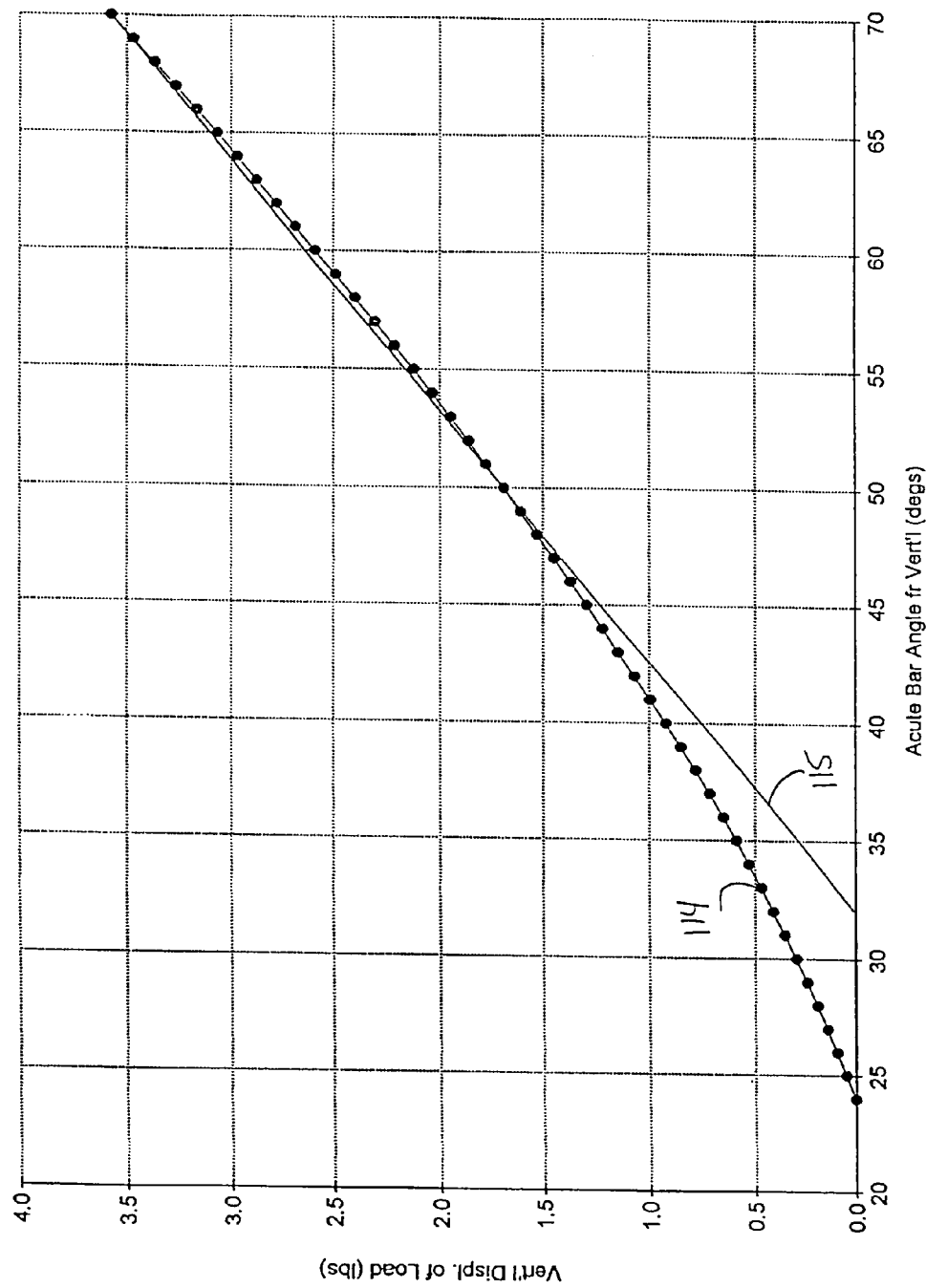
FIG. 34 is a graphical representation of the four-bar spring assembly's vertical displacement of load (in inches) as a function of the acute bar angle from vertical (in degrees).
Figure 3S:
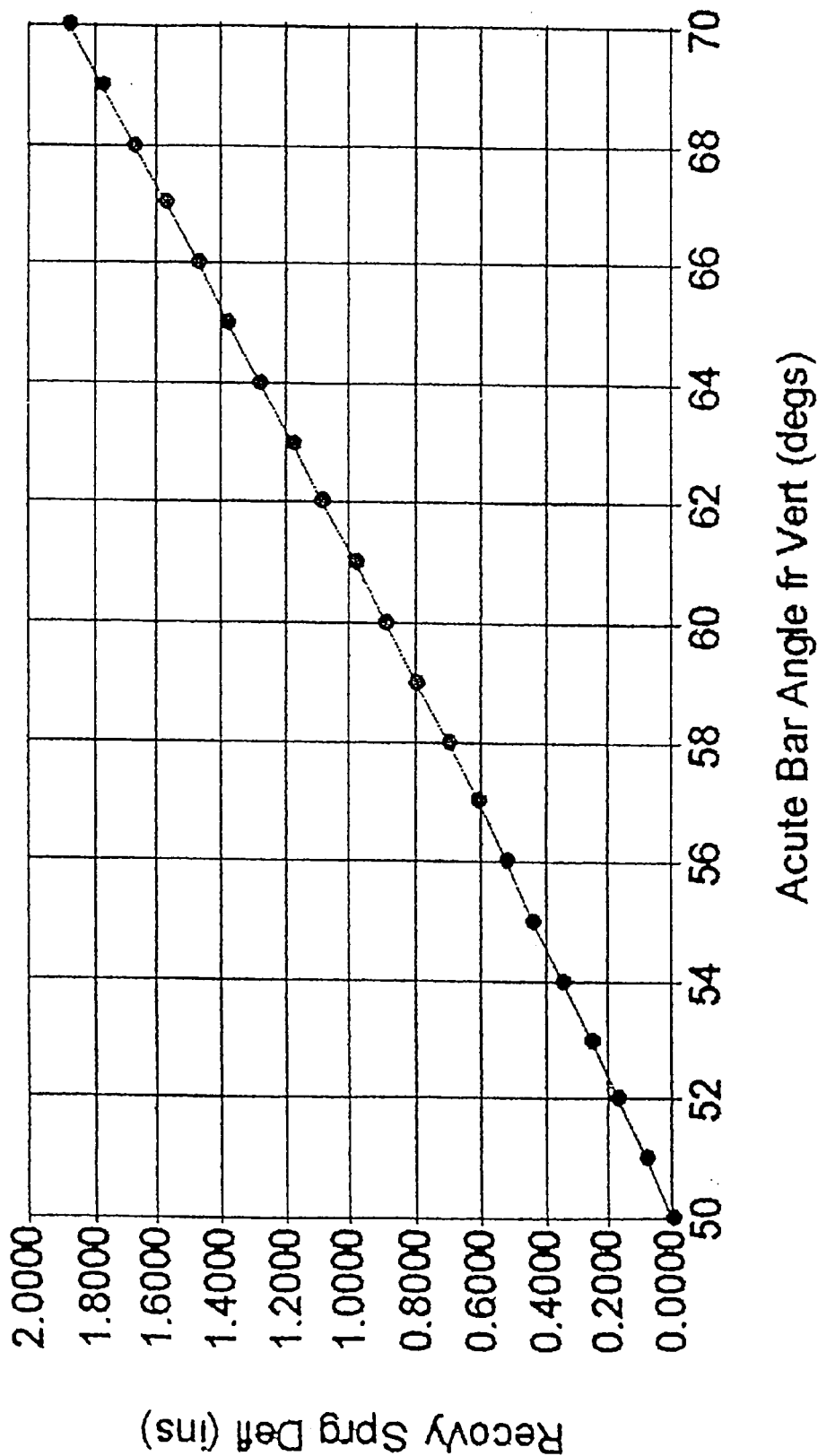

FIGS. 33–35 are graphical representations of various features of bird feeder apparatus. FIG. 33 is a graphical representation of the four-bar spring assembly's supportable load (in pounds) as a function of the acute bar angle from vertical (in degrees). The supportable load is referenced at 108 and comprises a heavy, nonlinear dotted line. The structural weight of bird feeder apparatus 100 is referenced at 109 and comprises a solid line. The recovery load is referenced at 110 and comprises a broken line comprising dots and dashes. The linear region is referenced at 111 and comprises a dotted line. The structural weight of bird feeder apparatus 100 combined with the weight of a typical adult squirrel (approximately 0.75 pounds) is referenced at 112 and comprises a broken line comprising dashes. The maximum supportable load is referenced at 113 and comprises a solid line. FIG. 34 is a graphical representation of the four-bar spring assembly's vertical displacement of load (in inches) as a function of the acute bar angle from vertical (in degrees). The vertical displacement of load is referenced at 114 and comprises a heavy, nonlinear dotted line. The linear region is referenced at 115 and comprises a solid line. FIG. 35 is a graphical representation of the four-bar spring assembly's recovery spring deflection (in inches) as a function of the acute bar angle from vertical (in degrees).

More particularly, support assembly 200 preferably comprises hopper scale assembly 220; flag assembly 240; and hopper attachment means. The hopper attachment means are preferably defined by latch assembly 260. Hopper scale assembly 220 preferably comprises rigid support member 224 or support member, feeder support attachment means, scale spring 226, overload cable 227, and scale spring attachment means. It is contemplated that the feeder support attachment means may preferably be defined by a hook or similar other removable fastening means for attaching the superior most end of support member 224 to a bird feeder support structure (such as the limb of a tree or a bird feeder stand). The feeder support attachment means are cooperatively associated with support member shackle 225 for attaching the superior most end of support member 224 to a bird feeder support structure.

Preferably, the superior most end of support member may further comprise support member shackle 225. Noteworthy is that support member shackle 225 is preferably not threaded onto support member 224, but rather riveted such that it can rotate freely precluding torsional loading of support member 224 and without becoming disjointed as can be the case with a threaded joint if not lock wired. The hook or similar other removable fastening means may then be removably joined to support member shackle 225 for attaching the superior most end of support member 224 to a bird feeder support structure. A superior scale pin 228 and an inferior scale pin 230 may preferably define the scale spring attachment means. The superior most end of support member 224, to which the hook may attach, may properly be referred to as a superior member end. Opposite the superior member end is an inferior member end. A support member length extends intermediate the superior and inferior member ends.

Hopper scale assembly 226 preferably comprises scale spring 226 of an extension coil type and overload cable 227. It should be noted here that with a small design change a compression spring could be used eliminating the need for overload cable 227 since a compression spring would simply reach solid height if an excessive load were applied to shroud assembly 400. Scale spring 226 preferably comprises a superior spring end and an inferior spring end. The superior spring end is preferably fixedly attached to the inferior member end as generally depicted in FIG. 15. It will be seen from an inspection of FIG. 15 that superior scale pin 228 functions to fixedly attach the superior spring end to the inferior member end. The inferior spring end is preferably fixedly attached to the hopper attachment means. It will be seen from an inspection of FIG. 16 that inferior scale pin 230 functions to fixedly attach the inferior spring end to the hopper attachment means.

In the preferred embodiment, anti-squirrel bird feeder 100 preferably comprises feed gauge means for indicating the quantity of feed in hopper assembly 500. The feed gauge means may preferably be defined by flag assembly 240. In this regard, it should be noted that support member 224 further preferably comprises pole-receiving structure 222 as illustrated and referenced in FIG. 14. Pole-receiving structure 222 may preferably be defined by a pole receiving slot or notch formed in support member 224 in the support member length. Preferably, pole-receiving structure 222 is spatially located or formed intermediate the superior member end and the inferior member end so that when anti-squirrel bird feeder 100 is in an assembled state, pole-receiving structure 222 is critically positioned, a more thorough description of which may be found in later specifications hereinafter. Flag assembly 240 preferably comprises flag pole 242, flag 244, and pole attachment means, which pole attachment means may preferably be defined by flag pin 246. It will be seen from an inspection of FIG. 14 that flag pole 242 further comprises a flag end and a pole attachment end. The pole attachment means or flag pin 246 attach the pole attachment end to pole-receiving structure 222 and flag 244 is attached to the flag end for indicating to the user or passersby the quantity of feed in hopper assembly 500.

As earlier specified, the hopper attachment means are preferably defined by latch assembly 260. Latch assembly 260 preferably comprises latch body 262, latch pawl 264, latch spring 266, and latch pin. It will be understood from an inspection of FIG. 16 that the latch pin is essentially defined by the inferior scale pin 230. It will be further understood from an inspection of FIG. 16 that latch pawl 264 and latch spring 266 (which preferably is a compression type coil) together function as a spring-loaded latch pawl. The spring loaded latch pawl is thus compressible from its equilibrium position for releasing hopper assembly 500 from telescopic relation with the shroud body of shroud assembly 400. Further, latch spring 266 is releasable from its compressed state and thus extendable (as it is restored to its equilibrium position) for maintaining hopper assembly 500 in telescopic relation to the shroud body of shroud assembly 400 as generally depicted in FIG. 23. Arrow 102 in FIGS. 5–7, 11, and 12 depicts the force vector directed at latch pawl 264 when hopper assembly 500 is in telescopic relation with shroud body 444 of shroud assembly 400. Latch pin 230 functions to fixedly attach the inferior spring end to latch assembly 260 as illustrated in FIG. 16. It will thus be seen that latch assembly 260 or hopper attachment means provide bird feeder apparatus 100 with a so-called "drop-out" hopper assembly for enabling users thereof to easily clean and refill the hopper assembly.

Drive assembly 300 preferably comprises four-bar spring assembly 320, and a push rod shaft assembly 360. Four-bar spring assembly 320 preferably comprises a medial superior bar 30, a lateral superior bar 31, a medial inferior bar 32, a lateral inferior bar 33, a bar-joining junction assembly, a superior trunnion assembly 34, and an inferior trunnion assembly 35 as illustrated and referenced in FIGS. 9 and 10. Medial and lateral superior bars 30 and 31 each comprise two rigid, linear link members 322 spaced in parallel relation to one another. Medial superior bar 30 preferably comprises a first short spacer 324 and lateral superior bar 31 preferably comprises a first long spacer 325. The first long spacer 325 functions to space the link members 322 of lateral superior bar 31 farther apart than the spacing between the link members 322 of medial superior bar 30. Medial and lateral superior bars 30 and 31 each comprise a superior top bar end and an inferior top bar end. The superior top bar end of medial superior bar 30 is preferably aligned with the superior top bar end of lateral superior bar 31 such that the superior top bar end of medial superior bar 30 is medial to the superior top bar end of lateral superior bar 31. In other words, the spacing between the link members 322 of medial superior bar is less than the spacing between the link members 322 of lateral superior bar such and thus medial superior bar may be medially aligned with respect to lateral superior bar.

Medial and lateral inferior bars 32 and 33 each comprise a superior bottom bar end and an inferior bottom bar end. In a similar fashion to medial and lateral superior bars 30 and 31, medial and lateral inferior bars 32 and 33 each comprise two rigid, linear link members 322 spaced in parallel relation to one another. Medial inferior bar 32 preferably comprises a second short spacer 324 and lateral inferior bar 33 preferably comprises a second long spacer 325. The second long spacer 325 functions to space the link members 322 of lateral inferior bar 33 farther apart than the spacing between the link members 322 of medial inferior bar 32. Medial and lateral inferior bars 32 and 33 each comprise a superior bottom bar end and an inferior bottom bar end. The inferior bottom bar end of medial inferior bar 32 is preferably aligned with the inferior bottom bar end of lateral inferior bar 33 such that the inferior bottom bar end of medial inferior bar 32 is medial to the inferior bottom bar end of lateral inferior bar 33. In other words, the spacing between the link members 322 of medial inferior bar 32 is less than the spacing between the link members 322 of lateral inferior bar 33 such that medial inferior bar 32 may be medially aligned with respect to lateral inferior bar 33.

Superior trunnion assembly 34 functions to pivotally connect medial and lateral superior bars 30 and 31 at the superior top bar ends as generally depicted in FIGS. 9 and 10. Further, inferior trunnion assembly 35 functions to pivotally connect medial and lateral inferior bars 32 and 33 at the inferior bottom bar ends as also generally depicted in FIGS. 9 and 10. Superior and inferior trunnion assemblies 34 and 35 thus form a superior trunnion junction and an inferior trunnion junction. Both superior trunnion assembly 34 and inferior trunnion assembly 35 preferably comprise a trunnion ring 336, two trunnion pins 338 extending laterally from the respective trunnion ring 336 along a respective pivot axis, and a trunnion set screw 340 all as illustrated and referenced in FIGS. 9 and 10. It will be seen that trunnion rings 336 of superior trunnion assembly 34 and inferior trunnion assembly 35 each comprise a shaft-receiving aperture. The superior shaft receiving aperture is referenced at 337(*a*) in FIGS. 9 and 10 and the inferior shaft-receiving aperture is referenced at 337(*b*) in FIG. 10. Superior shaft receiving aperture 337(*a*) is sized and shaped to receive superior shaft member 361 and inferior shaft-receiving aperture 337(*b*) is sized and shaped to receive inferior shaft member 371. It will be noted that superior shaft member 361 preferably comprises an outer diameter that is sized and shaped to be telescopically received in the inner diameter of inferior shaft member 371. It will be further noted that superior shaft-receiving aperture 337(*a*) preferably comprises a diameter of lesser magnitude than the diameter of inferior shaft-receiving aperture 337(*b*).

The junction assembly preferably comprises first and second junction pins 330 or pivot attachment means, and first and second junction springs 332 or bar spring means. First junction pin 330 pivotally connects the inferior top bar end of lateral superior bar 31 to the superior bottom bar end of medial inferior bar 32. Similarly, second junction pin 330 pivotally connects the inferior top bar end of medial superior bar 30 to the superior bottom bar end of lateral inferior bar 33. It will be readily understood from an inspection of FIGS. 9 and 10 that junction pins 330 each comprise opposite spring-engaging ends and that in the preferred embodiment as illustrated, the first and second junction pins 330 are preferably parallel to one another. In this last regard, it is important to note that junction pins 330 having a relaxed or unactuated parallel distance as generally depicted in FIGS. 1, 2, 4, 5, 8(*a*)–8(*d*), 9, and 29; and a displaced or actuated parallel distance as generally depicted in FIGS. 3, 10, 11, and 30.

First and second junction springs 332 preferably comprise extension coil type springs and function to connect the spring-engaging ends of junction pins 330. From an inspection of FIG. 9, it will be seen that first and second junction springs 332 essentially define the relaxed parallel distance when junctions springs 332 are relaxed in an unextended state or equilibrium state and further define the displaced parallel distance when displaced or in an extended, non-equilibrium state. Medial and lateral superior bars 30 and 31 thus have a first angle therebetween at the superior trunnion junction and medial and lateral inferior bars 32 and 33 have a second angle therebetween at the inferior trunnion junction. If four-bar spring assembly 320 is properly constructed or assembled, the first angle and the second angle are preferably equal in magnitude to one another (whether in a relaxed state or in a displaced state). Thus, four-bar spring assembly 320 provides a nonlinear, geometrically-based, closure mechanism, which mechanism is driven or displaced by external load forces acting through rigid superior and inferior bars 30–33 and which mechanism is countered or restored by restorative forces in junction springs 332. It should be noted that the connectivity between superior shaft member 361, inferior shaft member 371, and drive assembly 300 via trunnion rings 336 provide for a secondary function of four-bar spring assembly 320, which secondary function is to maintain alignment between the shroud body 444 and hopper assembly 500 should their cross-sections be different then round, i.e., rectangular, and thusly, to prevent jamming between shroud body 444 and hopper assembly.

Junction springs 332 produce a supportable load 108 as graphically represented in FIG. 33. Any time the supportable load 108 is greater than the applied load the four-bar mechanism or four-bar spring assembly 320 will open or become displaced. FIG. 34 is a graphical representation of the four-bar spring assembly's vertical displacement of load (in inches) as a function of the acute bar angle from vertical (in degrees). The two basic geometric states of four-bar spring assembly, namely, closed (relaxed) and open (displaced) are respectively illustrated in FIGS. 9 and 10.

Push rod shaft assembly 360 preferably comprises superior shaft member 361, inferior shaft member 371, annular spring cup 384, and recovery spring 386. Superior shaft member 361 comprises superior shaft top end 362, superior shaft bottom end 366, and superior shaft length 364 intermediate superior shaft top and bottom ends 362 and 366. Inferior shaft member 371 comprises inferior shaft top end 372, inferior shaft bottom end 376, and inferior shaft length 374 intermediate inferior shaft top and bottom ends 372 and 376. The superior and inferior trunnion assemblies 334 each comprise shaft-receiving aperture 337 and shaft-fastening means. Shaft-receiving apertures 337 are sized and shaped to receive superior and inferior shaft lengths 364 and 374, such that superior shaft bottom end 366 is telescopically received in inferior shaft top end 372. The shaft-fastening means (or trunnion set screws 340) preferably fasten superior and inferior trunnion assemblies 334 to the superior and inferior shaft lengths 364 and 374 as generally depicted in FIGS. 5 and 11. Annular spring cup 384 is preferably affixed to the inferior shaft member 371 adjacent inferior shaft top end 372 and recovery spring 386 is seated upon spring cup 384 intermediate spring cup 384 and superior trunnion assembly 334 such that superior shaft length 364 extends through recovery spring 386. In other words, recovery spring 386 encircles superior shaft length 364, which superior shaft length 364 may be telescopically received in inferior shaft length 374 during displacement of the four-bar spring mechanism or four-bar spring assembly 320. It is contemplated that recovery spring 386 functions to provide additional restorative spring force to the otherwise displaced four-bar spring assembly 320. In this regard, recovery spring 386 is preferably a compression coil type spring. FIG. 35 is a graphical representation of the four-bar spring assembly's recovery spring deflection (in inches) as a function of the acute bar angle from vertical (in degrees).

Shroud assembly 400 preferably comprises shroud bridge assembly 420; shroud housing assembly 440; and perch assembly 460. Shroud bridge assembly 420 preferably comprises a substantially circular, corrugated shroud bridge 422, trim weight 424, trim weight screws 426, collar 428, and collar fastening means, or a collar set screw. Shroud housing assembly 440 preferably comprises a substantially cylindrical shroud body 444, conical shroud cap 442 and bridge attachment means. The bridge attachment means may preferably be defined by a plurality of shroud screws. Shroud body 444 preferably comprises a superior shroud end, an inferior shroud end, a shroud body diameter or body periphery, and a shroud length intermediate the superior and inferior shroud ends. Shroud bridge 422 is preferably attached to shroud body 444 adjacent the superior shroud end. Superior shaft length 364 is received in collar 428 adjacent superior shaft top end 362 as illustrated in FIGS. 28–30 and the collar fastening means or collar set screw secures superior shaft length 364 adjacent superior shaft top end 362 to shroud bridge 422. Alternatively, shroud bridge 422 may be integrally formed with superior shaft length as a means to reduce production costs.

Shroud cap 442 preferably comprises a superior cap surface, an inferior cap surface, a basal cone diameter or basal periphery, and a superior shaft-receiving aperture extending from the superior cap surface to the inferior cap surface. The basal cone diameter or basal periphery is preferably greater in magnitude than the shroud body diameter or body periphery so as to provide some degree of cover to shroud body 444 as well as perched birds. Superior shaft top end 362 preferably extends upwardly from the push rod-receiving aperture as seen from a general inspection of FIGS. 1–4, 8(a)–8(d), and 28–30. Shroud cap 442 may be further defined wherein the superior shaft-receiving aperture comprises spherical bearing 443. Spherical bearing 443 functions to allow the bird feeder apparatus to withstand unbalanced load forces directed against either shroud assembly 400 or hopper assembly 500.

The slope of shroud cap 442 is preferably made shallow, but steep enough to shed rain and in most cases snow. Further, its overhang is preferably relatively small. A steeply sloped roof and/or a large overhang is neither desirable aesthetically, nor desirable functionally. An intuitive probability that a squirrel will be defeated if he attempts access to hopper tray 506 from the roof is 0.99, so shroud cap 442 of the preferred embodiment has a slope of approximately 15 degrees and an overhang of about 0.75 inches.

Perch assembly 460 preferably comprises perch ring 462 or perch member, a plurality of circumferentially spaced perch legs 464, and ring attachment means or member attachment means. The ring attachment means may preferably be defined by comprising a plurality of perch screws or perch member attachment means. Preferably, it is contemplated that perch assembly 460 comprise three perch legs 464 spaced about 120 rotational degrees from one another, extending from perch ring 462 to shroud body 444. It will be seen from an inspection of FIGS. 1–4 that perch ring 462 has a ring diameter, which ring diameter is preferably greater in magnitude than the tray diameter. The ring attachment means or perch screws fixedly attach perch ring 462 to shroud body 444 concentrically adjacent hopper tray 506 (described in more detail hereinafter). The fixedly attached perch ring 462 thus enables birds to perch and feed from hopper tray 506.

Hopper assembly 500 preferably comprises a substantially cylindrical hopper body 502, a substantially frustoconical hopper cone 504, hopper tray 506, a plurality of vertical hopper partitions 510, and shaft-receiving sleeve 508. Notably, shaft-receiving sleeve 508 comprises a sleeve diameter, which sleeve diameter is sized and shaped to telescopically receive inferior shaft member 371. It should be recalled that inferior shaft member 371 has a shaft diameter sized and shaped to telescopically received superior shaft member 361 and superior shaft member has a shaft diameter sized and shaped to receive or encircle support member 224.

It will be seen that hopper body 502 comprises a superior hopper body end, an inferior hopper body end, and a hopper body diameter. Notably, the hopper body diameter is lesser in magnitude than the shroud body diameter so as to effect a proper telescopic relation with low probability of jamming. Hopper cone 504 preferably comprises a superior cone end and an inferior cone end. The superior cone end has a superior cone diameter and the inferior cone end has an inferior cone diameter. It will be seen that the superior cone diameter is preferably substantially equal in magnitude to the hopper body diameter and that the inferior cone diameter is preferably lesser in magnitude than the superior cone diameter. In this regard, the superior cone end is preferably fixedly and concentrically attached to the inferior hopper body end. The inferior cone end preferably comprises spacer-attachment means, a series of circumferentially spaced projections extending dowwardly from the inferior cone end, which projections may be riveted or otherwise fastened to hopper tray 506. The circumferentially spaced projections define a series of feed outlet ports 516 or hopper ports. Feed outlet ports 516 preferably comprise a port width of approximately the length of the longest linear dimension of two sunflower seeds placed end to end. This sizing helps seed of feed flow into hopper tray 506 by inhibiting clogging. Feed outlet ports 516 further preferably comprise a port height of approximately the height of a cylinder that intersects the cone of repose for a generic seed aggregate. This height is primarily dependent on the ID of the hopper's cone at the top of the ports; therefore, an iterative process determines this height. This sizing helps feed or seed flow into hopper tray 506.

Hopper tray 506 preferably comprises a substantially planar feed-supporting surface 518 as illustrated and referenced in FIGS. 22 and 23; and a substantially cylindrical feed-supporting surface 520 as also illustrated and referenced in FIGS. 22 and 23. It will be seen from an inspection of the noted figures that cylindrical feed-supporting surface 520 extends orthogonally upward from planar feed-supporting surface 518. Thus, cylindrical feed-supporting surface 520 has both a feed-supporting height and a feed-supporting diameter. The feed-supporting diameter is preferably greater in magnitude than the inferior cone diameter. As earlier described, the spacer-attachment means fixedly and concentrically attach hopper tray 506 to the inferior cone end in spaced relation thereto. It will be understood that the spacer-attachment means have a feed outlet height, which feed outlet height is preferably substantially equal in magnitude to the feed-supporting height.

The vertical hopper partitions 510 radially extend from the inner surface of hopper body 502 to shaft-receiving sleeve 508 for maintaining shaft-receiving sleeve 508 in concentric relation with hopper body 502. Vertical hopper partitions 510 further define a plurality of feed-receiving compartments within hopper body 502 and hopper cone 504. The feed-receiving compartments each preferably comprise a substantially uniform feed-receiving volume as is generally depicted in FIGS. 8(a)–8(d). After filling or checking the fill level of the feed-receiving compartments, the user may assemble hopper assembly 500 with the remaining sub-assemblies. Hopper assembly 500 may thus be telescopically received within shroud body 444. When in an assembled state, inferior shaft length 374 extends through shaft-receiving sleeve 508 and scale assembly 220 extends through push rod shaft assembly 360. The inferior spring end is fixedly attached to the hopper attachment means, which hopper attachment means function to maintain hopper assembly 500 in telescopic relation to shroud body 444.

It should be noted that the surround perch or perch assembly 460 parallels the outer periphery of the cross-section of shroud body 444, but it is offset laterally and away from shroud body 444 by approximately 1.5 inches. This offset provides ample room for birds up to the size of approximately a cardinal, but inhibits larger birds. To accommodate larger and smaller birds, it is contemplated that inner and outer adjacent perches could be provided. The plane of perch assembly 460 parallels the plane of planar feed-supporting surface 518, but is offset approximately 0.5 inches below feed-supporting surface 518. This offset makes it easier for birds to acquire seed or feed from hopper tray 506.

Hopper assembly 500 may further preferably comprise an inverted, conical hopper partition 522 or inverted, sloped hopper partition as illustrated and referenced in FIGS. 1, 2, 4, 8(a)–8(d), 19–23, 24, and 26. Hopper partition 522 preferably comprises a superior partition surface, an inferior partition surface, a superior partition diameter, and an inferior partition diameter. It will be seen from an inspection of FIGS. 22 and 23 that the inferior partition diameter is substantially equal in magnitude to the sleeve diameter and that the superior partition diameter is preferably lesser in magnitude than the shroud body diameter. The superior partition surface thus provides an omnidirectional guide for guiding inferior shaft bottom end 376 into shaft-receiving sleeve 508 when hopper assembly 500 is telescopically received in shroud body 444. While the superior partition surface provides an omnidirectional guide for guiding inferior shaft bottom end 376 into shaft-receiving sleeve 508 when hopper assembly 500 is telescopically received in shroud body 444, the inferior partition surface functions to preclude feed from occupying the clear space required by the four-bar mechanism or four-bar spring assembly 320 so that four-bar spring assembly 320 can freely collapse without feed interference. In this last regard, the reader may wish to compare FIGS. 2 and 3. The reader will thus see that four-bar spring assembly 320 when collapsed (as in FIG. 3) requires a certain clear space afforded by hopper partition 522. FIG. 3 thus does not specifically reference hopper partition 522 because of spatial concerns. The inferior partition surface further permits the user to maximize the feed capacity of hopper assembly 500 as has been generally depicted in FIG. 8(a).

Hopper assembly 500 may further preferably comprise an anti-flick grating or anti-flick screen 512. Anti-flick screen 512 preferably extends radially from the inferior cone end to cylindrical feed-supporting surface 520 and functions to prevent birds from flicking feed from hopper tray 506. It is contemplated that the anti-flick grating or anti-flick screen 512 preferably comprises a pitch of approximately 0.5 inches. This size of mesh or grating allows ample room to acquire seed from the seed tray but inhibits a bird's ability to slew its beak through the seeds with the consequence of flicking seeds out of hopper tray 506 resulting in substantial loss of seed.

If anti-flick screen 512 is incorporated into the design, it is further contemplated that the hopper assembly 500 may further preferably comprise debris outlet means. When anti-flick screen 512 is used, debris tends to accumulate in hopper tray 506, which accumulation eventually inhibits the feed or seed from properly flowing out of the hopper ports or feed outlet ports 516. The debris outlet means may preferably be defined by a debris outlet screen 514, which debris outlet screen 514 essentially forms the outer annular portions of planar feed-supporting surface 518 as most clearly illustrated in FIGS. 22 and 23. It will be seen from an inspection of FIGS. 22 and 23 that debris outlet screen 514 is essentially an apertured portion of planar feed supporting surface 518. Debris outlet screen 514 preferably comprises a square mesh that has a pitch of approximately 0.03125 inches. This size of mesh allows debris to fall from the hopper tray 506, precluding its accumulation and clogging of feed outlet ports 516. It will thus be understood that the partitioned, removable (drop out) hopper assembly 500 allows (1) segregation of feed or seed types in the feed-receiving compartments and (2) easy cleaning and easy refilling as enabled by the selectively removable (drop out) features.

Figure 8A:
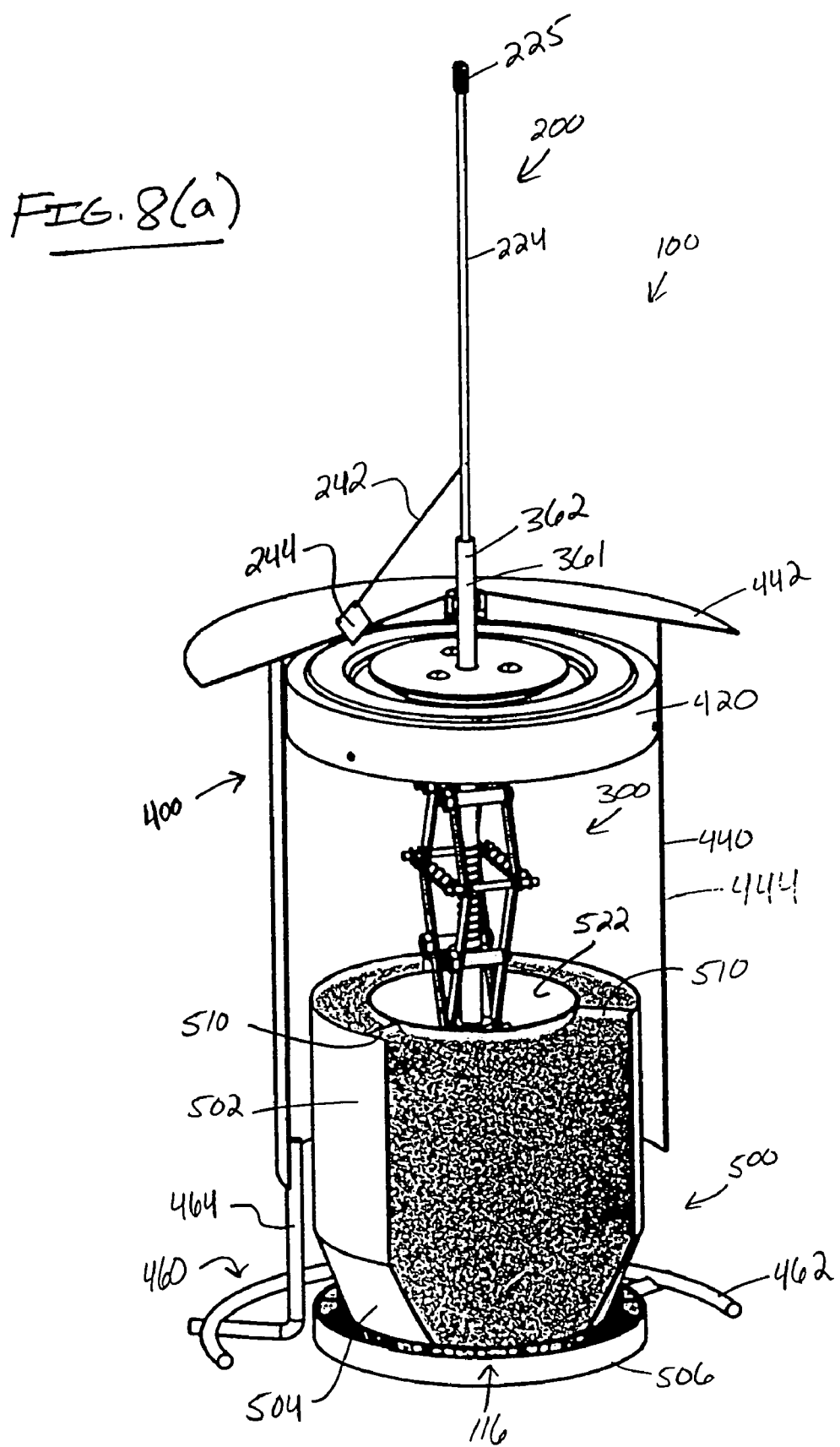
FIG. 8(a) is a perspective view of the preferred embodiment of the anti-squirrel bird feeder with parts removed to show a feed-laden, full hopper assembly and the flag in a lowered state.
Figure 8B:
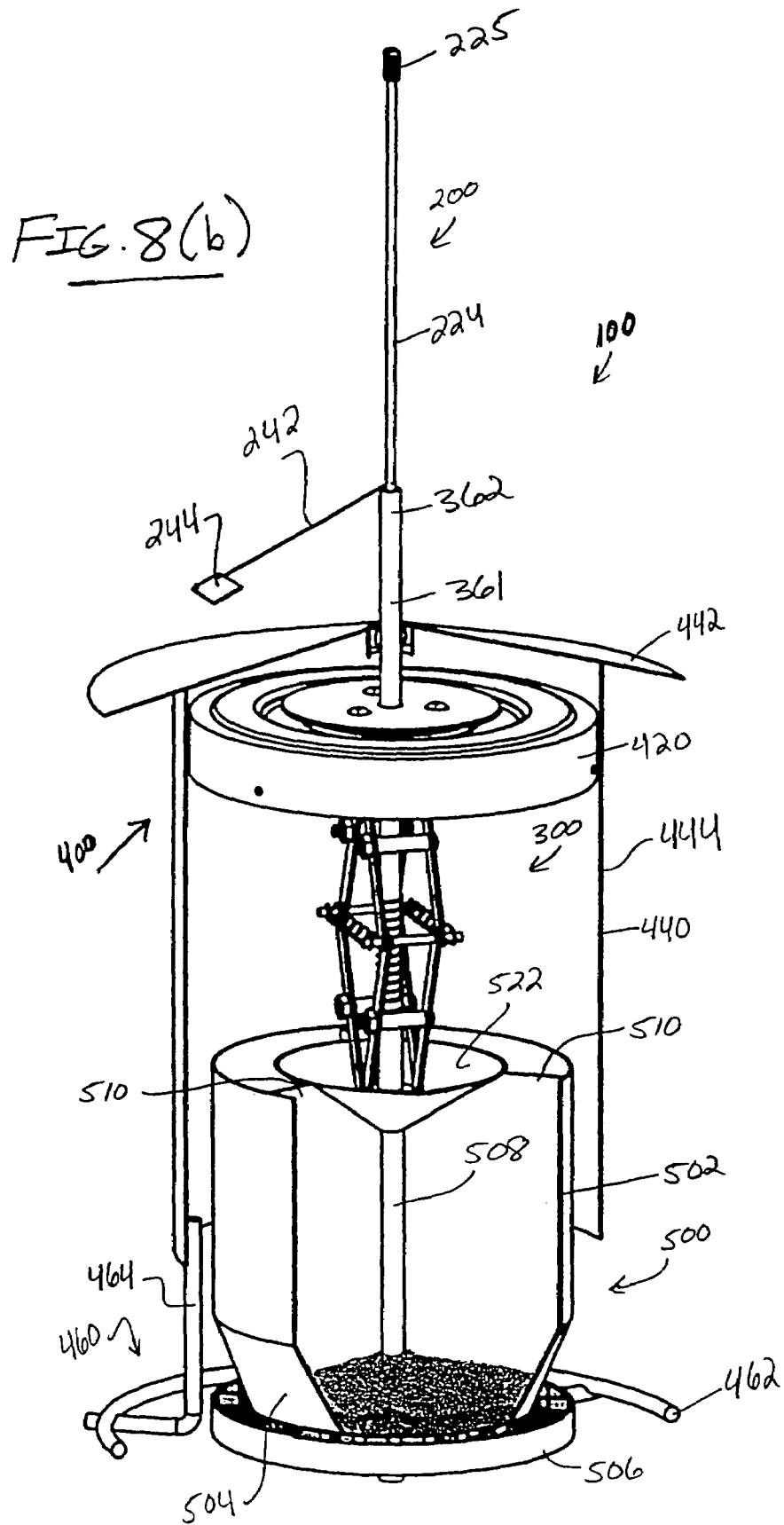
FIG. 8(b) is a perspective view of the preferred embodiment of the anti-squirrel bird feeder with parts removed to show a first near-empty state of the hopper assembly, the superior shaft member making contact with the flag pole.
Figure 8C:
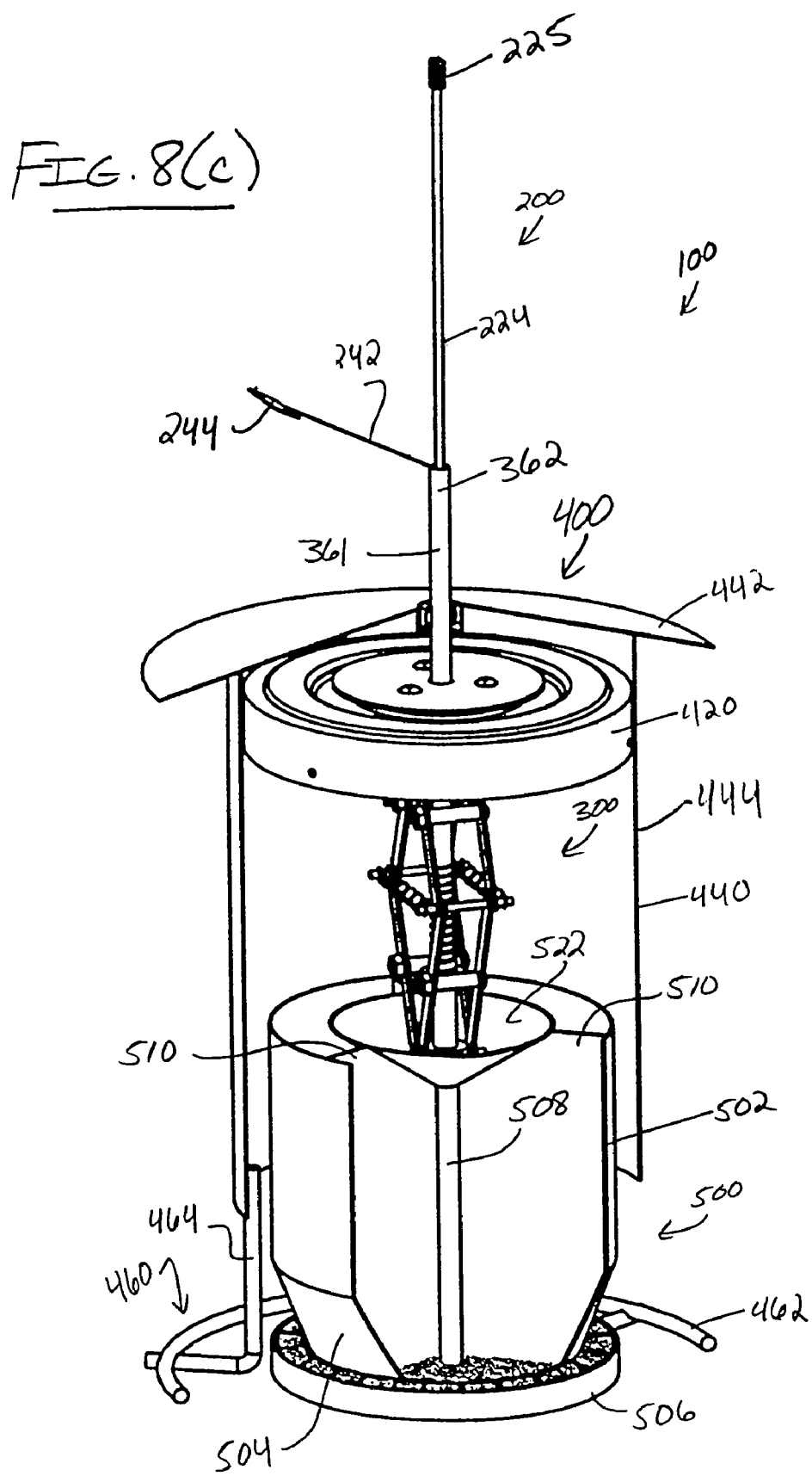
FIG. 8(c) is a perspective view of the preferred embodiment of the anti-squirrel bird feeder with parts removed to show a second near-empty state of the hopper assembly, the superior shaft member raising the flag pole.
Figure 8D:
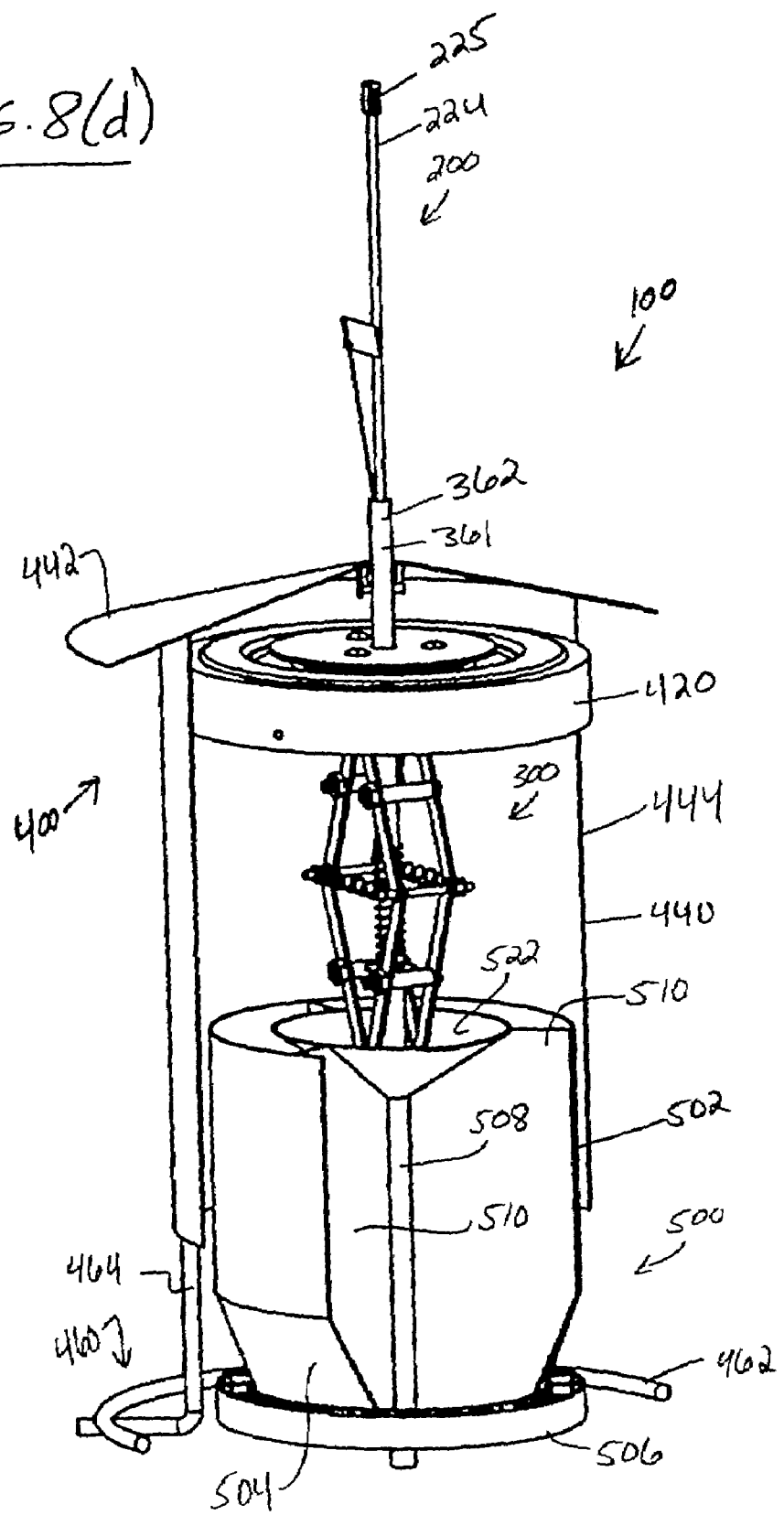
FIG. 8(d) is a perspective view of the preferred embodiment of the anti-squirrel bird feeder with parts removed to show a feed-barren, empty hopper assembly and the flag in a raised state.

As earlier specified, the support member length preferably comprises pole-receiving structure 222, which pole-receiving structure 222 is critically located. In this regard, it should be noted that pole-receiving structure 222 is preferably spatially located adjacent superior shaft top end 362. For descriptive purposes, assume that hopper assembly 500 is filled with a quantity of feed as generally illustrated in FIG. 8(a). The quantity of feed in hopper assembly 500 when in a full state, will necessarily comprise a maximum feed load as has been generally depicted in FIG. 8(a) with a pointed lead line and referenced at numeral 116. At maximum feed load 116, scale spring 226 is maximally displaced as generally depicted in FIG. 17. As birds feed from anti-squirrel bird feeder 100, the feed load will decrease, resulting in restorative displacement of scale spring 226. Hopper assembly 500, shroud assembly 400, and drive assembly 300 necessarily experience incremental displacements (however infinitesimal) back toward the minimum displacement of scale spring 226 when hopper assembly is empty as generally depicted in FIGS. 8(a) through 8(d). While it is noted that the preferred vertical displacement is dependent upon the combined weight of hopper assembly 500, the feed load, the stiffness of scale spring 226, and the clearance between the superior shaft member's internal diameter and flagpole 242, the preferred vertical displacement, or total displacement between maximum and minimum displacement is preferably about 1.25 inches or on this order of magnitude. From an inspection of FIGS. 8(a) through 8(d), it will be seen that as hopper assembly 500 nears an empty state, the superior shaft top end 362 operates to raise flag pole 242 and flag 244. In this regard, it will be noted that scale spring 226 and the feed load operate to displace hopper assembly 500, shroud assembly 400, and drive assembly 300 relative to support member 224. It will thus be further understood that pole-receiving structure 222 is critically located in the support member length such that superior shaft member 361 will mechanically raise or lower flag pole 242 (which flag pole 242 depends from the pole-receiving structure 522) according to the feed load and the accordant displacement of scale spring 226. Thus, flag assembly 240 functions to effectively indicate the relative quantity of feed in hopper assembly 500 as dictated by the remaining feed load or feed weight and displacement of scale spring 226.

It should be noted that the primary parameter of the present invention is the stroke of the telescoping mechanism. In the preferred embodiment, the stroke is approximately 1.75 inches. This stroke was chosen because it provides ample space for feeding birds to acquire the feed or seed yet keeps consequential dimensions, as explained below, within acceptable limits.

As a consequence of the stroke chosen, the bars of four-bar spring assembly 320 or four-bar closure mechanism need to be approximately 3.125 inches long. This dimension then governs the minimum characteristic diameter of the shroud (the largest diameter of a circle that is enclosed by the shroud's cross-section), approximately 6.375 inches: two bar lengths plus a tolerance is required when the four-bar mechanism is collapsed. An additional consequence of the stroke chosen accrues to the length of the body of the shroud, for the shroud must provide enough free space to accommodate the load free height of the four-bar mechanism in addition to completely shrouding hopper assembly 500 when the telescoping action has closed access to hopper tray 506. Therefore, the preferred length of shroud body 444 is approximately 9.5 inches. The aforementioned dimensions of shroud body 444 accommodate a hopper assembly having approximately a height of about 6 inches and approximately a diameter of 5.5 inches. The hopper assembly 500, therefore, stores enough seed or feed to feed five or six ravenous sparrows for about three days.

The aspect ratio of the bird feeder, its shroud's body height to its shroud's characteristic diameter, can be decreased for aesthetic reasons and for increasing the hopper storage capacity. As long as the minimum characteristic diameter of the bird feeder's shroud is not violated, its diameter can be whatever one desires. Note that the larger the characteristic diameter, the greater the hopper's storage capacity can be made.

ALTERNATIVE EMBODIMENT(S)

It is contemplated that further alternative embodiment(s) of the anti-squirrel bird feeder are substantially similar to anti-squirrel bird feeder 100 save for five broad-based modifications, as discussed in more detail hereinafter. The further contemplated alternative embodiment(s) of the anti-squirrel bird feeder shall be hereinafter designated as bird feeder 1000 as is generally referenced in FIGS. 36 and 37, and which alternative bird feeder incorporates the modifications hereinafter specified in their entirety for ease of understanding.

Figure 36:
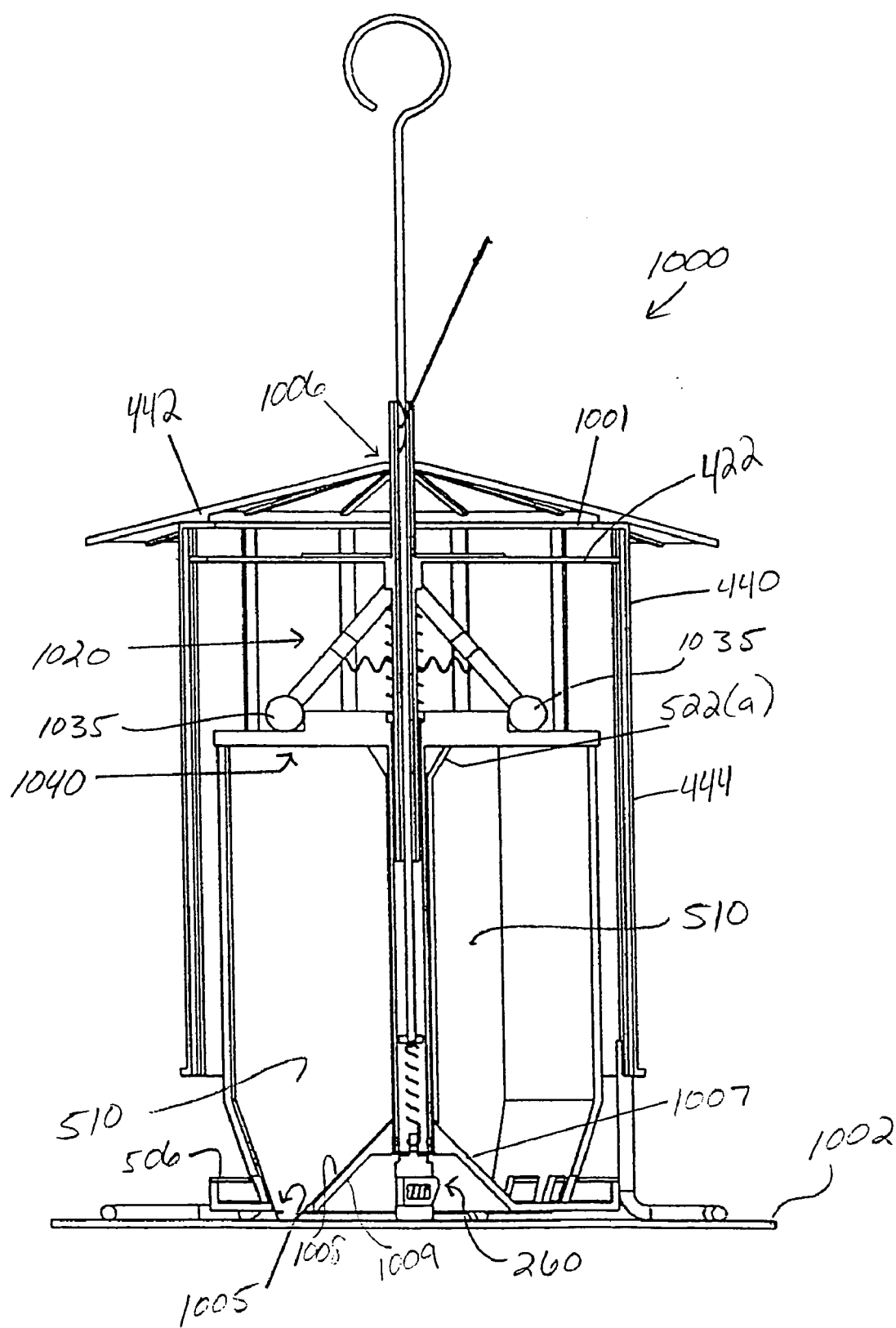
FIG. 36 is a cross-sectional side view of an alternative embodiment of an empty anti-squirrel bird feeder as rested upon a ground plane showing an alternative drive assembly, an alternative shroud assembly, an alternative hopper assembly, and an alternative support assembly.
Figure 37:
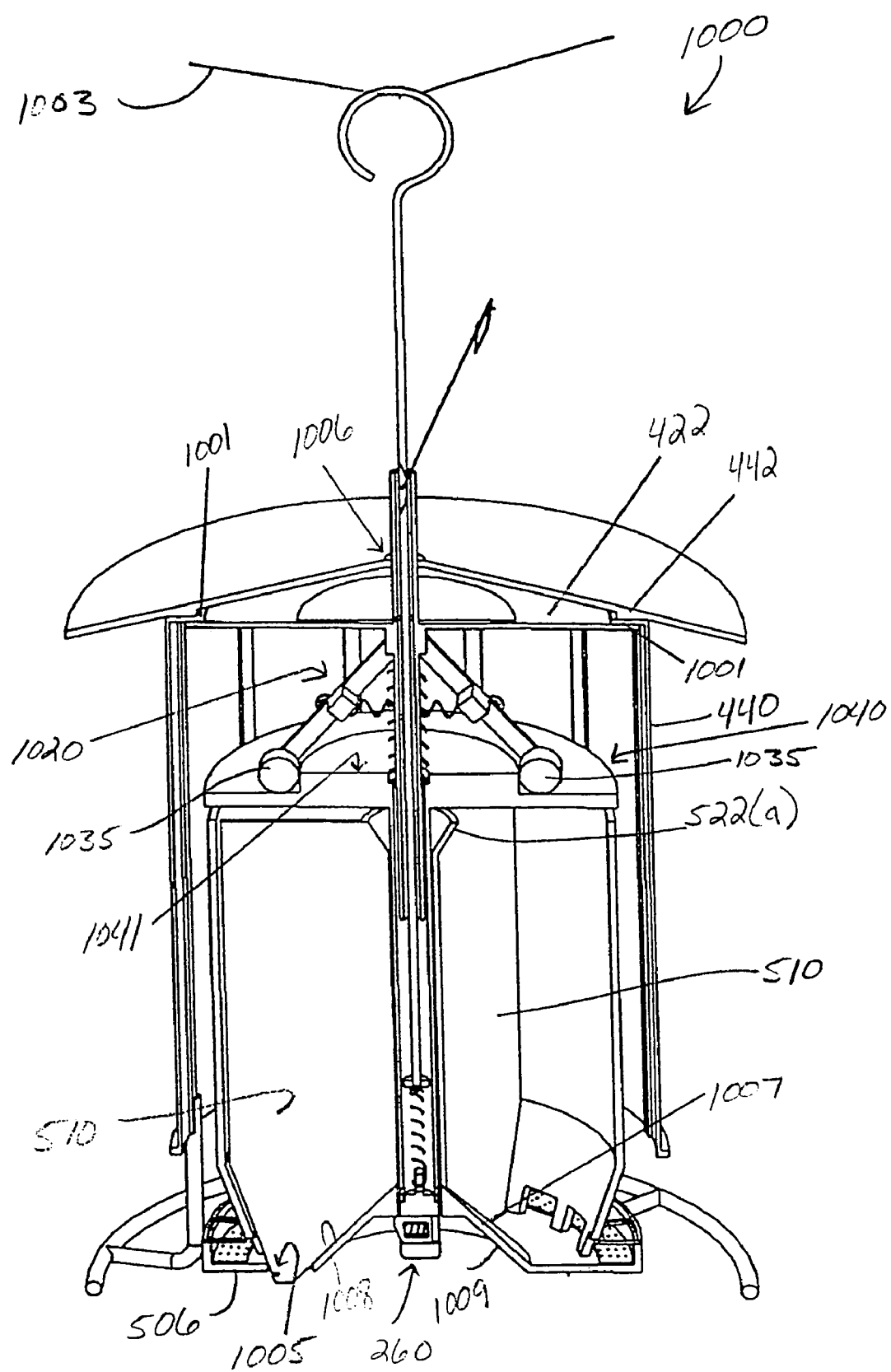
FIG. 37 is a cross-sectional perspective view of the alternative embodiment shown in FIG. 36 as hung from a support structure.
Figure 41:
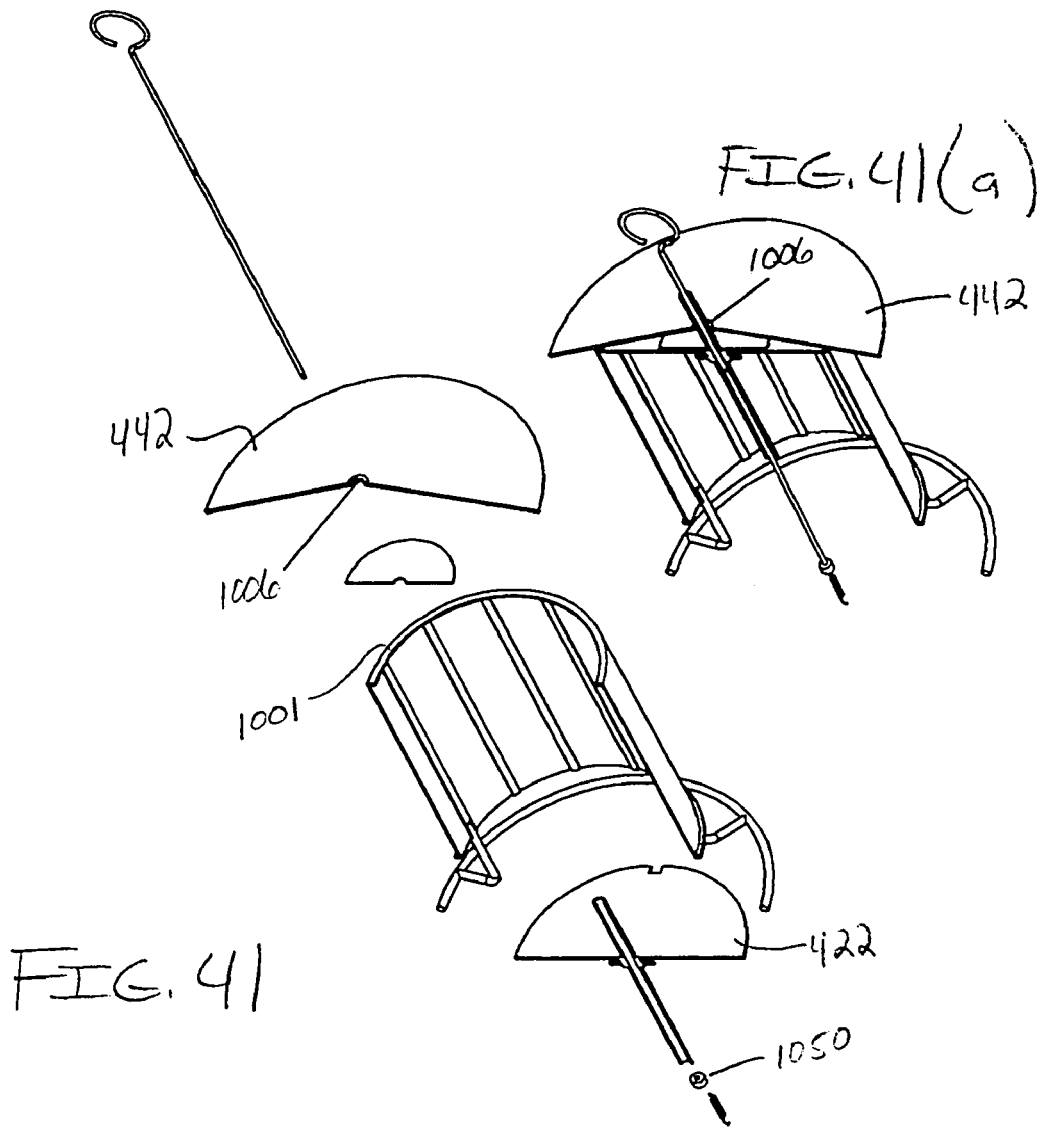
FIG. 41 is a fragmentary exploded perspective view of the alternative shroud assembly shown in FIG. 36.

Modification No. 1:

Bird feeder 1000 requires no fasteners. This reduces labor costs in production and simplifies owner assembly, disassembly, and cleaning of the birdfeeder. In this regard, shroud housing assembly 440 is unchanged from a parts perspective with the exception of trim weight screws 426 which are no longer deemed necessary. In bird feeder 1000, shroud body 444 simply sits or rests upon shroud bridge 422 as generally depicted in FIG. 37. It will be seen from a close inspection of FIG. 37 that shroud bridge 422 may be integrally formed with push rod shaft assembly 360 adjacent superior shaft top end 362. It will be further noted from an inspection of FIGS. 36 and 37 that shroud body 444 comprises an upper body flange 1001 as illustrated and referenced in FIGS. 36, 37, and 41. It will be understood from an inspection of the noted figures that flange 1001 extends radially inward at the superior/upper end of shroud body 444 so that the innermost diameter of shroud body 444 (as achieved via flange 1001) is lesser in magnitude than the outermost diameter of shroud bridge 422 and thus rests upon shroud bridge 422 when bird feeder 1000 is hung from a support structure 1003 as depicted in FIG. 37. FIG. 36, alternatively, shows bird feeder 1000 as rested upon a ground plane 1002. It will be seen from a comparative inspection of FIGS. 36 and 37 that flange 1001 of shroud body 444 becomes spaced from shroud bridge 422 when bird feeder 1000 is rested upon ground plane 1002 and further rests upon shroud bridge 422 when bird feeder 1000 is hung from support structure 1003. Shroud cap 442 sits or rests upon flange 1001 of shroud body 444 in either scenario as may be seen from a further inspection of FIGS. 36 and 37. Notably, trunnion assembly 334 may also be integrally formed with superior shaft length 364 of push rod shaft assembly 360.

Close tolerancing of an integral bushing member 1006 of shroud cap 442, which bushing member 1006 mates with (slides over) superior shaft top end 362 of push rod shaft assembly 360, ensures adequate alignment between shroud housing assembly 440 and hopper assembly 500 by precluding significant rotation of the shroud cap 442 about any of its lateral axes (infinite in number) and by the promotion of binding between the integral bushing member 1006 and the superior shaft top end 362. These effects conjoin to preclude separation of the interface between the flange 1001 and the shroud bridge 422 and thereby ensure adequate alignment between the shroud housing assembly 440 and the hopper assembly 500 when birdfeeder 1000 is asymmetrically loaded. Additionally, this alternate assembly method also provides easy access to trim weight 424 if adjustment is required. Bushing member 1006 is generally referenced in FIGS. 36, 37, 41, and 41(*a*).

Figure 40:
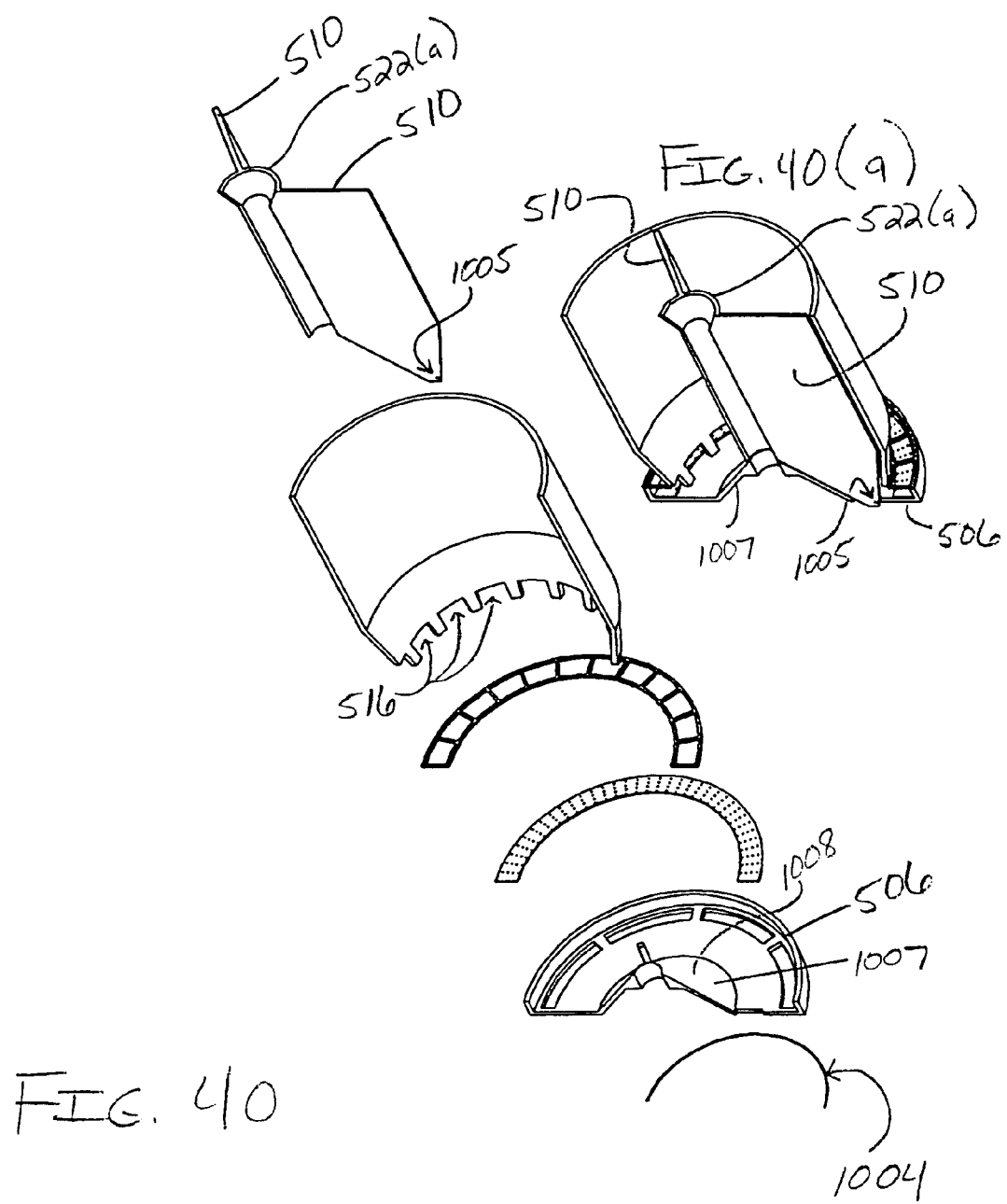
FIG. 40 is a fragmentary exploded perspective view of the alternative hopper assembly shown in FIG. 36.

Modification No. 2:

Hopper assembly 500 is unchanged from a parts perspective with the exception of the addition of a snap ring 1004 as illustrated and referenced in FIG. 40. It is contemplated that snap ring 1004 may preferably be constructed from spring steel, such as piano wire or similar other material. Snap ring 1004 functions to hold the entire hopper assembly 500 together. In this regard, vertical hopper partitions 510, which extend radially outward and downward from hopper partition 522(*a*) (alternatively reduced in size as compared to hopper partition 522 and referenced in FIGS. 36, 37, 40, and 40(*a*)), protrude through hopper tray 506 as generally depicted in FIGS. 36, 37,and 40. Snap ring 1004 engages slits 1005 alternatively formed in hopper partitions 510, one of which slit 1005 has been referenced in each of FIGS. 36, 37, 40, and 40(*a*). Slits 1005 are spatially situated in each hopper partition 510 such that when hopper assembly 500 is assembled, slits 1005 are exposed in inferior adjacency to the inferior surface or bottom surface of hopper tray 506. Consequently, the various components of hopper assembly 500 are captured together by snap ring 1004 as snap ring 1004 is received in slits 1005. This assembly alternative simplifies owner cleaning by providing easy access to all surfaces of hopper assembly 500. This is a result of complete and simple assembly and disassembly of the hopper assembly 500.

Modification No. 3:

It is further contemplated that hopper tray 506 may alternatively comprise an inferior conical section 1007 as illustrated and referenced in FIGS. 36, 37, and 40–44(*b*). Inferior conical section 1007 incorporates three notable attributes. Firstly, inferior conical section 1007 comprises a slope that is steeper than the angle of repose of the feed mixture. This feature promotes egress of the feed from hopper assembly 500. Secondly, inferior conical section 1007 functions to allow latch assembly 260 to be retracted in inferior adjacency to inferior conical section 1007 such that it no longer protrudes beyond or otherwise intersects the plane in which lies the inferior surface or bottom surface of hopper tray 506. It will be seen from an inspection of FIGS. 29 and 30 that latch assembly 260 extends beyond or otherwise intersects the plane in which the bottom surface of hopper tray 506 lies. Thus, while bird feeder 100 may not be placed upon a flat surface for maintenance and the like (the latch assembly protruding through the plane of the bottom surface of hopper tray 506), bird feeder 1000, alternatively, may be placed on a flat surface or ground plane 1002 for maintenance purposes and the like as generally depicted in FIG. 36.

It will thus be seen that hopper assembly 500 may comprise a sloped hopper partition 1007 having a superior partition surface 1008 as illustrated and referenced in FIGS.

36, 37, 40, and 42–44(b); and an inferior partition surface 1009 as illustrated and referenced in FIGS. 36, 37, 42, 43, and 44(b). Superior partition surface 1008 is designed to guide feed to feed outlet ports 516 (as further referenced in FIG. 40) and inferior partition surface 1009 is designed to surround and cover the hopper attachment means (as preferably defined by latch assembly 260 as further referenced in FIGS. 36, 37, 38–39(a), and 42–43(a), thus enabling a user to position birdfeeder 1000 upon a flat surface for maintenance purposes and the like.

Figures 42, 42A:
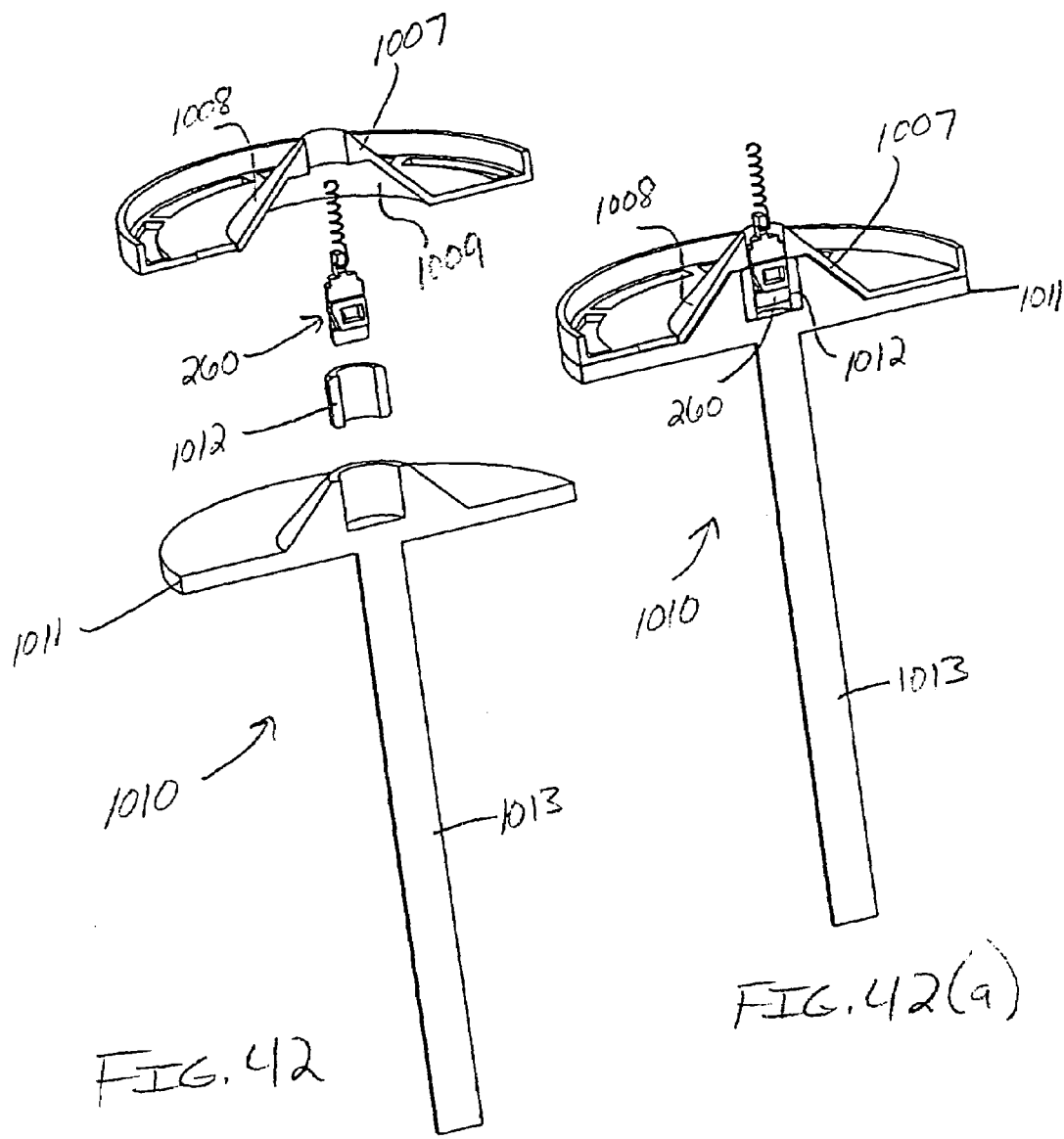
FIG. 42 is a fragmentary exploded perspective view of a hopper assembly extraction tool ejecting the hopper tray of the alternative hopper assembly.
FIG. 42(a) is a fragmentary perspective view of the hopper assembly extraction tool ejecting the hopper tray of the alternative hopper assembly as shown in FIG. 42.
Figures 43, 43A:
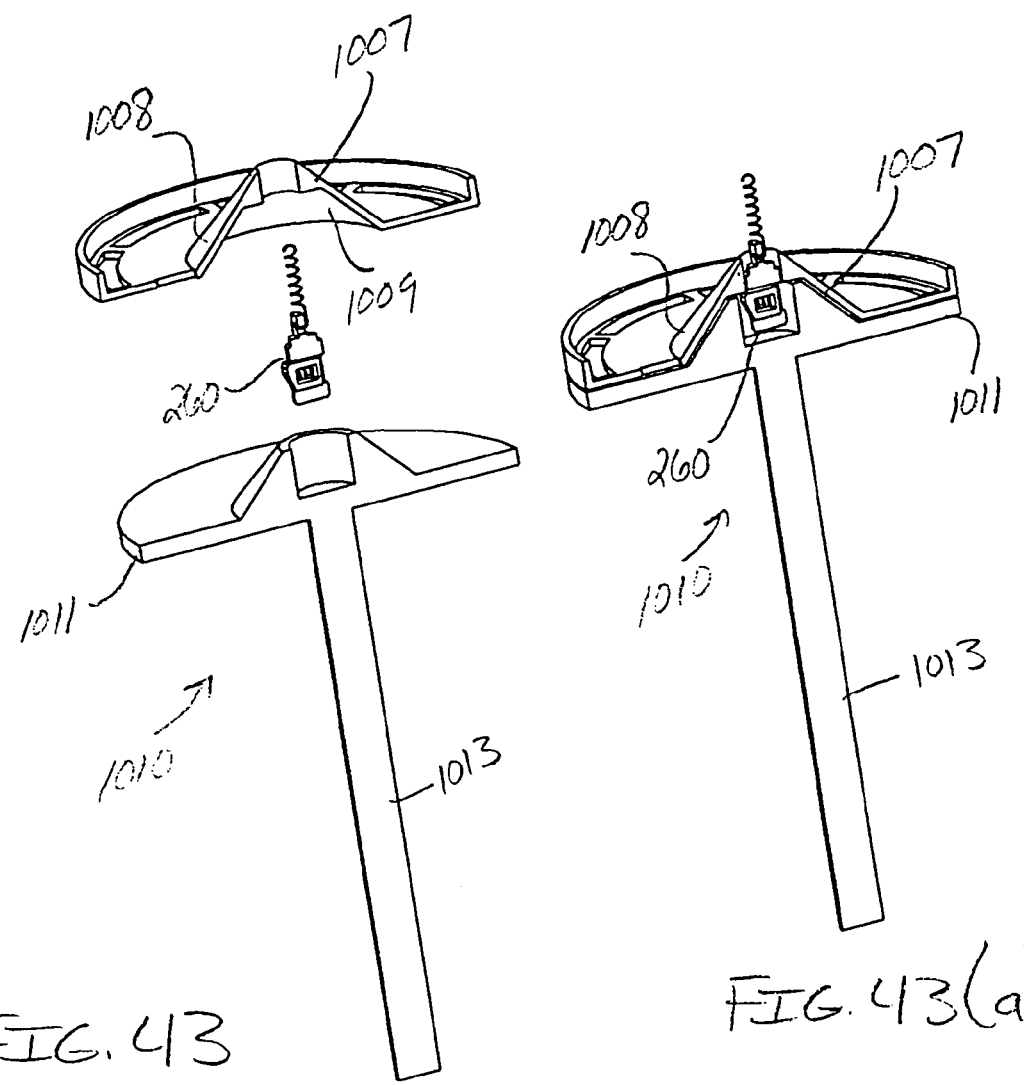
FIG. 43 is a fragmentary exploded perspective view of a hopper assembly extraction tool inserting the hopper tray of the alternative hopper assembly.
FIG. 43(a) is a fragmentary perspective view of the hopper assembly extraction tool inserting the hopper tray of the alternative hopper assembly as shown in FIG. 43.

Thirdly, inferior conical section 1007 functions to allow for the design of hopper assembly extraction means as preferably defined by a simple hopper assembly extraction tool 1010 as generally illustrated and referenced in FIGS. 42–43(a). Hopper assembly extraction tool 1010 may comprise an assembly support platform 1011 as illustrated in FIGS. 42–43(a); latch release means 1012 as illustrated and referenced in FIGS. 42 and 42(a); and an extension portion 1013 as illustrated and referenced in FIG. 42–43(a). To remove hopper assembly 500, the latch release means 1012 is removably inserted and thus cooperatively associated with support platform 1011 adjacent the superior end of extension portion 1013. The latch release means function to depress latch pawl 264 and thus release hopper assembly as previously described and as generally depicted in FIGS. 42 and 42(a). To reinsert hopper assembly 500, the latch release means 1012 is removed or is cooperatively disassociated with support platform 1011 and thus support platform 1011 allows latch pawl 264 to remain in an extended state for retaining hopper assembly 500 in an assembled state with bird feeder 1000 (as generally depicted in FIGS. 43 and 43(a). Thus, the user may utilize the described hopper assembly extraction means to remove hopper assembly 500 from birdfeeder 1000 when birdfeeder 1000 is an elevated stated. Extension portion 1013 enables the user to reach the otherwise elevated bird feeder 1000. As stated, the latch release means 1012 function to depress latch pawl 264, and thereby release hopper assembly 500. Hopper assembly 500 is then supported by assembly support platform 1011, and the user may then bring the released hopper assembly 500 down (via extension portion 1013) to a more comfortable spatial orientation for maintenance purposes and the like.

Thus, it will be understood from an inspection of the noted figures and from a consideration of the foregoing descriptions that hopper assembly extraction tool 1010 functions to enable the user of birdfeeder 1000 to extract hopper assembly 500 from and/or insert hopper assembly 500 into birdfeeder 1000 when birdfeeder 1000 is otherwise situated above and out of the reach of the owner.

Modification No. 4:

It is further contemplated that drive assembly 300 may be modified to eliminate parts yet essentially provide the same function. In this regard, it is noted that parts removal without sacrificing function may result in the reduction of production costs and further simplifies assembly. Thus, it is contemplated that the four-bar spring assembly 320 of birdfeeder 100 may be essentially reduced by the elimination of its lower half. In this regard, it is contemplated that the non-linear closure means may be defined by a two-bar spring assembly 1020 as illustrated and referenced in FIGS. 36, 37, 38, and 39. Two-bar spring assembly 1020 may comprise a medial bar 1030 as referenced in FIGS. 38 and 39; a lateral bar 1031 as referenced in FIGS. 38 and 39; a bar-joining junction assembly, and a superior trunnion assembly all of which operate in cooperative association with a mirror plane assembly 1040 as generally referenced in FIGS. 36, 37, 38, and 39.

Figures 38, 38A:
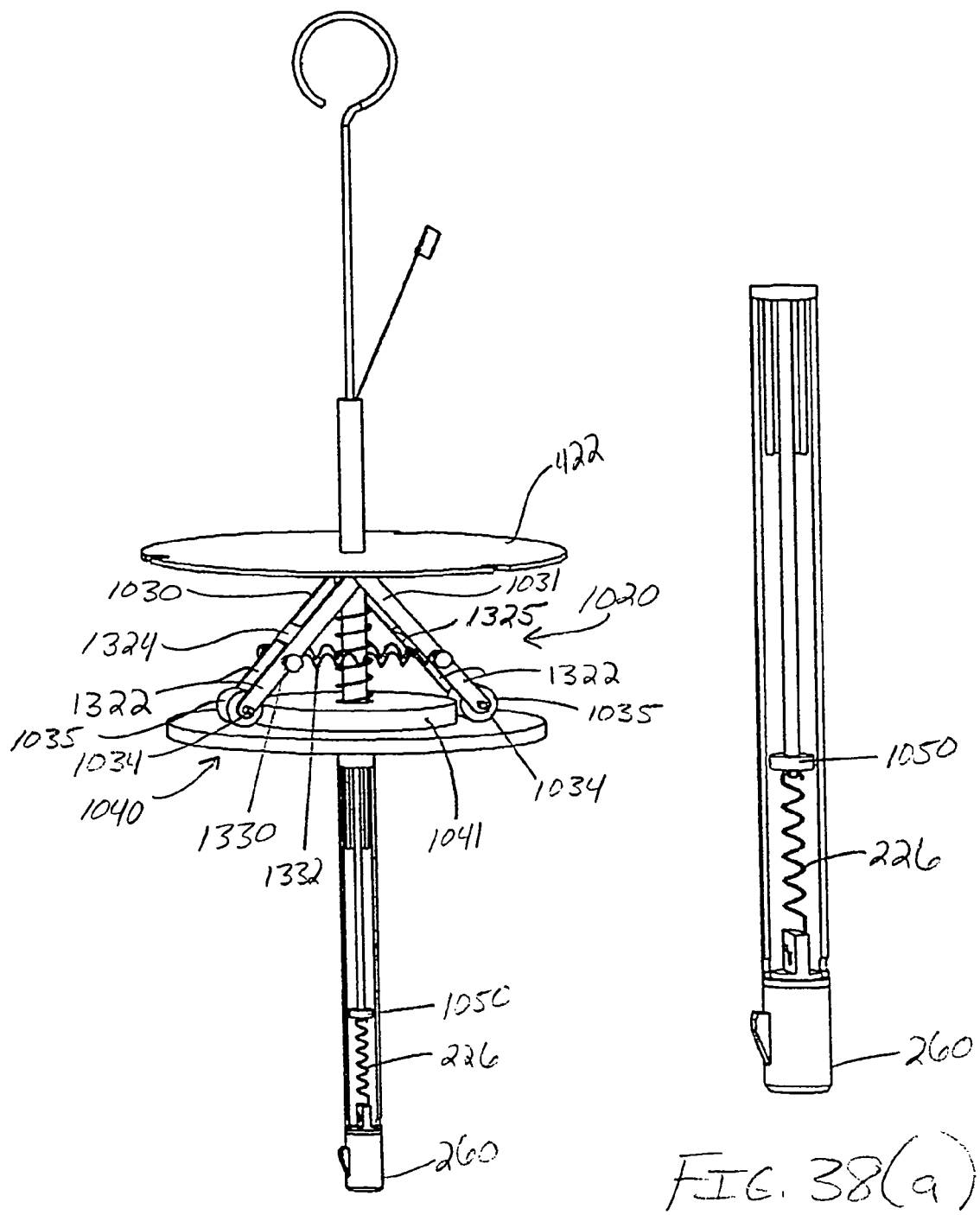
FIG. 38 is a fragmentary perspective view of the alternative support assembly with parts broken away and alternative drive assembly in an unactuated state with alternative shroud bridge as shown in FIG. 36.
FIG. 38(a) is a fragmentary view of the inferior portions of the alternative support assembly with parts broken away as shown in FIG. 38.

From a general inspection of FIG. 38, it will be noted that medial bar 1030 preferably comprises a short spacer 1324 and lateral bar 1031 preferably comprises a long spacer 1325. Long spacer 1325 functions to space the link members 1322 of lateral bar 1031 farther apart than the spacing between the link members 1322 of medial bar 1030. Medial and lateral bars 1030 and 1031 each comprise a superior bar end and an inferior bar end. The superior bar end of medial bar 1030 is preferably aligned with the superior bar end of lateral bar 1031 such that the superior bar end of medial bar 1030 is medial to the superior bar end of lateral bar 1031. In other words, the spacing between the link members 1322 of medial bar is less than the spacing between the link members 1322 of lateral bar and thus medial bar may be medially aligned with respect to lateral bar.

It will thus be noted that medial and lateral bars 1030 and 1031 are substantially identical to medial and lateral superior bars 30 and 31 and that the superior trunnion assembly of the alternative embodiment here described is akin to superior trunnion assembly 334 and thus the superior trunnion assembly of the alternative embodiment functions to pivotally connect medial and lateral bars 1030 and 1031 at the superior bar ends. The superior trunnion assembly thus forms a superior trunnion junction. The superior trunnion assembly may comprise a trunnion ring, two trunnion pins extending laterally from the respective trunnion ring along a respective pivot axis, and a trunnion set screw. It will be understood that the trunnion ring of the superior trunnion assembly comprises a shaft-receiving aperture. The superior shaft receiving aperture is sized and shaped to receive superior shaft member 361. It will be recalled that superior shaft member 361 preferably comprises an outer diameter that is sized and shaped to be telescopically received in the inner diameter of inferior shaft member 371.

The bar-joining junction assembly of birdfeeder 1000 comprises first and second junction pins 1330 or pivot attachment means, and first and second junction springs 1332 or bar spring means as generally referenced in FIG. 38. Further, certain roller means for movement are cooperatively associated with the inferior bar end of lateral bar 1031 and the inferior bar end of medial bar 1030. In this regard, it will be seen that small wheel or rollers may be mounted on a roller pin 1034 intermediate the termini of the inferior bar ends of lateral bar 1031 and medial bar 1030. As mentioned, the roller means for movement may be defined by small wheels or rollers 1035 having pin-receiving apertures formed at the longitudinal axis thereof for receiving roller pins 1034 and having a longitudinal height lesser in magnitude than the longitudinal height of either short spacer 1324 or long spacer 1325 so as to allow free rotational movement about the wheel or roller axes.

Figures 39, 39A:
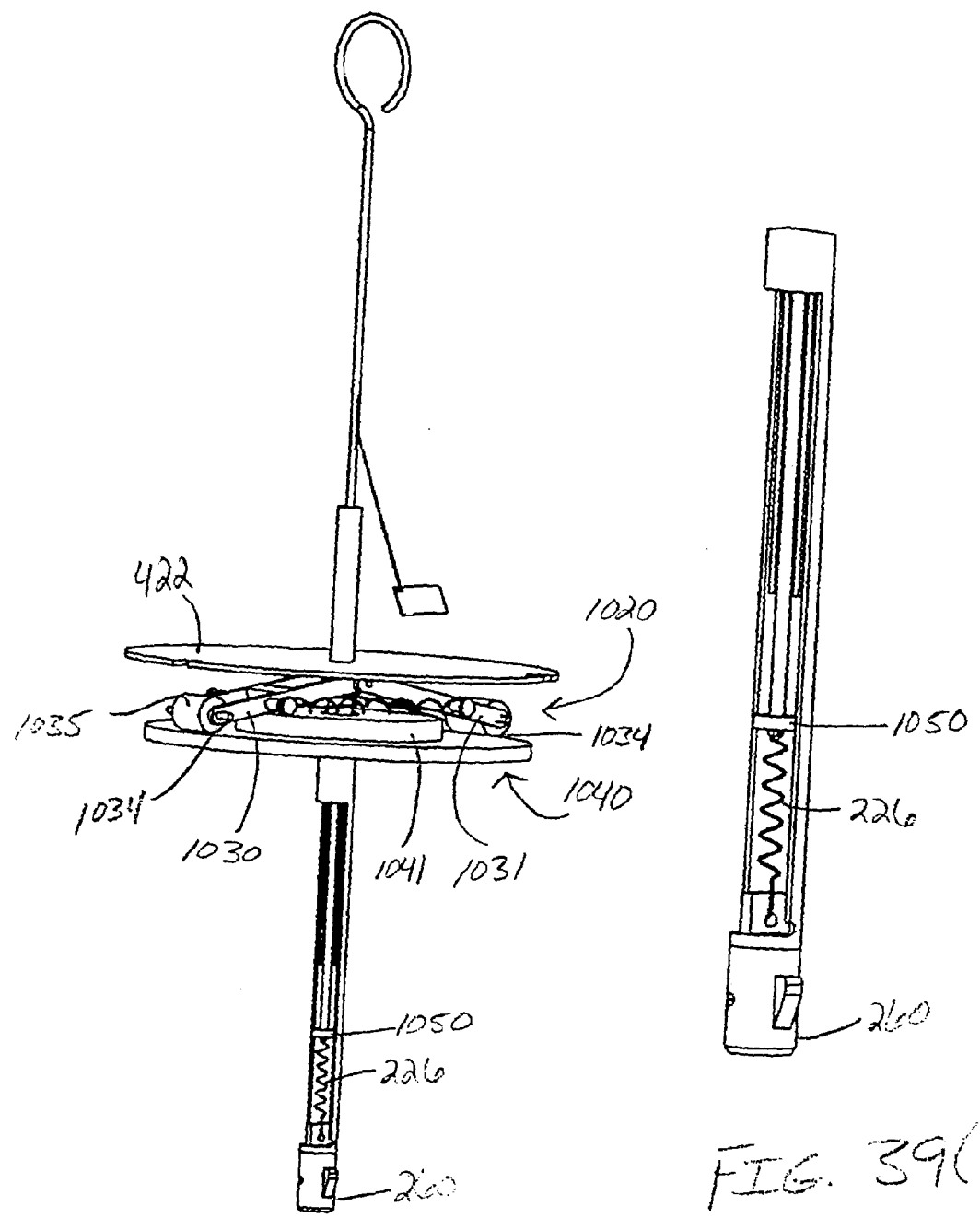
FIG. 39 is a fragmentary perspective view of the alternative support assembly with parts broken away and alternative drive assembly in an actuated state with alternative shroud bridge as shown in FIG. 36.
FIG. 39(a) is a fragmentary view of the inferior portions of the alternative support assembly with parts broken away as shown in FIG. 38.

It will be readily understood from an inspection of FIGS. 38 and 39 that junction pins 1330 each comprise opposite spring-engaging ends and that they are preferably parallel to one another. In this last regard, it is important to note that junction pins 1330 have a relaxed or unactuated parallel distance as generally depicted in FIG. 36–38; and a displaced or actuated parallel distance as generally depicted in FIG. 39.

First and second junction springs 1332 preferably comprise extension coil type springs and function to connect the spring-engaging ends of junction pins 1330. From an inspection of FIG. 38, it will be seen that first and second junction springs 1332 essentially define the relaxed parallel distance between junction pins 1330 when junction springs 1332 are relaxed in an unextended state or equilibrium state and further define the displaced parallel distance when displaced or in an extended, non-equilibrium state. Medial and lateral bars 1030 and 1031 thus have a first angle therebetween at the superior trunnion junction. Thus, as occurs in birdfeeder 100 and illustrated in FIG. 33, two-bar spring assembly 1020 provides a nonlinear, geometrically-based, closure mechanism, which mechanism is driven or displaced by external load forces acting through rigid medial and lateral bars 1030 and 1031, which mechanism is countered or restored by restorative forces in junction springs 1332 and the recovery spring 386.

The junction springs 1332 produce a supportable load substantially similar to supportable load 108 as graphically represented in FIG. 33. Any time the supportable load 108 is greater than the applied load the two-bar mechanism or two-bar spring assembly 1020 will open or become displaced.

It will be further understood from an inspection of FIGS. 36, 37, 38, and 39 that the two rollers 1035 or wheels cooperatively engage a junction-engaging single mirror plane assembly 1040. Mirror plane assembly 1040 is preferably circular to provide azimuthal indifference as before. Mirror plane assembly 1040 further comprises a step 1041 as illustrated and referenced in FIGS. 37, 38, and 39. Step 1041 of mirror plane assembly 1040 is provided to preload the two-bar spring assembly 1320 so as to preclude the otherwise small displacement of shroud housing assembly 440 that occurs in birdfeeder 100 prior to unstable, full closure when the collapse load was reached. In the alternative embodiment, or birdfeeder 1000, longitudinal translation (telescoping) of shroud housing assembly 440 occurs only when a collapse load is applied. A further feature of the two-bar assembly and mirror plane approach is that the seed holding capacity of birdfeeder 1000 may be substantially increased given the same internal operating volume. Further, filling of the hopper is less difficult for its top is more open (in view of the removal of hopper partition 522 and introduction of hopper partition 522(*a*)).

Modification No. 5

It is further contemplated that detrimental over extension of the scale spring 226 may be precluded by incorporation of a hard stop, washer 1050. It will be recalled that the hard stop for longitudinal translation (telescoping) of shroud housing assembly 440 in birdfeeder 100 is provided by the latch assembly 260. The latch assembly hard stop forces all loading to pass through the scale spring 226 until the load results in a taut overload cable 227. Overload cable 227 bypasses all additional loading directly to the support member 224. By elimination of the overload cable 227 and by the incorporation of washer 1050 as here described, it is contemplated that detrimental over extension of the scale spring 226 may be precluded more simply. Therefore, by the incorporation of washer 1050, it is contemplated that birdfeeder 1000 may effectively reduce production costs, simplify assembly and/or disassembly, and simplify replacement of the scale spring 226 if necessary.

It should be noted that in the present embodiment, the longitudinal translation (stroke) of shroud housing assembly 440 is limited by a hard stop, but not by washer 1050 as referenced in FIGS. 38–39(*a*), and 41. The stroke is limited by recovery spring 386 reaching solid height or by inferior shaft top end 372 contacting the bottom of the superior trunnion ring, whichever method is chosen by the manufacturer. A hard stop is necessary to ensure that the drive mechanism or means does not go over center in which case the drive mechanism would be unable to perform the desired function.

Stretching of scale spring 226 causes superior shaft bottom end 366 to approach the aforementioned washer and would preclude full stroke of shroud housing assembly 440 if not properly accounted for. The gap between superior shaft bottom end 366 and washer 1050 is established by adding to the design stroke the stretch of scale spring 226 when the birdfeeder is at its design gross weight. In other words, when properly adjusted, the longitudinal translation (stroke) of shroud housing assembly 440 is limited exclusively by the solid height of recovery spring 386 (as a first method) or by inferior shaft top end 372 contacting the retained superior trunnion ring (as a second method).

The weight of all birdfeeder components (except support member 224, washer 1050, and flag assembly 240), the weight of the feed, and the weight of visiting creatures not holding onto the support member 224, all combine to stretch scale spring 226, for the load path is through scale spring 226 to support member 224 assuming a normal load. A consequence of this stretching of scale spring 226 is that inferior shaft member 371 slides down support member 224. This causes superior shaft bottom end 366 to approach washer 1050. However, superior shaft bottom end 366 will not contact washer 1050 even if telescoping has occurred provided the aforementioned combined weight does not exceed the maximum design load for scale spring 226.

The maximum design load for scale spring 226 could be exceeded if a second load path were not provided. Note, that the component of the support member load that is in excess of the maximum design load for scale spring 226 can only be applied via shroud assembly 400 and would necessarily cause telescoping action, which is limited by the solid height of recovery spring 386 (assuming the first method). Therefore, the transmission path of this excess load is from shroud assembly 400 to the retained superior trunnion ring to superior shaft member 361 to washer 1050 to support member 224, thereby bypassing scale spring 226. The remaining support member load is transmitted via normal transmission paths which are (1) from shroud assembly 400 to the retained superior trunnion ring where it then splits between recovery spring 386 and rollers 1035 afterwhich it recombines via mirror plane assembly 1040 and continues through inferior shaft member 371 to latch assembly 260 to scale spring 226 to support member 224; and (2) from hopper assembly 500 to latch assembly 260 to scale spring 226 to support member 224. Scale spring 226 could be otherwise damaged if an owner or an invader pulls abusively down on hopper assembly 500 while captured in the birdfeeder by latch assembly 260. It should be further noted that the close fit of shroud bridge 422 and shroud body 444, in addition to the thickness of shroud bridge 422, contribute significantly to maintenance of alignment between shroud body 440 and hopper assembly 500.

While the above description contains much specificity, this specificity should not be construed as limitations on the scope of the invention, but rather as an exemplification of the invention. For example, it is contemplated that certain parts may be eliminated in that they can be made integral with their mating parts if the structure is cast in some form of plastic. This necessarily reduces production costs and simplifies assembly and/or disassembly of the birdfeeder. For example shroud bridge 442 may be made integral with superior shaft member 361 of push rod shaft assembly 360 without comprising the function of the birdfeeder apparatus.

Further, it is contemplated that the superior shaft-receiving aperture need not comprise spherical bearing 443 so as to decrease the likelihood of damage to bird feeder apparatus 100 experiencing unbalanced load forces directed against shroud assembly 400. This damage control feature may be achieved by incorporating flexure means into push rod shaft assembly 360. For example, it is contemplated that a rod spring may be incorporated into the superior shaft member intermediate the superior push rod shaft end 362 and the inferior push rod shaft end 366 adjacent the corrugated bridge assembly in cooperative association therewith. Unbalanced load forces directed against shroud assembly 400 would thus cause the rod spring to flex enabling bird feeder apparatus 100 to escape damage to otherwise rigid structures of bird feeder apparatus 100. It is thus contemplated that when conjoined in action, the corrugated bridge and the self-aligning means limit critical item stresses to within the elastic range when excessive lateral or vertical loads are applied to perch assembly 460 and thus the practice of incorporating flexure means or self-aligning means into the design of an anti-squirrel bird feeder as here noted would fall within the scope and spirit of the present invention.

It will be further recalled that both superior trunnion assembly 34 and inferior trunnion assembly 35 preferably comprise a trunnion set screw 340 as illustrated and referenced in FIGS. 9 and 10. It should be noted that superior trunnion assembly 34 could be integrally formed with superior shaft member 361 and inferior trunnion assembly 35 could be integrally formed with inferior shaft member 371. It is thus contemplated that the shaft fastening means may comprise integral connectivity between superior trunnion assembly 34 and superior shaft member 361 as well as integral connectivity between inferior trunnion assembly 35 and inferior shaft member 371.

It will be further recalled that four bar spring assembly 320 preferably comprises a plurality of rigid links 322; a plurality of rigid spacers 324 and 325; a plurality of spacer screws 326; a plurality of spacer nuts 328; two rigid junction pins 330 or pivot attachment means; two four-bar springs or junction springs 332 or bar spring means; and two trunnion assemblies 334. It is contemplated that four-bar spring assembly could be modified in any number of ways to provide a nonlinear, geometrically-based, closure mechanism (being driven by external load forces acting through the superior and inferior bars and being countered by restorative forces in the junction springs). In this regard, it is contemplated that four-bar spring assembly could be modified so as to need only four linkages, two junction springs, and a spring joining collar, which collar would have an aperture sufficiently large to move unhindered by recovery spring 368. Further, four-bar spring assembly 320 could conceivably be modified so as to be constructed from four linkages, and two junction springs attached to the central coil of recovery spring 368 thus eliminating the requirement for a spring-joining collar. Further, it is contemplated that four-bar spring assembly 320 could conceivably be modified so as to be constructed from only four linkages and one junction spring. Thus, the junction assembly may essentially comprise pivot attachment means and bar spring means (as defined be a single junction spring), the pivot attachment means pivotally connecting two superior linkages or bars to two inferior linkages or bars and the bar spring means connecting the pivot attachment means for providing a nonlinear, geometrically-based, closure mechanism.

Further, hopper scale assembly 226 need not comprise scale spring 226 of an extension coil type in cooperative association with overload cable 227 as illustrated and referenced in FIGS. 17 and 18. It is contemplated that with a small design change a compression spring could be used in place of the described hopper scale assembly, particularly eliminating the need for overload cable 227 since a compression spring would simply reach solid, relaxed displacement if an excessive load were applied to shroud assembly 400. In this regard, it is further contemplated that a secondary function of a compression type coil would be to maintain alignment between shroud body 444 and hopper assembly 500 should their cross sections be other than round. Further, bird feeder apparatus need not comprise a substantially circular cross section and thus diameters as herein specified may be easily modified to incorporate rectangular or triangular or any number of geometrical cross sectional configurations and thus may be defined by peripheries rather than diameters. For example, cylindrical feed-supporting surface 520 need not be cylindrical but rectangular in configuration. In this regard, it is further contemplated that a secondary function of four-bar spring assembly 320 is to maintain alignment between shroud body 444 and hopper assembly 500 should their respective cross sections be other than round. It is contemplated that bird feeder apparatus 100 of a substantially circular cross section as described hereinabove provides one of the most aesthetically pleasing constructions. The reader is reminded that aesthetics are part and parcel of the bird watcher's motivation for bird watching.

It is further contemplated that bird enthusiasts are often highly desirous of becoming more involved in general bird watching activities and thus may be desirous of building or constructing their own bird feeders. It is noted that actual bird feeder construction is a common activity among all types of bird enthusiasts. In this regard, it is further contemplated that the present invention may take the form of a bird feeder kit for enabling users of consumers thereof to construct a bird feeder apparatus for providing a readily available supply of feed for birds. The bird feeder kit essentially comprises the support assembly, the drive assembly, the shroud assembly, the hopper assembly, and the hopper assembly extraction means substantially as described hereinabove.

Thus, at its essence, the present invention discloses a bird feeder apparatus for providing a readily available supply of feed for birds, which bird feeder apparatus comprises a support assembly, a drive assembly, a shroud assembly, and a hopper assembly substantially as heretofore described. In this regard, the support assembly essentially comprises a scale assembly and hopper attachment means. The scale assembly essentially comprises a support member and scale spring means, which scale spring means function to join the support member to the hopper attachment means.

The drive assembly essentially comprises non-linear, geometrically-based closure means (as preferably embodied by either the four bar spring assembly or the two bar spring assembly) and a push rod shaft assembly. Notably, the push rod shaft assembly essentially comprises first and second shaft members, the first shaft member being telescopically received in the second shaft member. The non-linear, geometrically-based closure means are cooperatively associated with the first and second shaft members for telescopically operating the first and second shaft members relative to one another as earlier described.

The shroud assembly essentially comprises a shroud bridge and a shroud body. The shroud bridge is cooperatively associated with the shroud body adjacent the superior end thereof for supporting the shroud body and the first shaft member fixedly extends through the shroud bridge. The hopper assembly essentially comprises a hopper body, a hopper tray, a plurality of hopper partitions, and a shaft-receiving sleeve. The hopper body essentially comprises spacer-attachment means which attach the hopper tray to the hopper body in spaced relation thereto thereby defining feed outlet ports. The hopper partitions radially extend from the hopper body to the shaft-receiving sleeve and thus define a plurality of feed-receiving compartments. The hopper assembly is telescopically receivable in the shroud body; the push rod shaft assembly extends through the shaft-receiving sleeve; the support assembly extends through the push rod shaft assembly; and the hopper attachment means selectively maintain the hopper assembly in telescopic relation to the shroud body.

Accordingly, although the invention has been described by reference to a preferred embodiment and at least one alternative embodiment, it is not intended that the novel assembly be limited thereby, but that modifications thereof are intended to be included as falling within the broad scope and spirit of the foregoing disclosure, the following claims and the appended drawings.

I claim:

1. A bird feeder apparatus for providing a readily available supply of feed for birds, the bird feeder apparatus comprising:

a support assembly, the support assembly comprising a scale assembly and hopper attachment means, the scale assembly comprising a support member and scale spring means, the scale spring means joining the support member to the hopper attachment means;

a drive assembly, the drive assembly comprising a two-bar spring assembly, a mirror plane assembly, and a push rod shaft assembly, the two-bar spring assembly comprising a medial bar, a lateral bar, a junction assembly, and a trunnion assembly, the medial and lateral bars each comprising a superior bar end and an inferior bar end, the trunnion assembly pivotally connecting the medial and lateral bars at the superior bar ends, the junction assembly comprising first and second junction pins and first and second junction springs, the first and second junction pins cooperatively associating roller means for movement with the inferior bar ends, the junction pins each comprising opposite spring-engaging ends, the first and second junction pins being substantially parallel to one another, the junction pins having a relaxed parallel distance and a displaced parallel distance, the first and second junction springs connecting the spring-engaging ends, the first and second junction springs defining the relaxed parallel distance when relaxed and defining the displaced parallel distance when displaced, the two-bar spring assembly thus providing a nonlinear, geometrically-based, closure mechanism, the nonlinear, geometrically-based closure mechanism being driven by external load forces acting through the bars and being countered by restorative forces in the junction springs, the push rod shaft assembly comprising a superior shaft member, an inferior shaft member, an annular spring cup, and a recovery spring, the superior shaft member comprising a superior shaft top end, a superior shaft bottom end, and a superior shaft length, the inferior shaft member comprising an inferior shaft top end, an inferior shaft bottom end, and an inferior shaft length, the trunnion assembly comprising a shaft-receiving aperture and shaft-fastening means, the shaft-receiving aperture receiving the superior shaft length, the superior shaft bottom end being telescopically received in the inferior shaft top end, the shaft-fastening means fastening the trunnion assembly to the superior shaft length, the spring cup affixed to inferior shaft member adjacent the inferior shaft top end, the recovery spring seated upon the spring cup intermediate the spring cup and the trunnion assembly;

a shroud assembly, the shroud assembly comprising a shroud bridge and a shroud body, the shroud bridge being cooperatively associated with the shroud body adjacent the superior end thereof for supporting the shroud body, the first shaft member fixedly extending through the shroud bridge; and a hopper assembly, the hopper assembly comprising a hopper body, a hopper tray, a plurality of hopper partitions, and a shaft-receiving sleeve, the hopper body comprising spacer-attachment means, the spacer-attachment means attaching the hopper tray to the hopper body in spaced relation thereto thereby defining feed outlet ports, the hopper partitions radially extending from the hopper body to the shaft-receiving sleeve, the hopper partitions thus defining a plurality of feed-receiving compartments, the hopper assembly being telescopically receivable in the shroud body, the push rod shaft assembly extending through the shaft-receiving sleeve, the support assembly extending through the push rod shaft assembly, the hopper attachment means for selectively maintaining the hopper assembly in telescopic relation to the shroud body.

2. The bird feeder apparatus of claim 1 wherein the bird feeder apparatus comprises at least one perch assembly, the perch assembly comprising a perch member and perch member attachment means, the perch member attachment means fixedly attaching the perch member to the shroud body adjacent the hopper tray, the fixedly attached perch member thus enabling birds to perch and feed from the hopper tray.

3. The bird feeder apparatus of claim 1 wherein the bird feeder apparatus comprises feed gauge means, the feed gauge means for indicating to a user a feed quantity in the hopper assembly.

4. The bird feeder apparatus of claim 3 wherein the support member comprises pole-receiving structure, the feed gauge means being defined by a flag assembly, the flag assembly comprising a flag pole, a flag and pole attachment means, the flag pole comprising a flag end and a pole attachment end, the pole attachment means attaching the pole attachment end to the pole-receiving structure, the flag being attached to the flag end for indicating the feed quantity.

5. The bird feeder apparatus of claim 4 wherein the feed quantity has a feed load, the feed load and the scale spring means for displacing the shroud assembly, drive assembly and hopper assembly relative to the support assembly, the push rod shaft assembly for raising or lowering the flag pole, the flag assembly thus indicating the feed quantity.

6. The bird feeder apparatus of claim 1 wherein the shroud assembly comprises a shroud cap, the shroud cap having a superior cap surface, an inferior cap surface, and a shaft-receiving aperture extending from the superior cap surface to the inferior cap surface, the push rod shaft assembly extending through the shaft-receiving aperture.

7. The bird feeder apparatus of claim 1 wherein the bird feeder apparatus comprises self-aligning means, the self-aligning means for enabling the bird feeder apparatus to withstand unbalanced load forces directed against the shroud assembly.

8. The bird feeder apparatus of claim 1 wherein the hopper attachment means provide the bird feeder apparatus with a drop-out hopper assembly for enabling users thereof to easily clean and refill the hopper assembly.

9. The bird feeder apparatus of claim 1 wherein the hopper tray comprises anti-flick means and debris outlet means, the anti-flick means for preventing birds from flicking seed from the hopper tray, the debris outlet means for preventing the accumulation of debris in the hopper tray.

10. The bird feeder apparatus of claim 1 wherein the hopper assembly comprises a sloped hopper partition, the sloped hopper partition comprising a superior partition surface and an inferior partition surface, the superior partition surface for guiding feed to the feed outlet ports, the inferior partition surface for covering the hopper attachment means and enabling a user to position the bird feeder apparatus upon a flat surface.

11. A bird feeder apparatus for providing a readily available supply of feed for birds, the bird feeder apparatus comprising:
a support assembly, the support assembly comprising a scale assembly and hopper attachment means, the scale assembly comprising a support member and scale spring means, the scale spring means joining the support member to the hopper attachment means;
a drive assembly, the drive assembly comprising non-linear, geometrically-based closure means and a push rod shaft assembly, the push rod shaft assembly comprising first and second shaft members, the first shaft member being telescopically received in the second shaft member, the non-linear, geometrically-based closure means being cooperatively associated with the first and second shaft members for telescopically operating the first and second shaft members relative to one another;
a shroud assembly, the shroud assembly comprising a shroud bridge and a shroud body, the shroud bridge being cooperatively associated with the shroud body adjacent an upper end thereof for supporting the shroud body, the first shaft member fixedly extending through the shroud bridge; and
a hopper assembly, the hopper assembly comprising a hopper body, a hopper tray, a plurality of hopper partitions, and a shaft-receiving sleeve, the hopper body comprising spacer-attachment means, the spacer-attachment means attaching the hopper tray to the hopper body in spaced relation thereto thereby defining feed outlet ports, the hopper partitions radially extending from the hopper body to the shaft-receiving sleeve, the hopper partitions thus defining a plurality of feed-receiving compartments, the hopper assembly being telescopically receivable in the shroud body, the push rod shaft assembly extending through the shaft-receiving sleeve, the support assembly extending through the push rod shaft assembly, the hopper attachment means for selectively maintaining the hopper assembly in telescopic relation to the shroud body.

12. The bird feeder apparatus of claim 11 wherein the bird feeder apparatus comprises at least one perch assembly, the perch assembly comprising a perch member and perch member attachment means, the perch member attachment means fixedly attaching the perch member to the shroud body adjacent the hopper tray, the fixedly attached perch member thus enabling birds to perch and feed from the hopper tray.

13. The bird feeder apparatus of claim 11 wherein the bird feeder apparatus comprises feed gauge means, the feed gauge means for indicating to a user a feed quantity in the hopper assembly.

14. The bird feeder apparatus of claim 13 wherein the support member comprises pole-receiving structure, the feed gauge means being defined by a flag assembly, the flag assembly comprising a flag pole, a flag and pole attachment means, the flag pole comprising a flag end and a pole attachment end, the pole attachment means attaching the pole attachment end to the pole-receiving structure, the flag being attached to the flag end for indicating the feed quantity.

15. The bird feeder apparatus of claim 11 wherein the shroud assembly comprises a shroud cap, the shroud cap having a superior cap surface, an inferior cap surface, and a shaft-receiving aperture extending from the superior cap surface to the inferior cap surface, the push rod shaft assembly extending through the shaft-receiving aperture.

16. The bird feeder apparatus of claim 11 wherein the bird feeder apparatus comprises self-aligning means, the self-aligning means for enabling the bird feeder apparatus to withstand unbalanced load forces directed against the shroud assembly.

17. The bird feeder apparatus of claim 11 wherein the hopper attachment means provide the bird feeder apparatus with a drop-out hopper assembly for enabling users thereof to easily clean and refill the hopper assembly.

18. The bird feeder apparatus of claim 11 wherein the hopper assembly comprises a sloped hopper partition, the sloped hopper partition comprising a superior partition surface and an inferior partition surface, the superior partition surface for guiding feed to the feed outlet ports, the inferior partition surface for covering the hopper attachment means and enabling a user to position the bird feeder apparatus upon a flat surface.

19. A bird feeder kit for enabling a user to construct a bird feeder apparatus for providing a readily available supply of feed for birds, the bird feeder kit comprising:
a support assembly, the support assembly comprising a scale assembly and hopper attachment means, the scale assembly comprising a support member and scale spring means, the scale spring means joining the support member to the hopper attachment means;
a drive assembly, the drive assembly comprising non-linear, geometrically-based closure means and a push rod shaft assembly, the push rod shaft assembly comprising first and second shaft members, the first shaft member being telescopically received in the second shaft member, the non-linear, geometrically-based closure means being cooperatively associated with the first and second shaft members for telescopically operating the first and second shaft members relative to one another;
a shroud assembly, the shroud assembly comprising a shroud bridge and a shroud body, the shroud bridge being cooperatively associated with the shroud body adjacent an upper end thereof for supporting the shroud body, the first shall member fixedly extending through the shroud bridge; and
a hopper assembly, the hopper assembly comprising a hopper body, a hopper tray, a plurality of hopper partitions, and a shaft-receiving sleeve, the hopper body comprising spacer-attachment means, the spacer-attachment means attaching the hopper tray to the hopper body in spaced relation thereto thereby defining feed outlet ports, the hopper partitions radially extending from the hopper body to the shaft-receiving sleeve, the hopper partitions thus defining a plurality of feed-receiving compartments, the hopper assembly being telescopically receivable in the shroud body, the push rod shaft assembly extending through the shaft-receiving sleeve, the support assembly extending through the push rod shaft assembly, the hopper attachment means for selectively maintaining the hopper assembly in telescopic relation to the shroud body.

20. The bird feeder kit of claim 19 wherein the kit comprises hopper assembly extraction means.

* * * * *